United States Patent [19]
Alliston et al.

[11] 3,916,444
[45] Oct. 28, 1975

[54] TRAINING SIMULATOR FOR NUCLEAR POWER PLANT REACTOR MONITORING

[75] Inventors: William H. Alliston, Murrysville; Francis R. Czerniejewski, Glenshaw; Boris A. Mutafelija, Allison Park, all of Pa.

[73] Assignee: Westinghouse Electric Corporation, Pittsburgh, Pa.

[22] Filed: Feb. 23, 1973

[21] Appl. No.: 335,181

[52] U.S. Cl. .......................... 444/1; 176/19; 35/13
[51] Int. Cl. ..... G06f 15/06; G06f 15/56; G09b 9/00
[58] Field of Search .......... 444/1; 235/184; 176/19, 176/24; 35/10, 13, 10.2

[56] References Cited
UNITED STATES PATENTS
3,061,945  11/1962  Hawkins ................................ 35/10
3,237,318  3/1966  Schager ................................ 35/10

Primary Examiner—Malcolm A. Morrison
Assistant Examiner—Edward J. Wise
Attorney, Agent, or Firm—H. W. Patterson

[57] ABSTRACT

A method and apparatus for the real-time dynamic simulation of a nuclear power plant that includes a control and nuclear instrumentation console for operating the reactor and monitoring three-dimensional physical values in the reactor core. A digital computer is connected to the console to calculate physical values such as nuclear flux, power, and temperature including the distribution thereof throughout the core with such calculations including the effect of full length, part length, and malfunctioned reactor control rods, as well as xenon, decay heat and boron, for example, on the output and distribution of power within the core. The simulation also includes instrumentation that responds to the calculated physical values by recording a continuous trace of the flux value in the reactor core from the top to the bottom.

33 Claims, 40 Drawing Figures

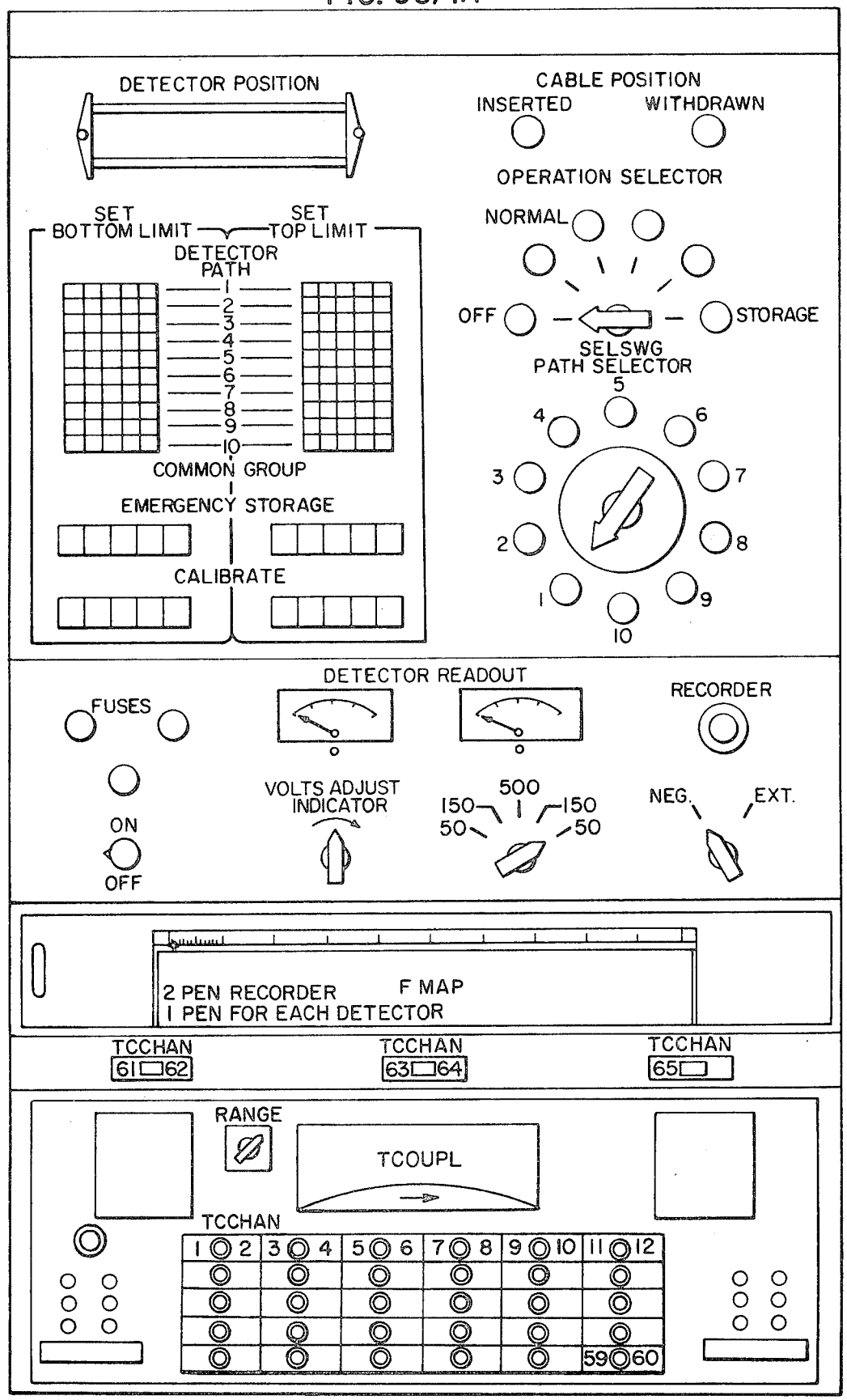
FIG. 90/1A

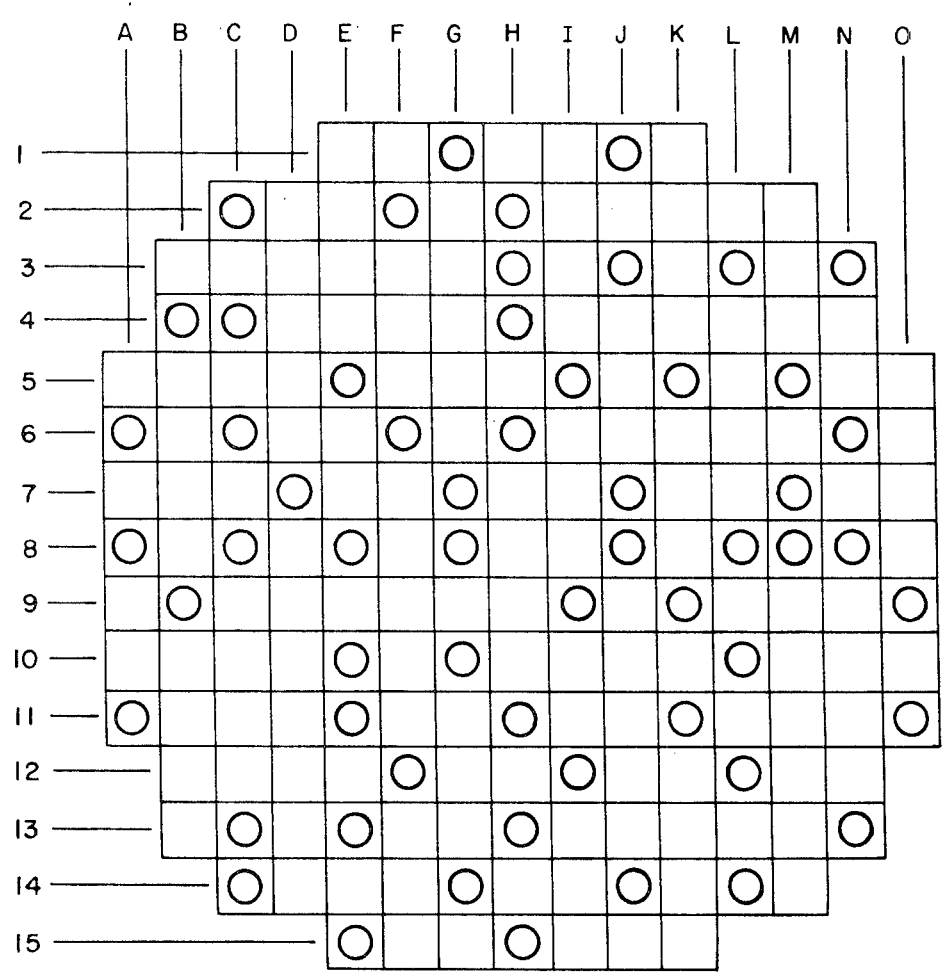
FIG. 90/1B

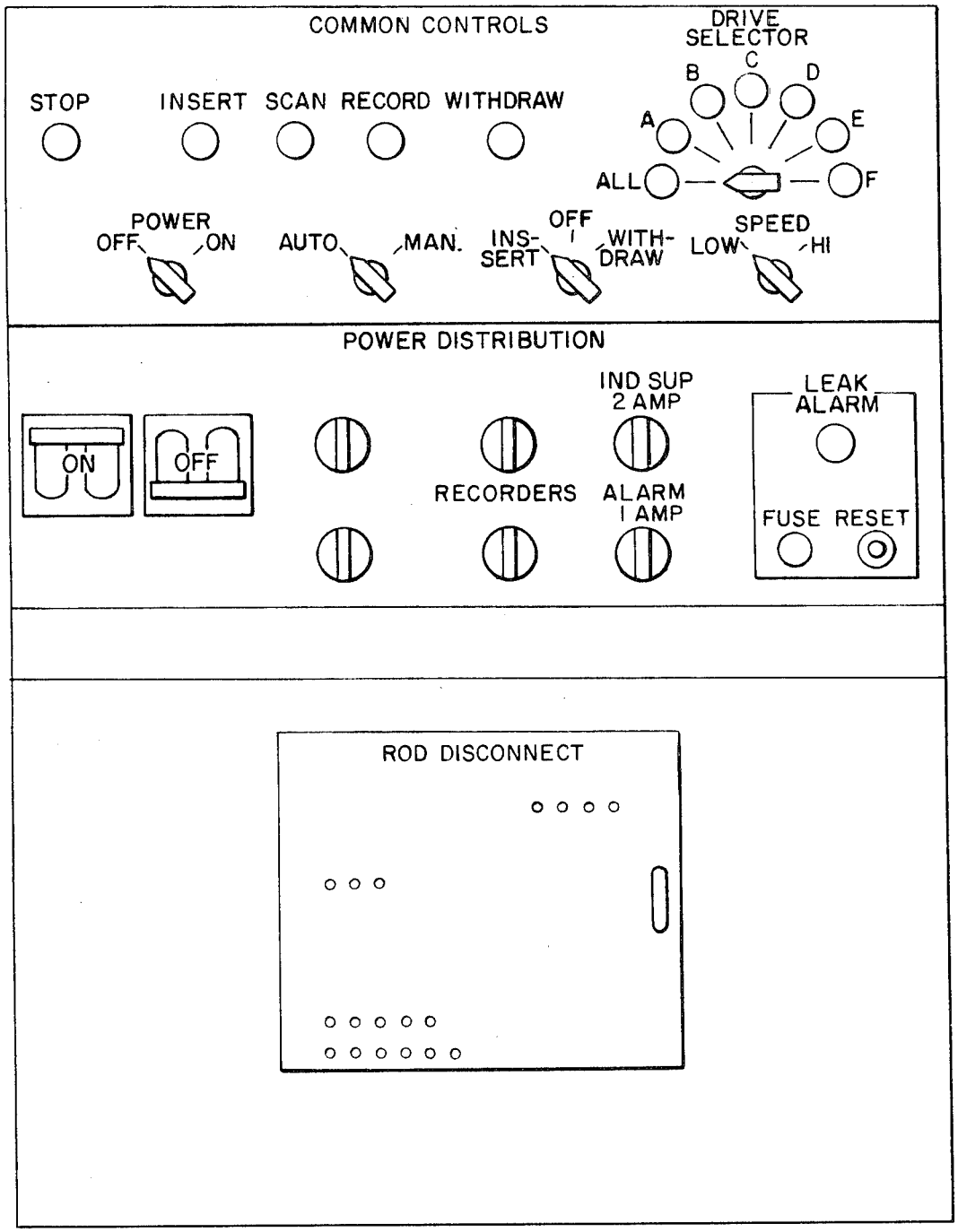
FIG. 90/1C

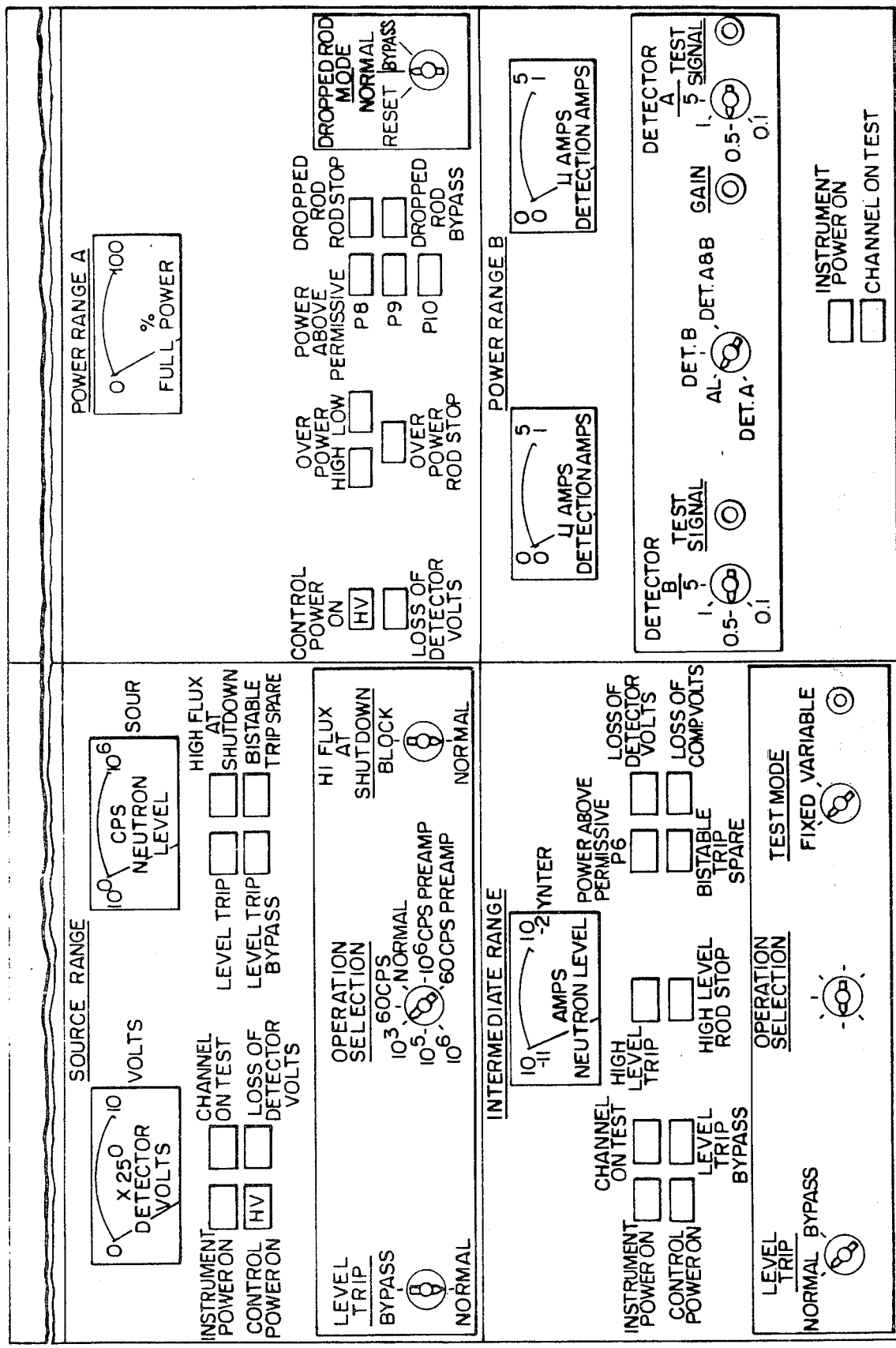
FIG. 9O/2A

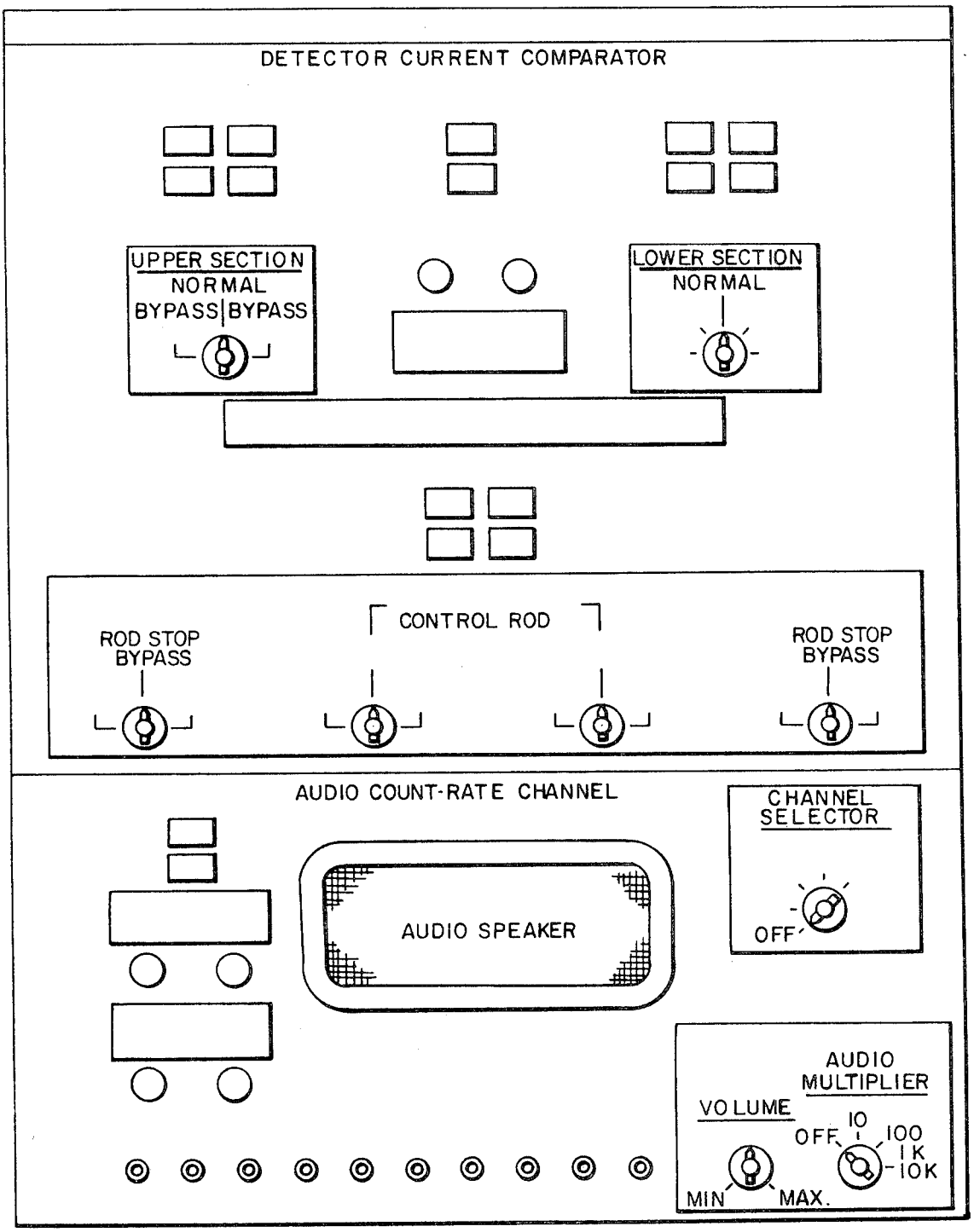
FIG. 90/2B

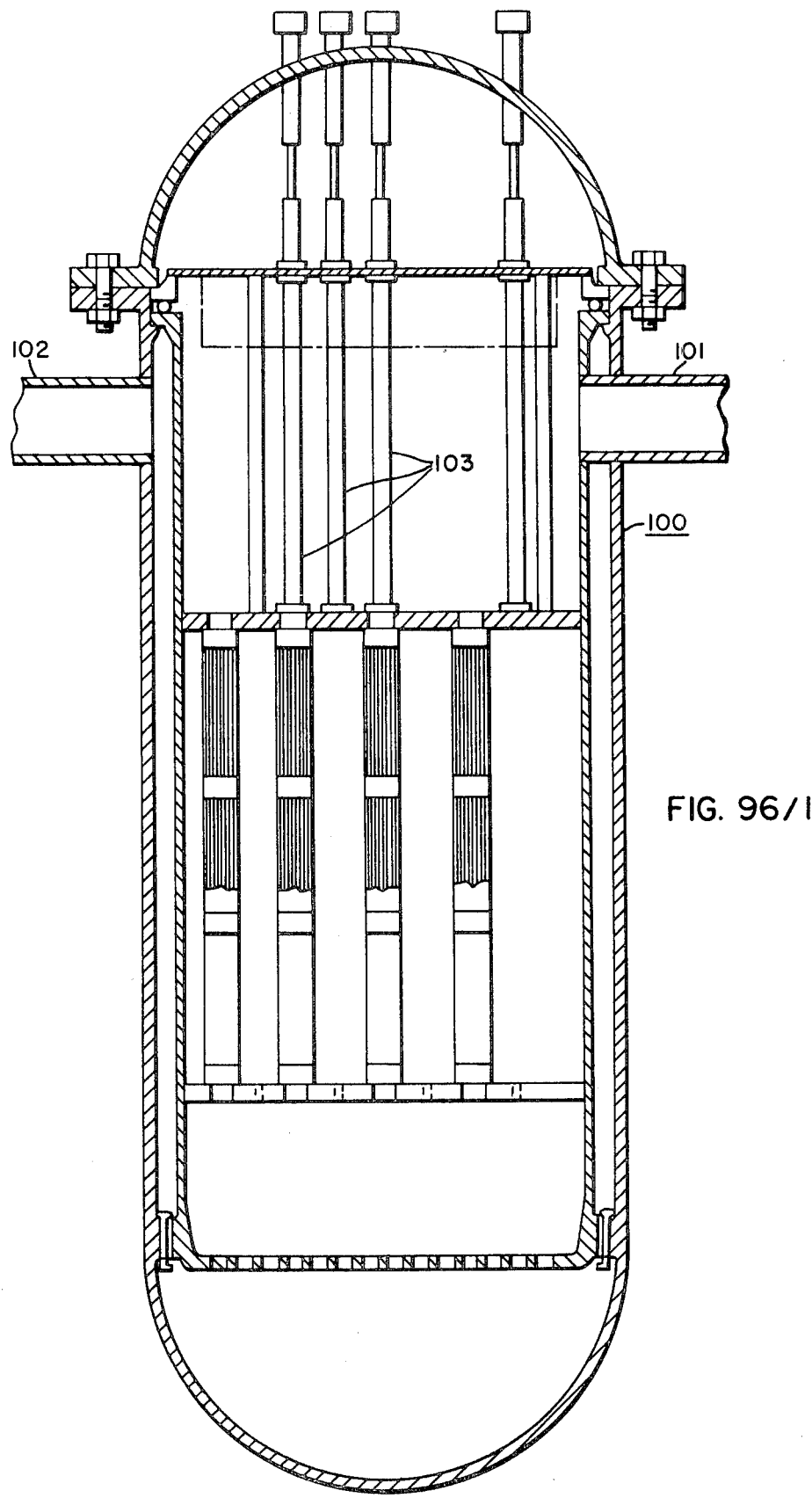
FIG. 96/1

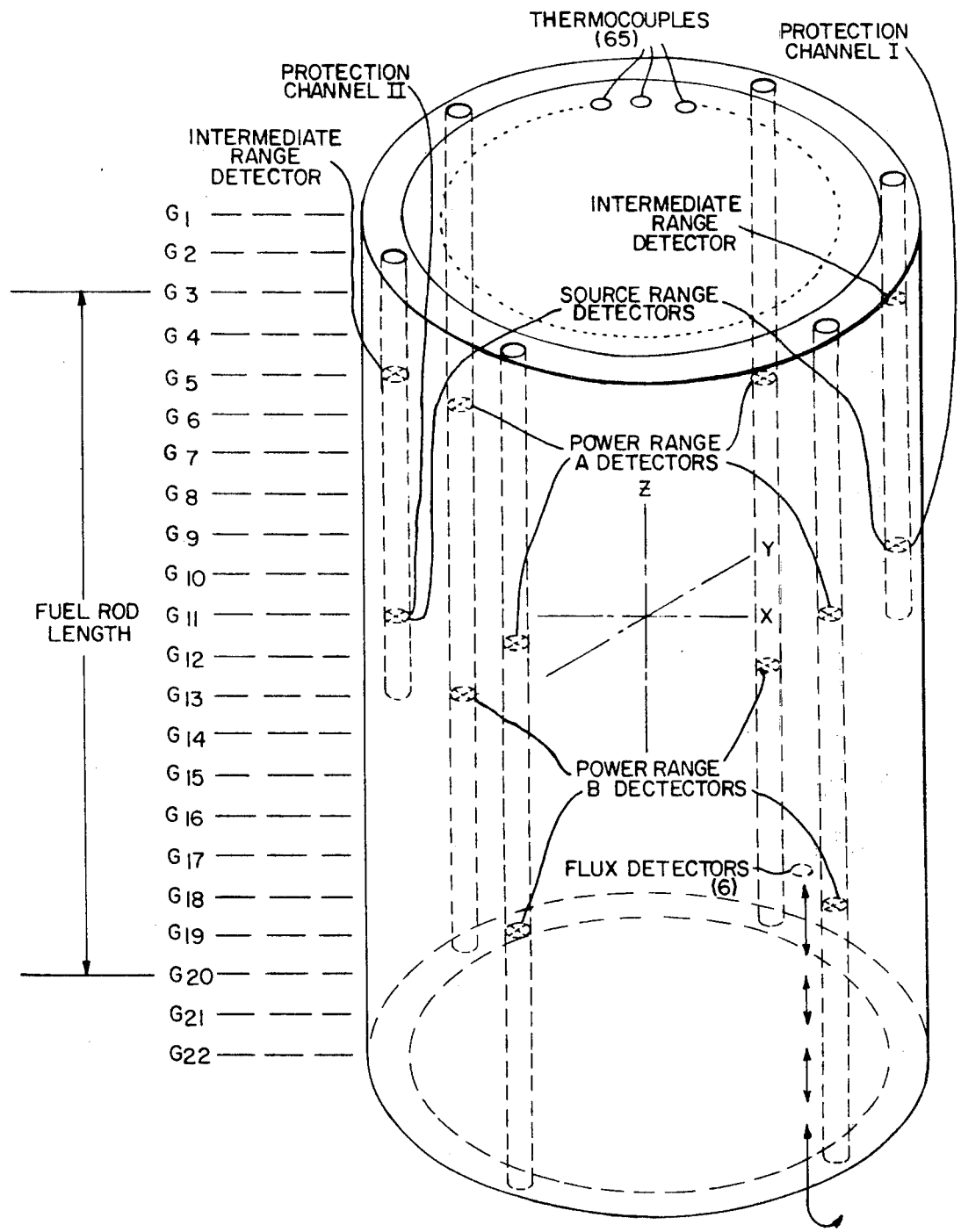
FIG.96/2

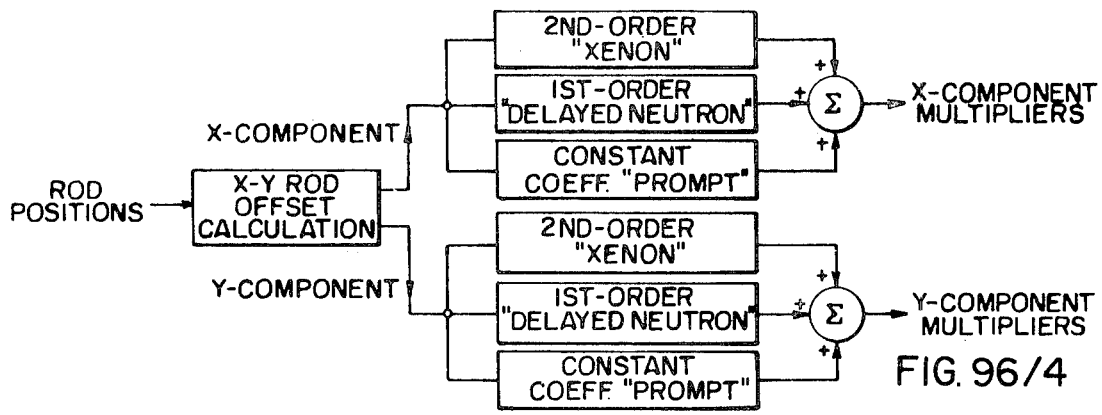
FIG. 96/4
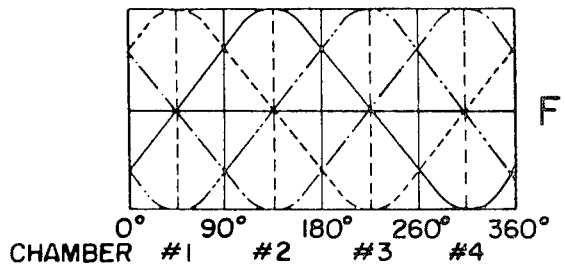
FIG. 96/5
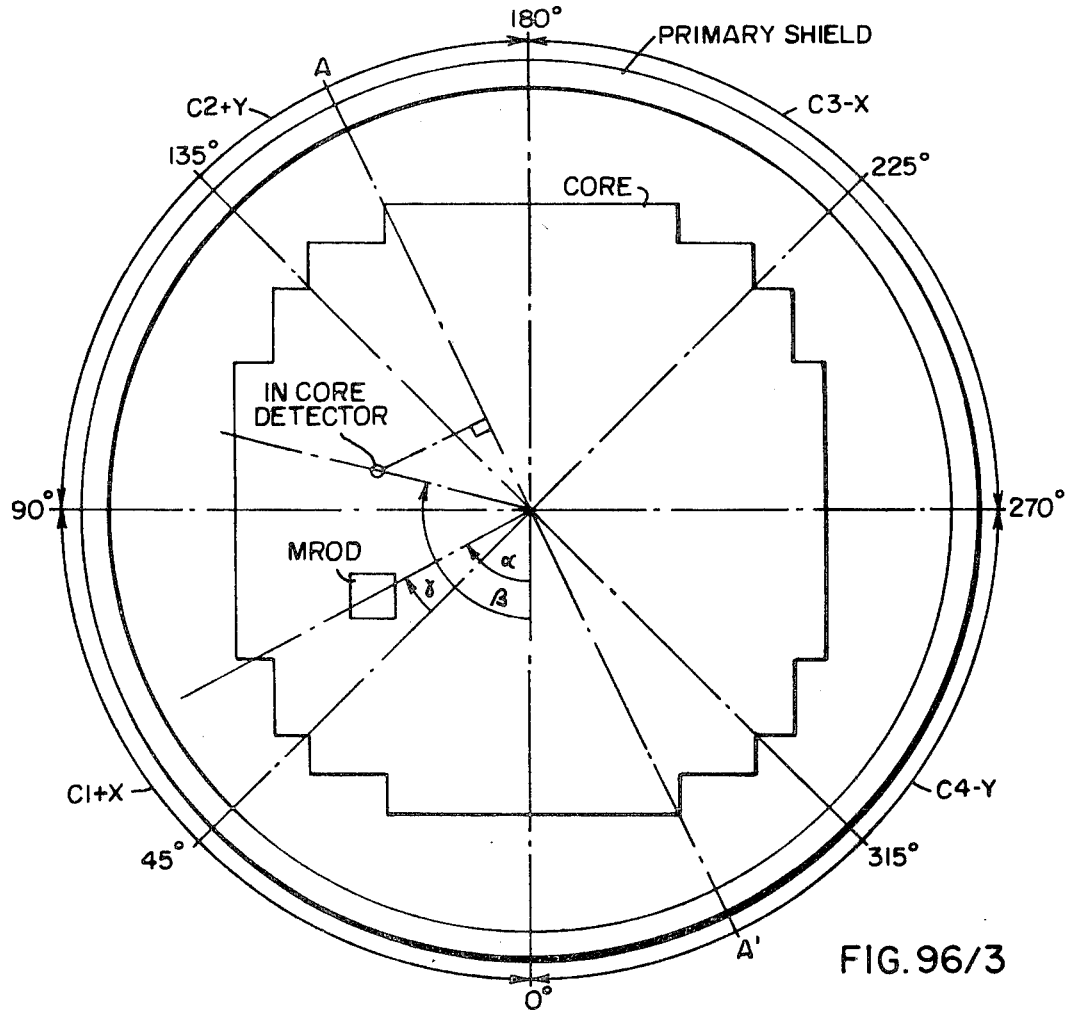
FIG. 96/3

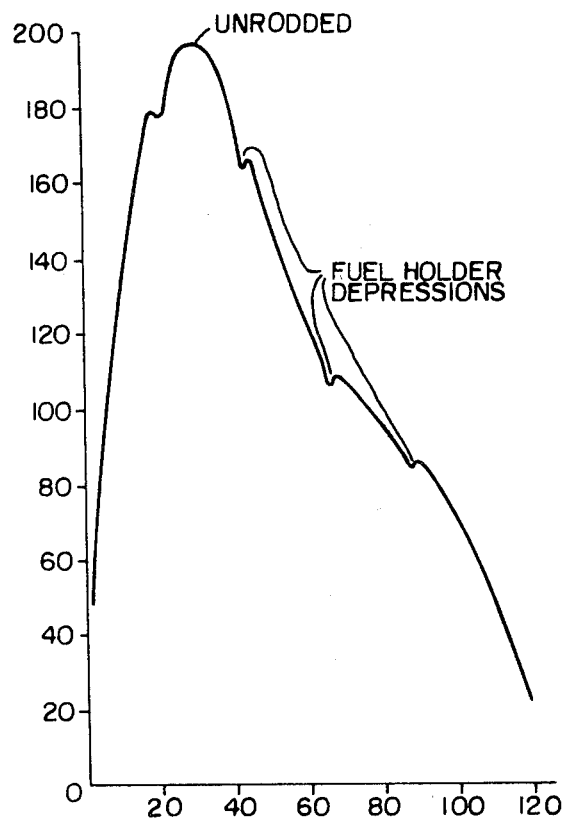
FIG. 96/9
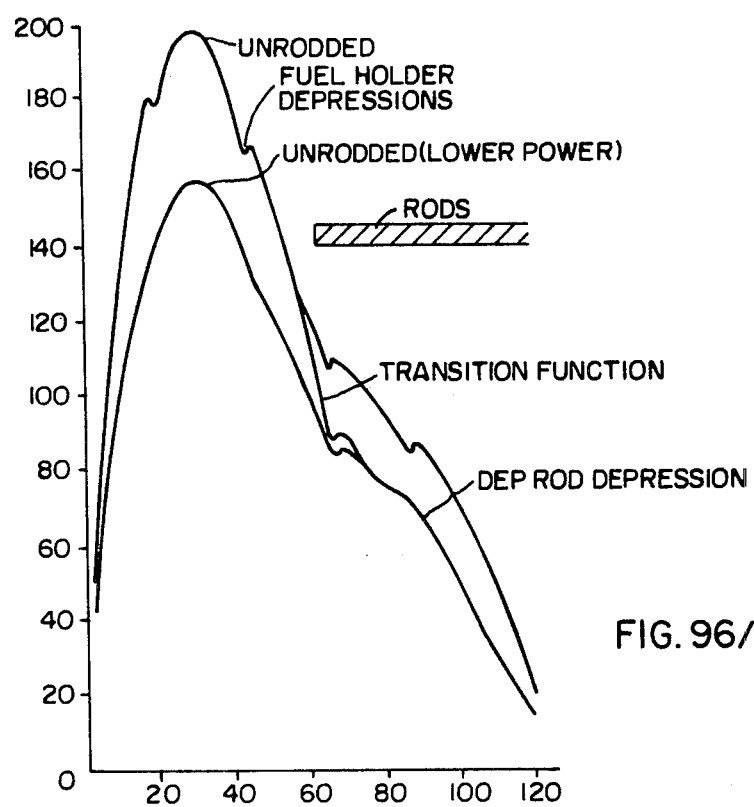
FIG. 96/10

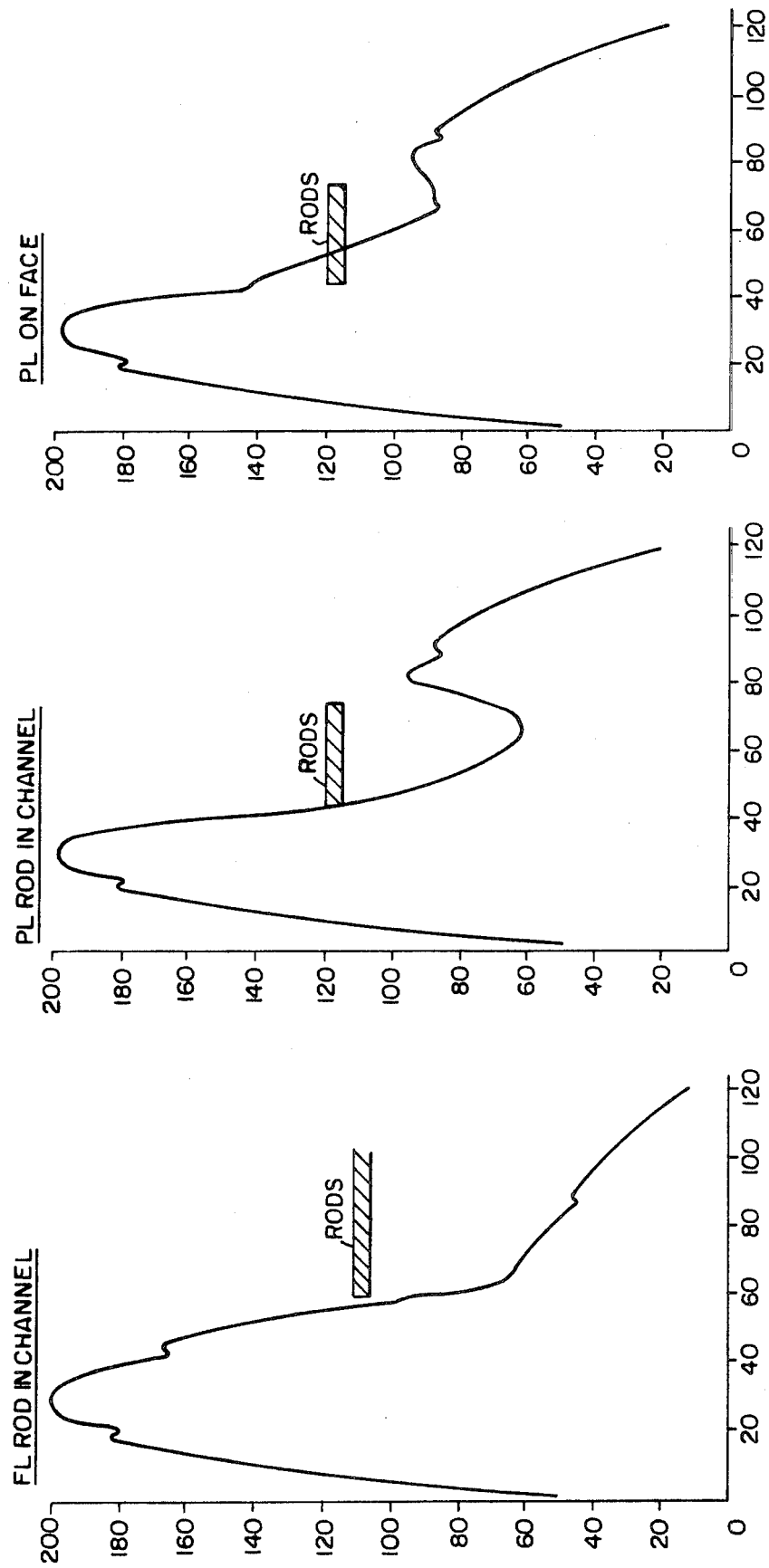
FIG. 96/13
FIG. 96/12
FIG. 96/11

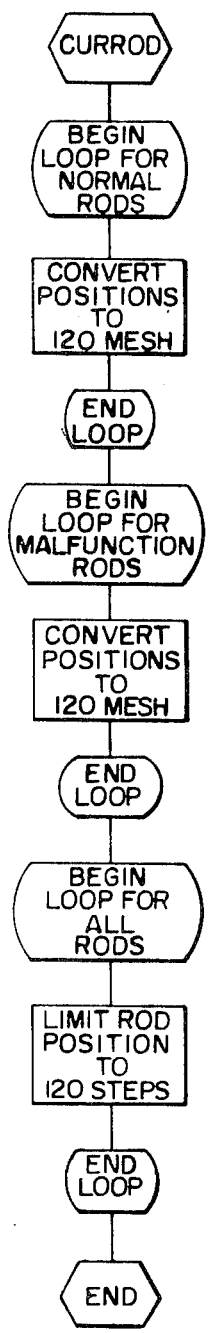
FIG. 96/14
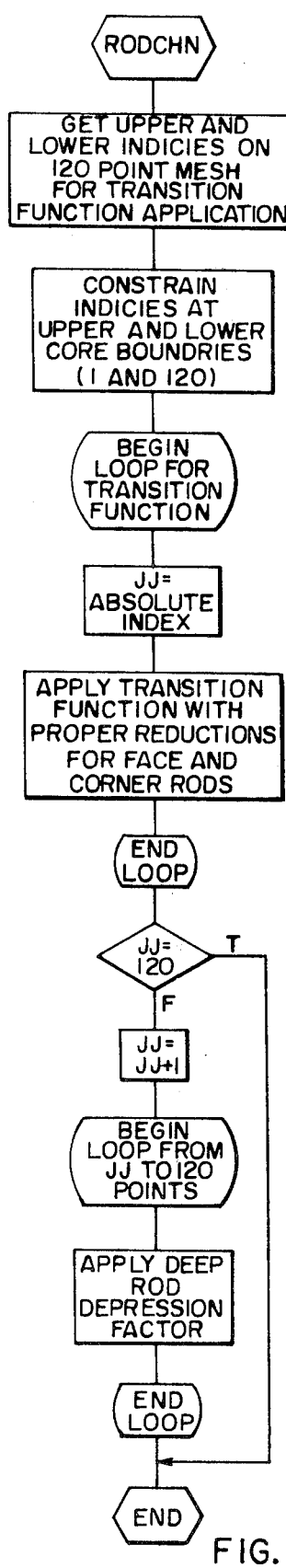
FIG. 96/15
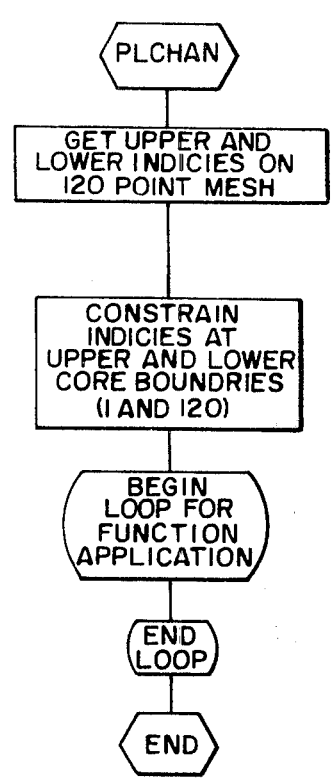
FIG. 96/16
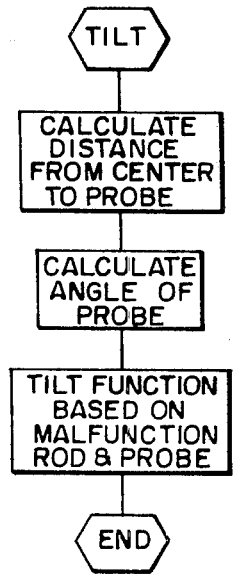
FIG. 96/17

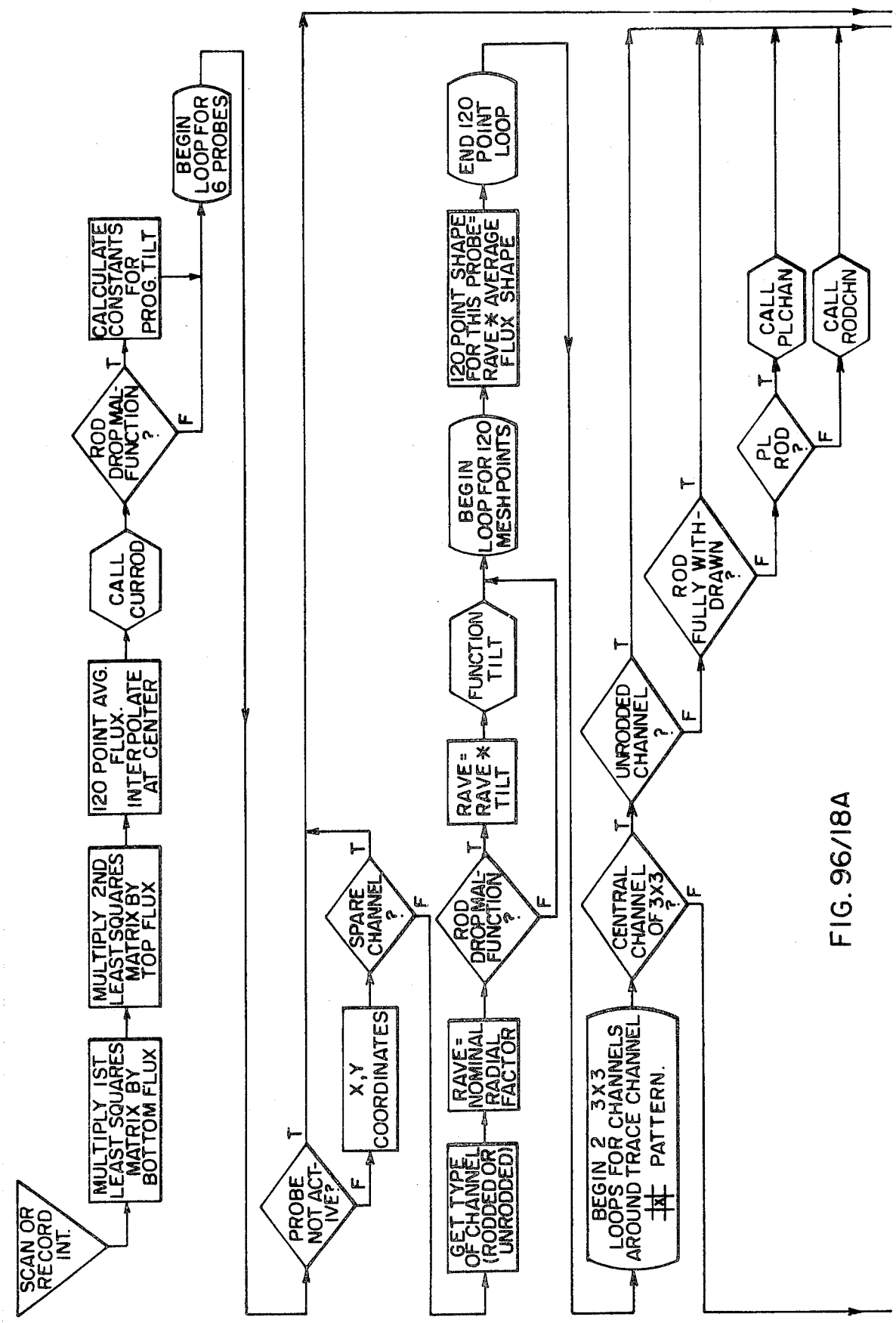
FIG. 96/18A

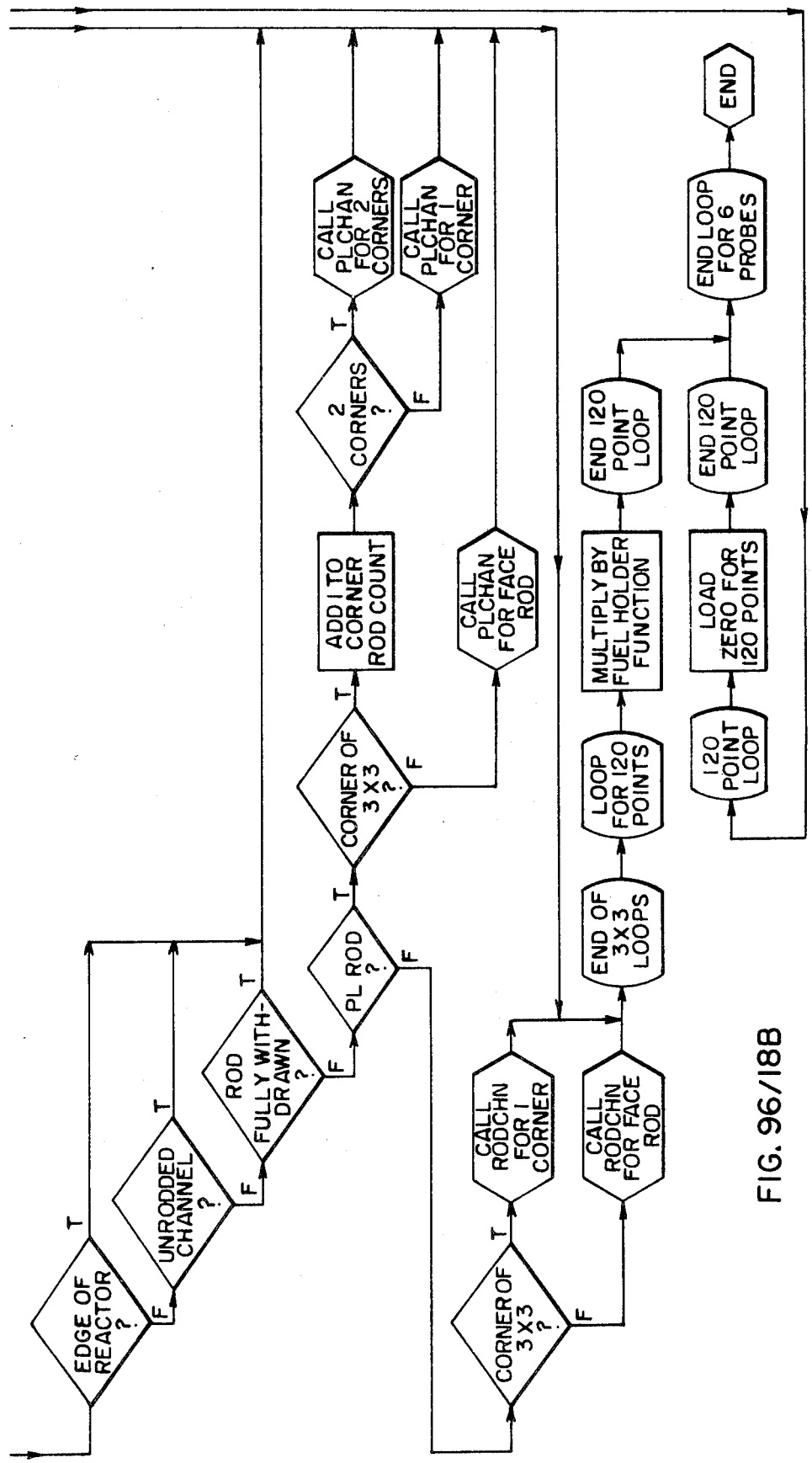
FIG. 96/18B

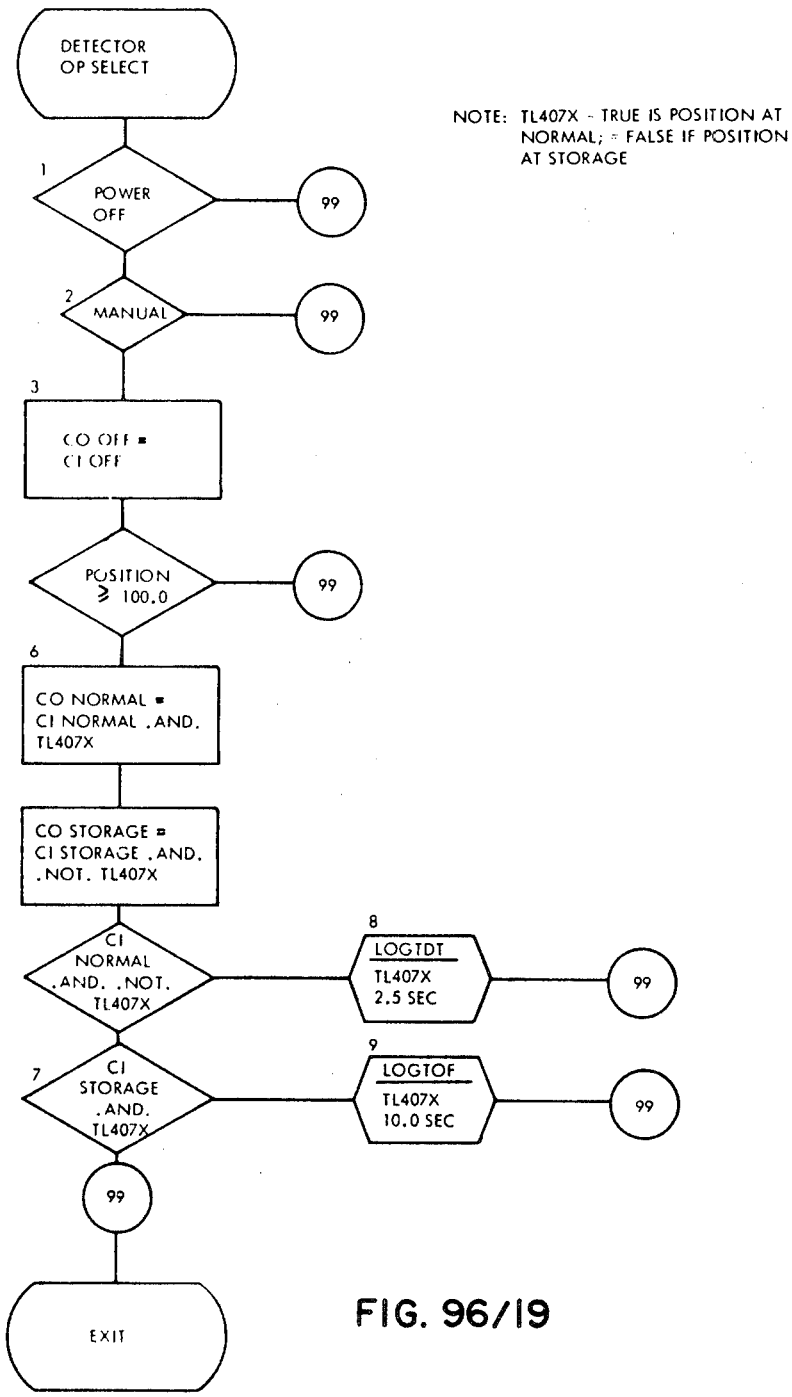
FIG. 96/19

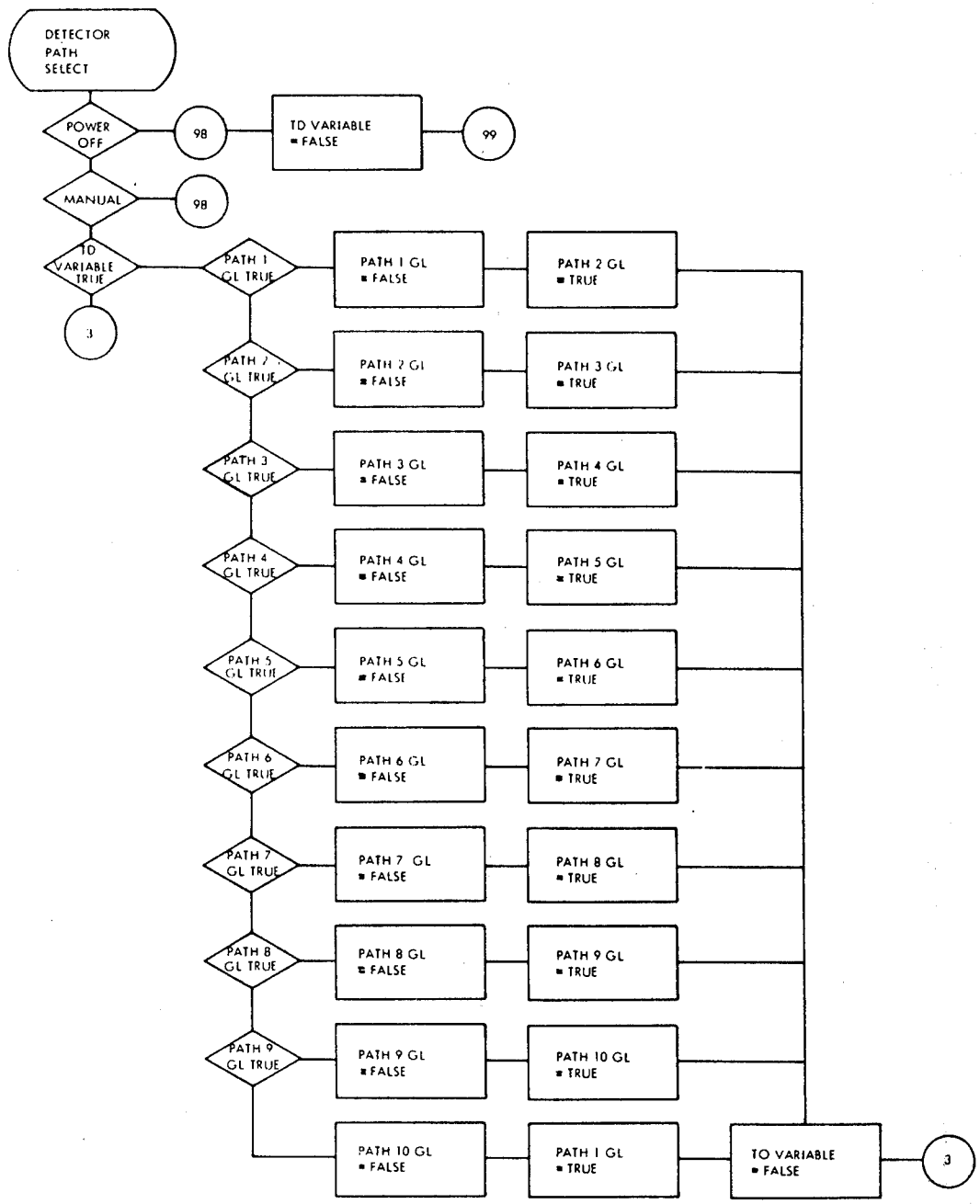
FIG. 96/20A

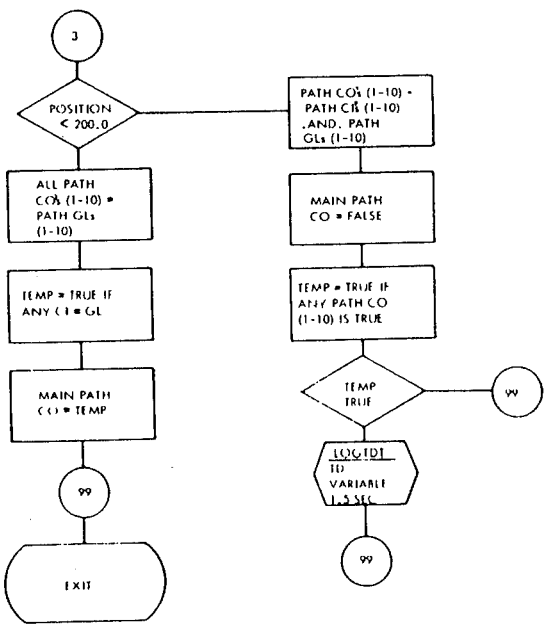
FIG. 96/20B
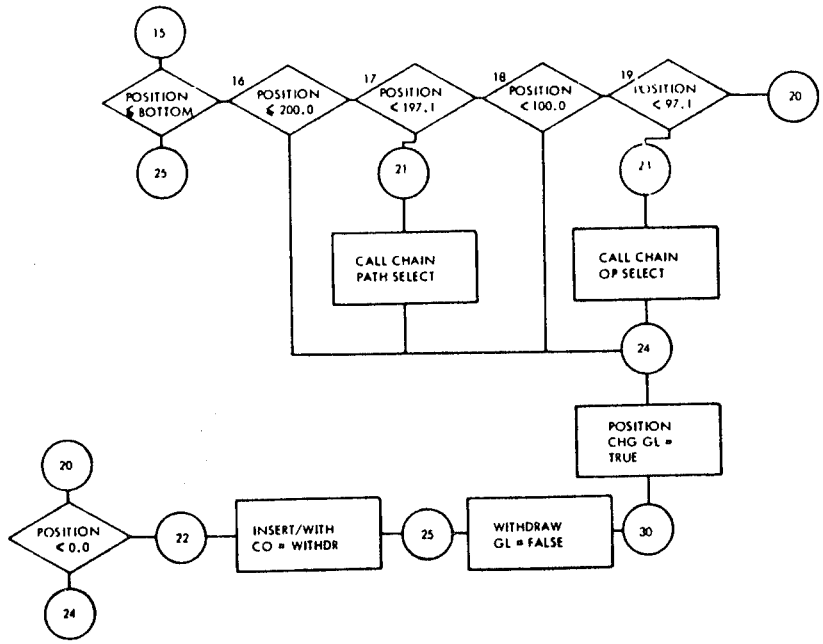
FIG. 96/26B

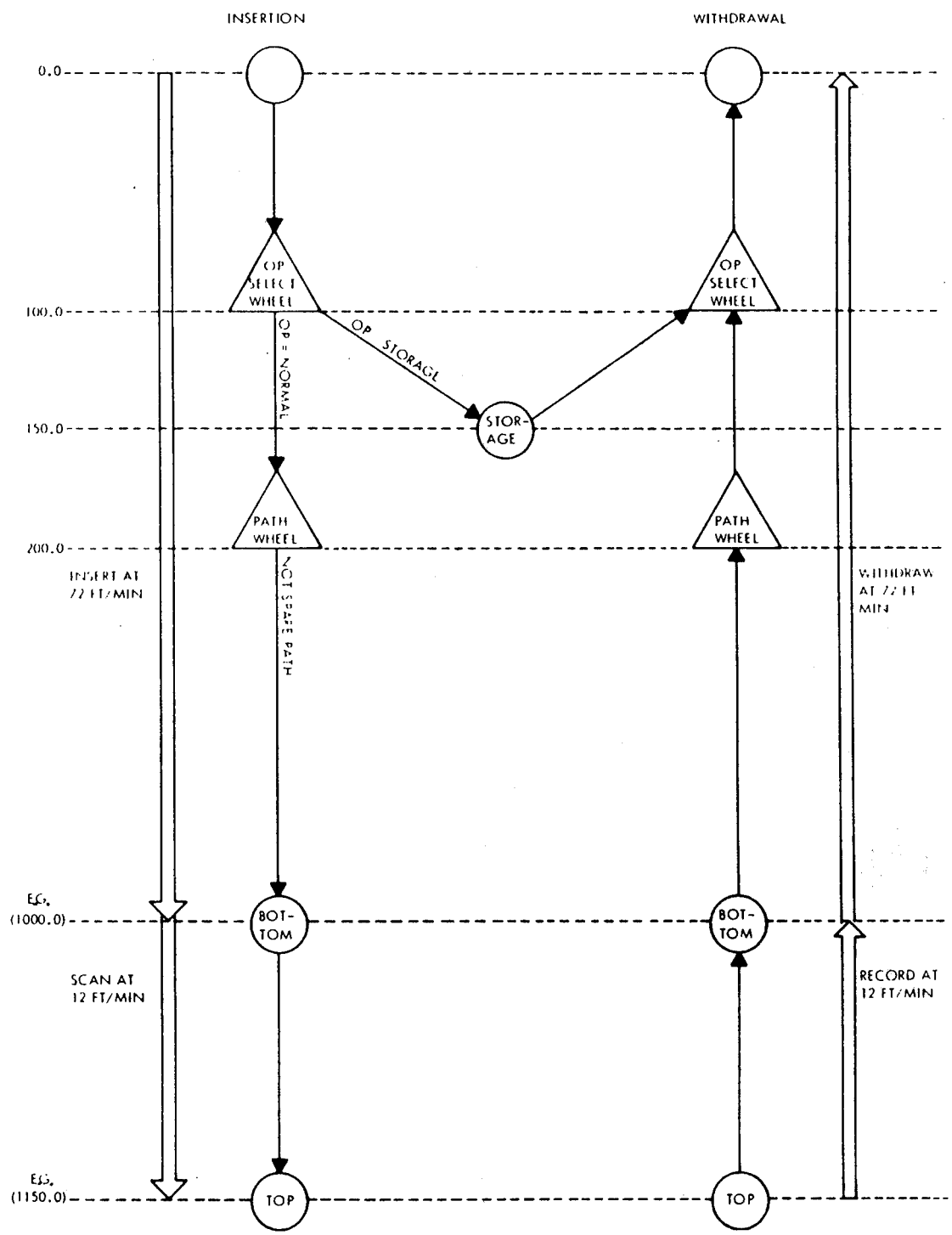
FIG. 96/21

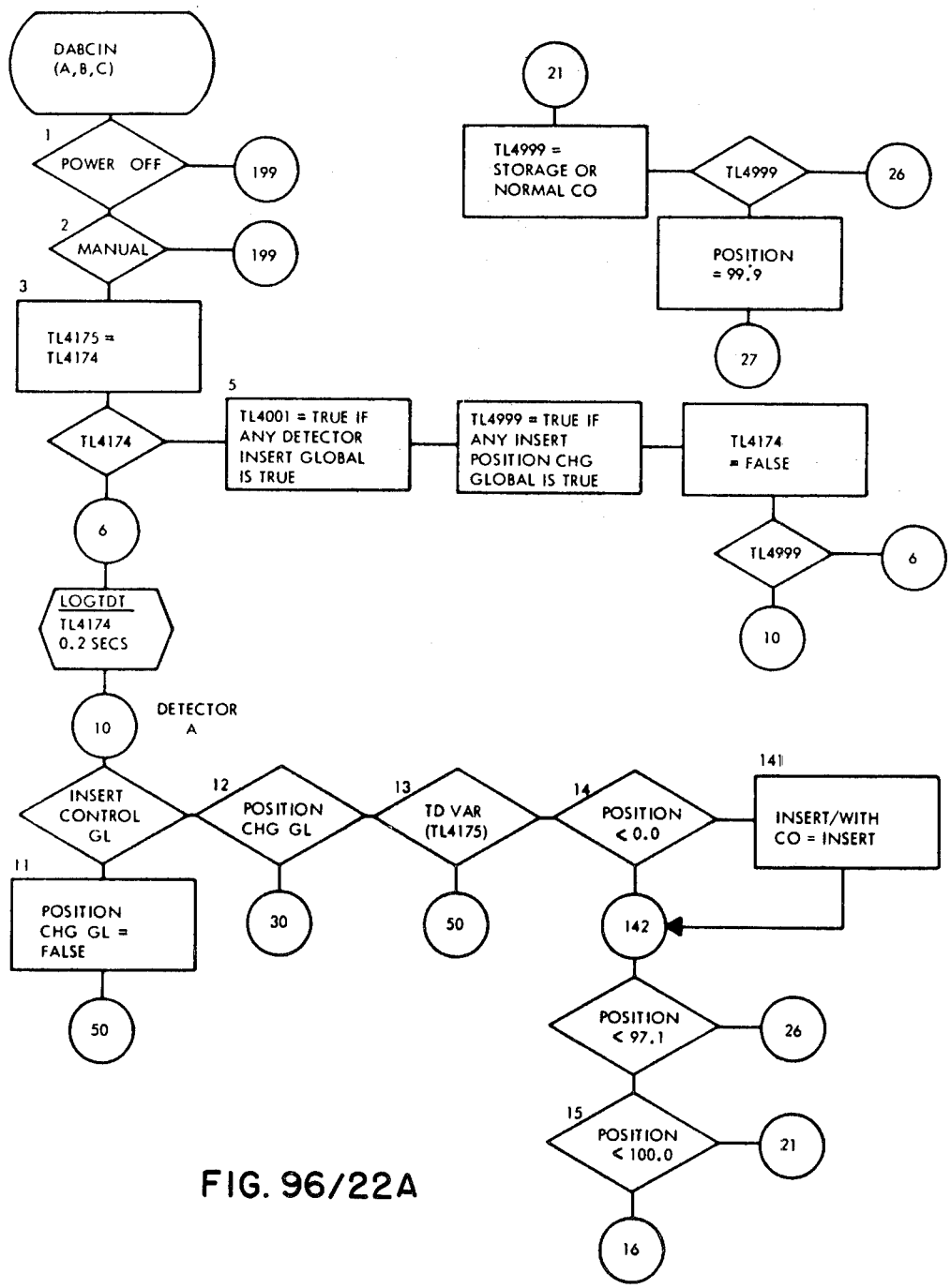
FIG. 96/22A

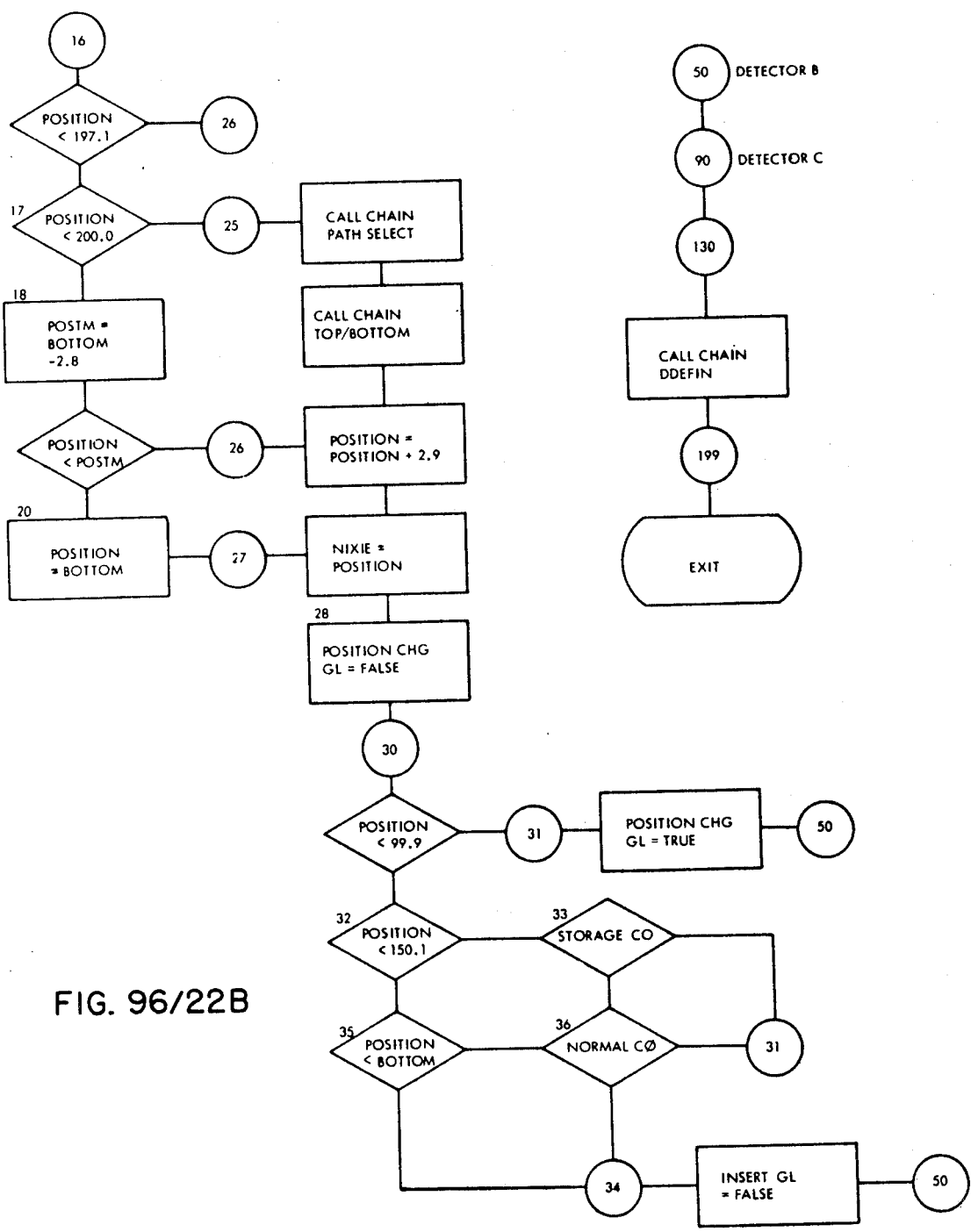
FIG. 96/22B

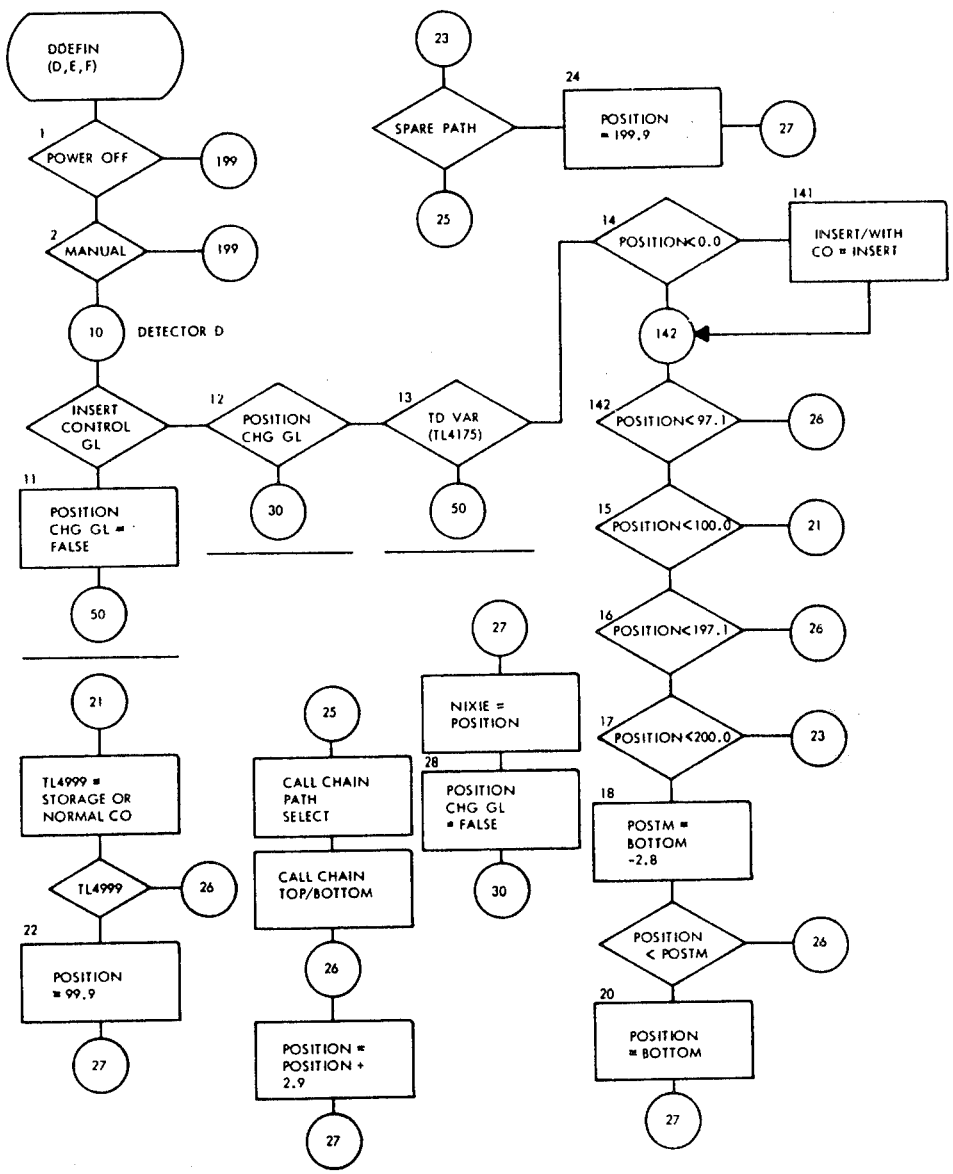
FIG. 96/23A

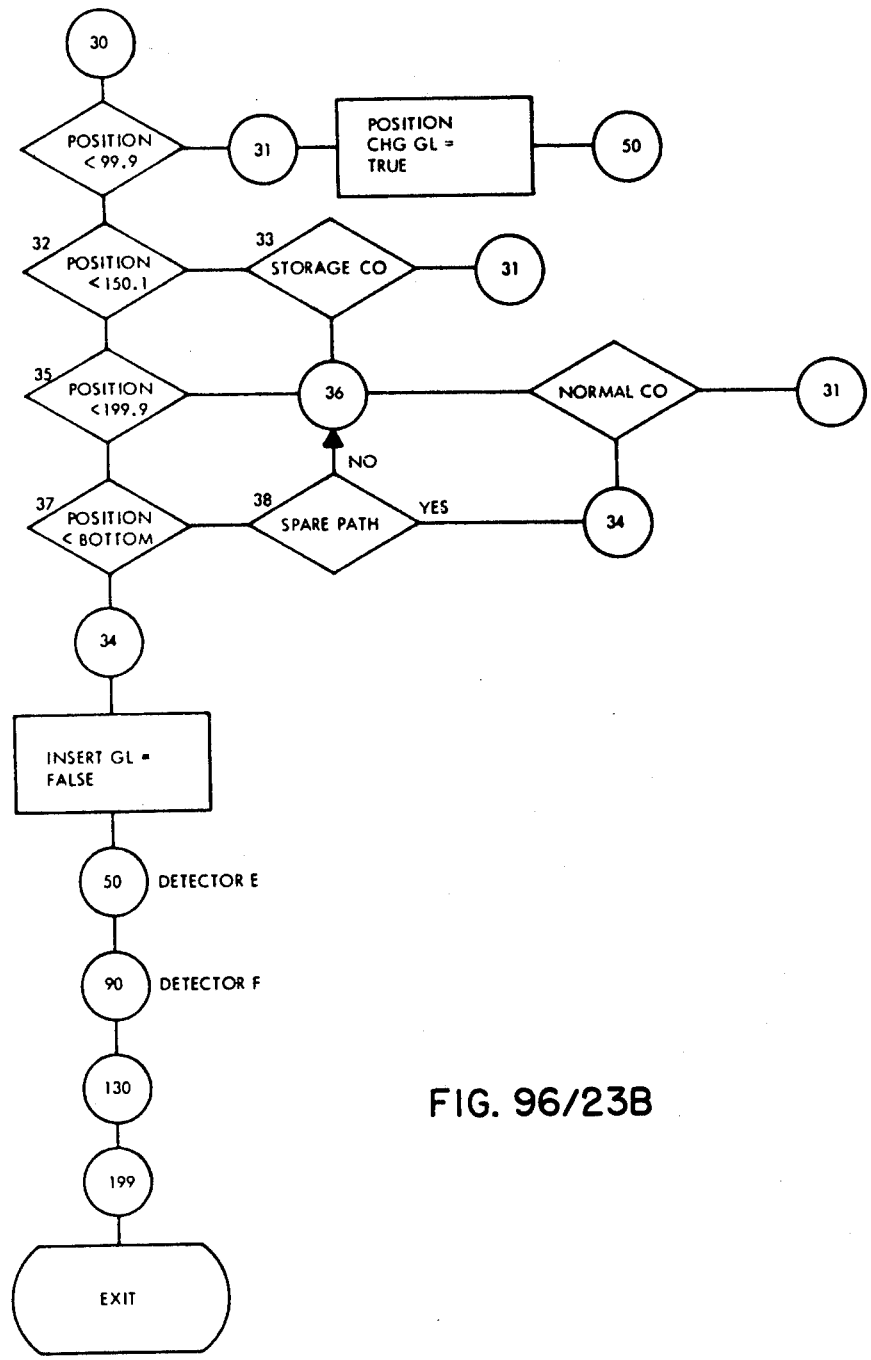
FIG. 96/23B

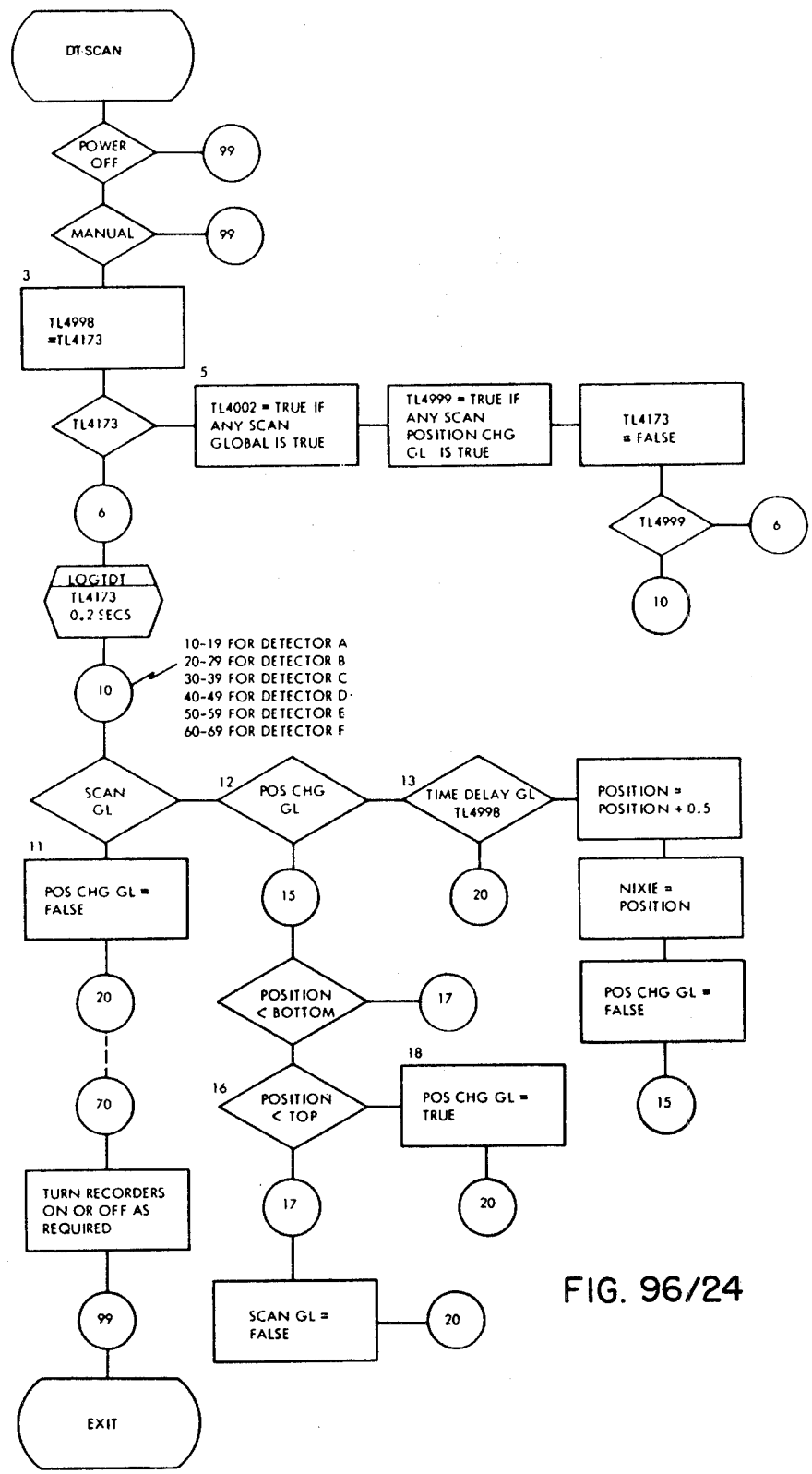
FIG. 96/24

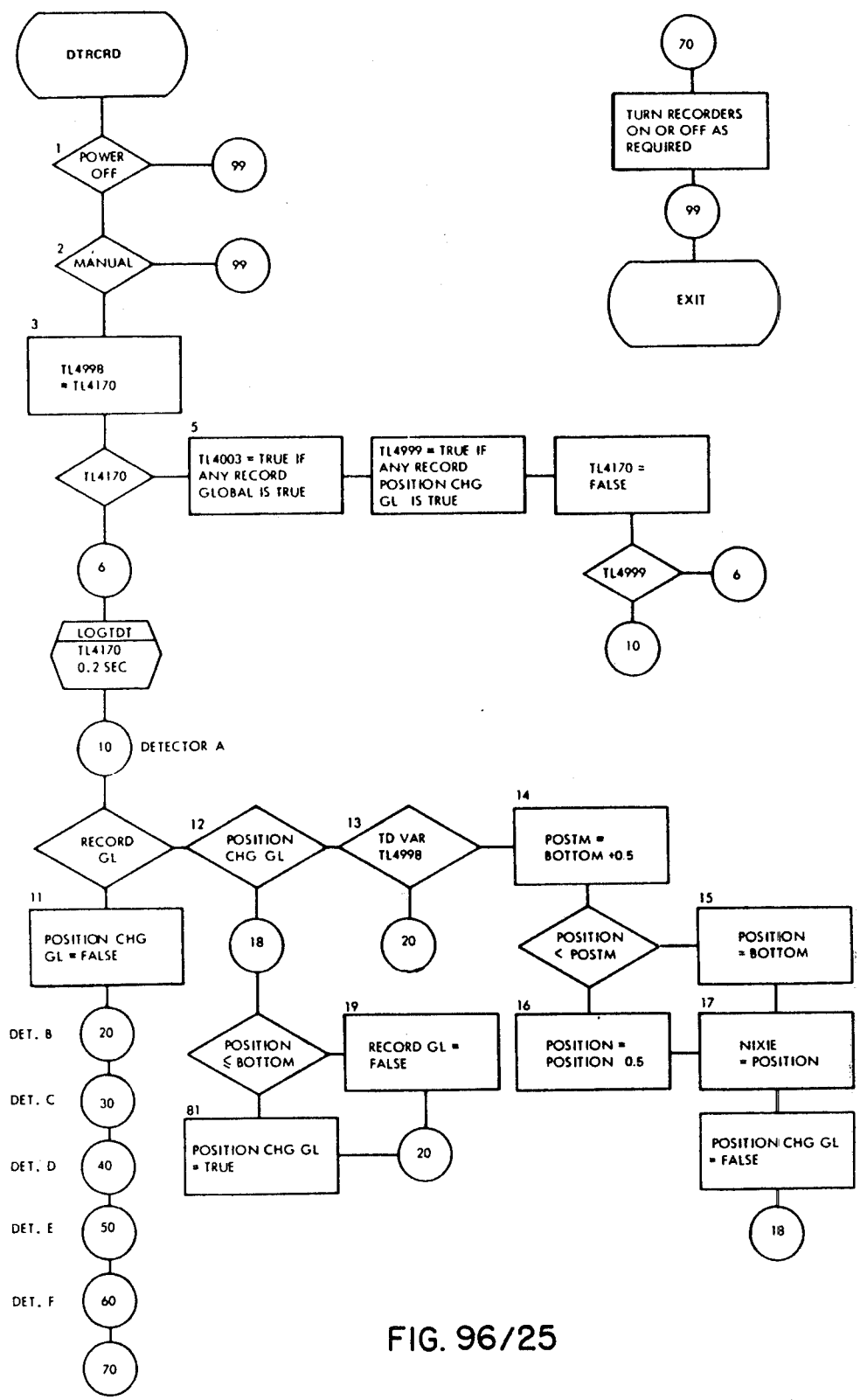
FIG. 96/25

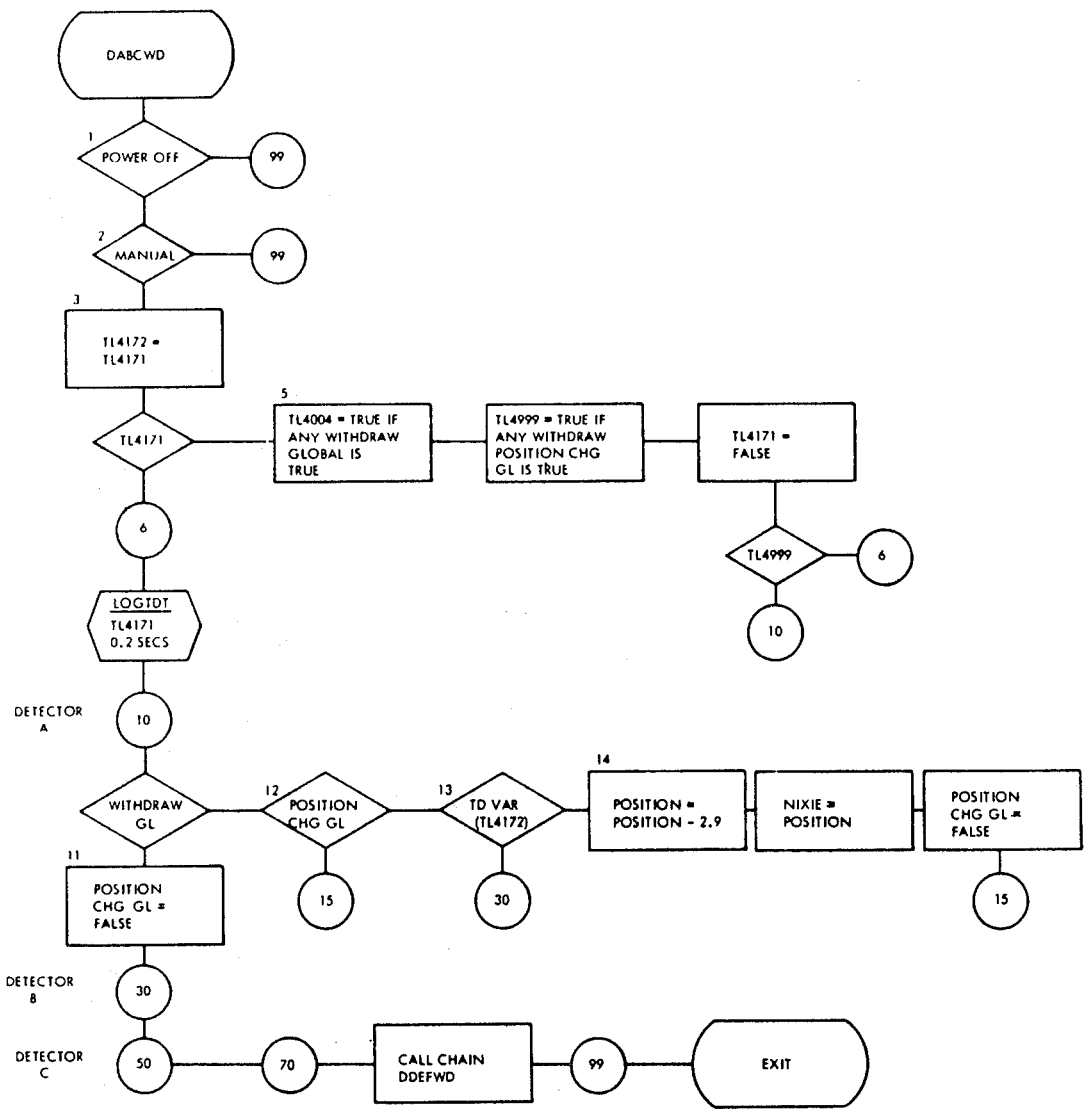
FIG. 96/26A

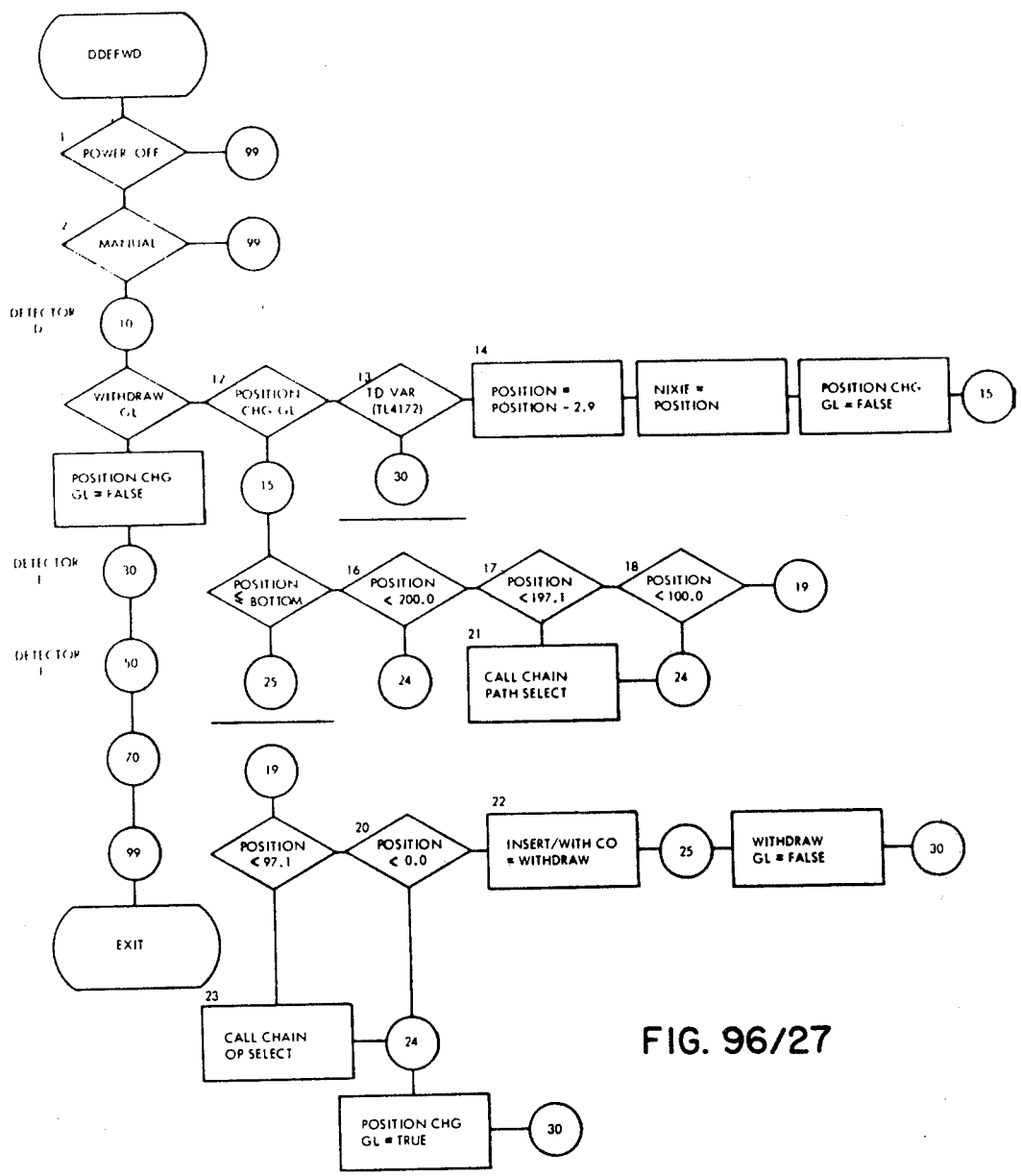
FIG. 96/27

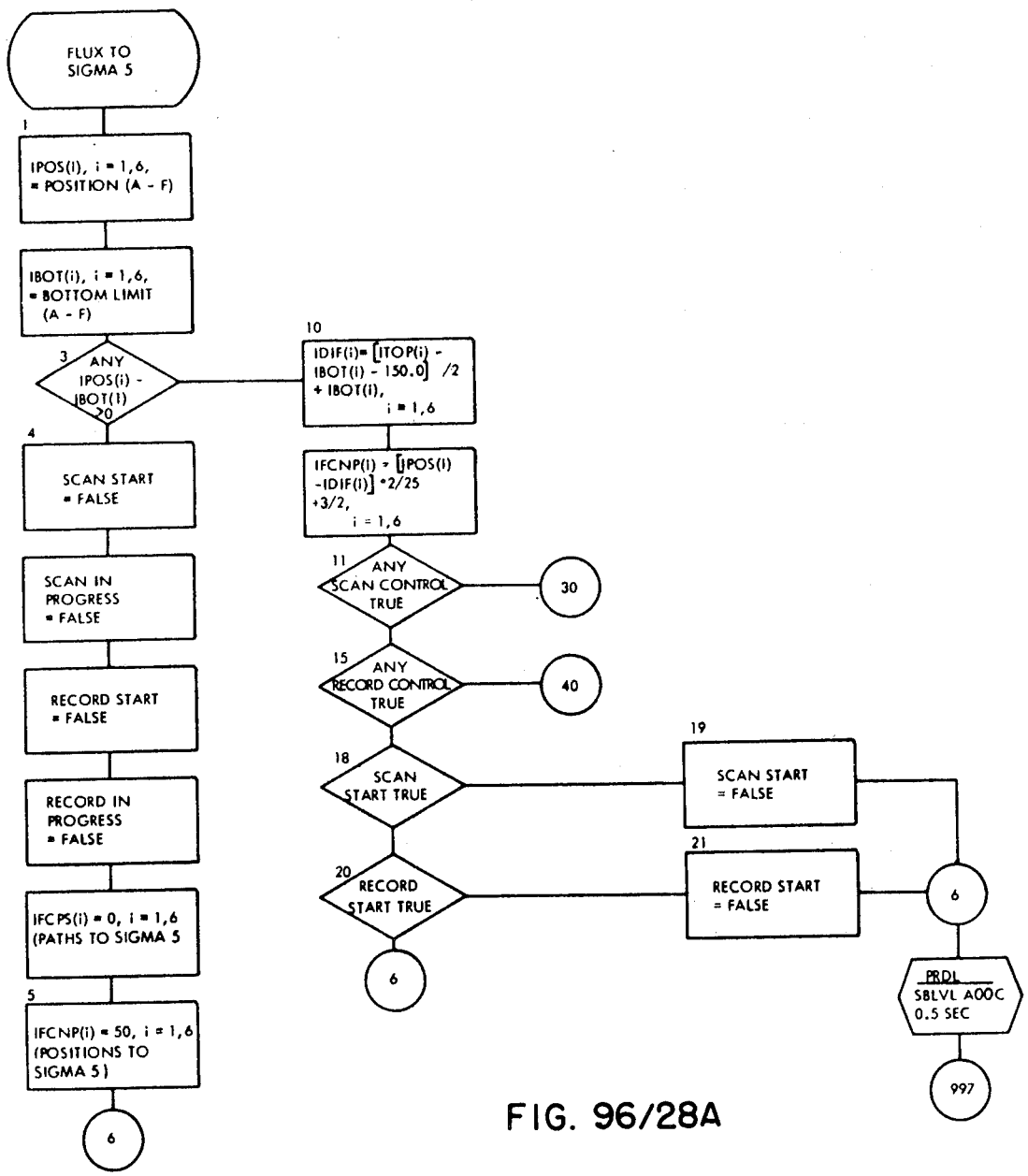
FIG. 96/28A

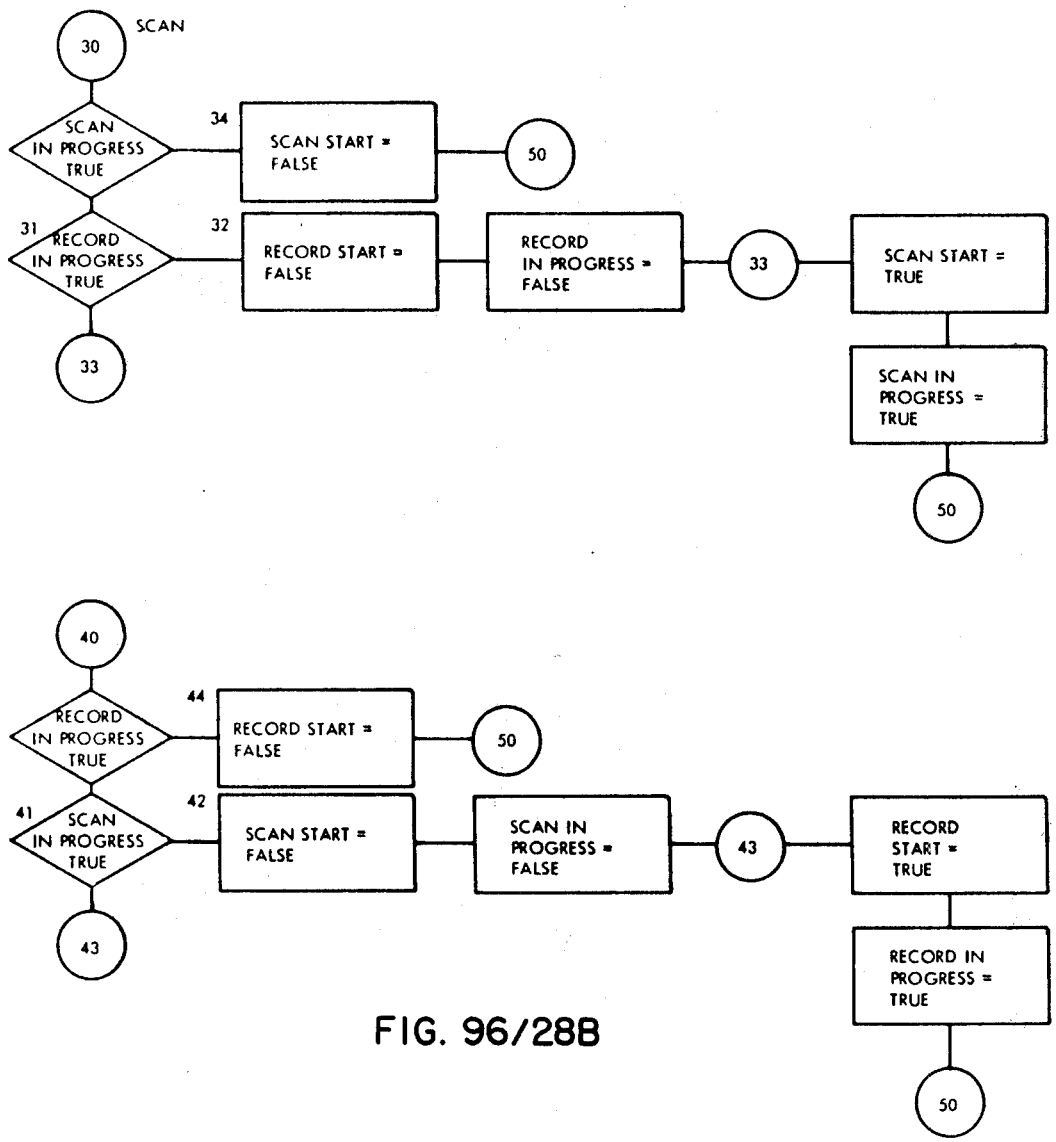
FIG. 96/28B

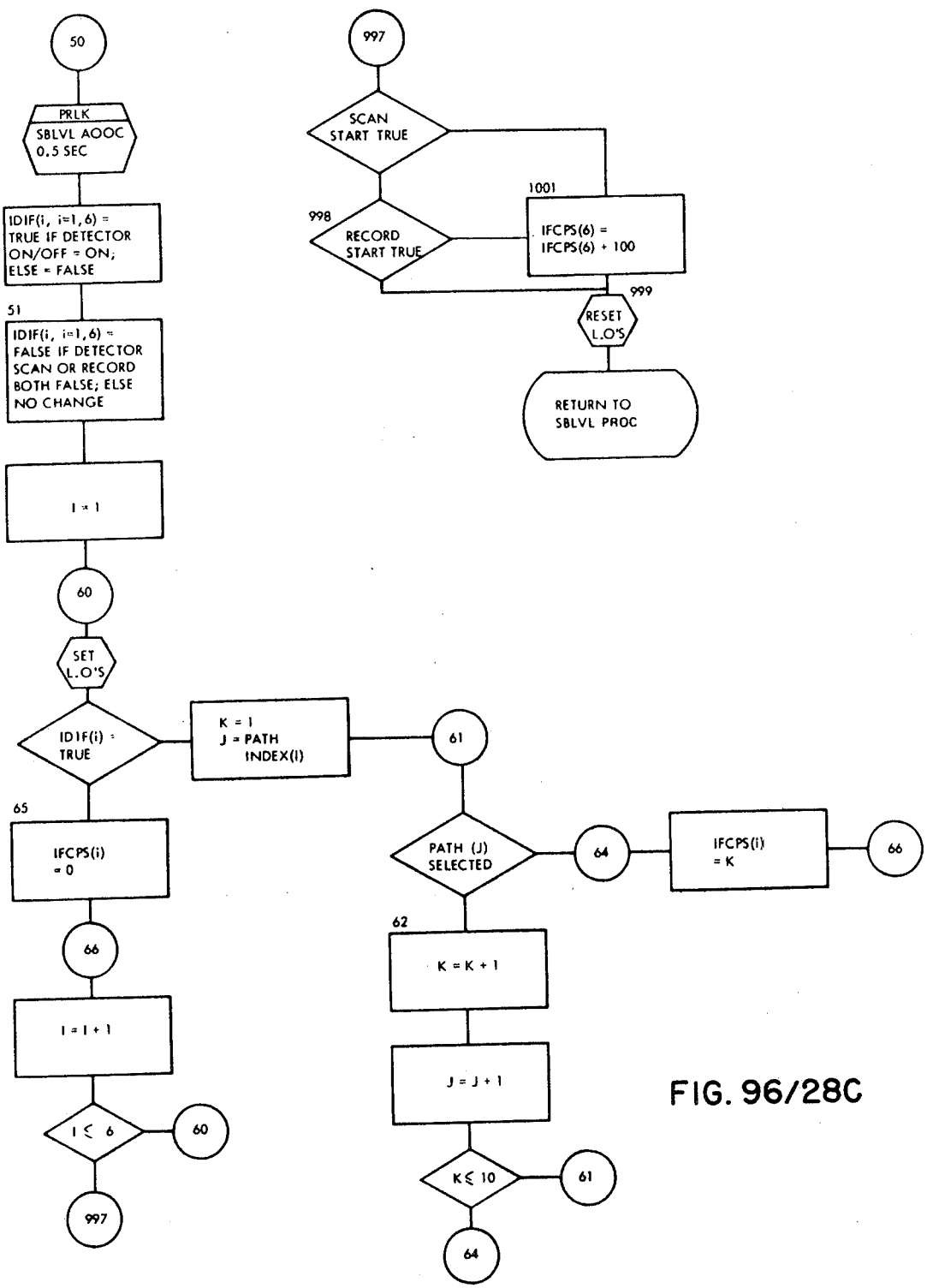
FIG. 96/28C

TRAINING SIMULATOR FOR NUCLEAR POWER PLANT REACTOR MONITORING

CROSS REFERENCE TO RELATED APPLICATIONS

Reference is made to the following concurrently filed and related patent applications which are assigned to the present assignee:

1. Ser. No. 333,901 entitled "Training Simulator For A Nuclear Power Plant" and filed by G. L. Gregg, R. E. Putman and J. W. Gomola filed Feb. 23, 1973 in the U.S. Patent Office.
2. Ser. No. 335,286 entitled "Nuclear Power Plant Training Simulator System And Method" and filed by R. W. Ferguson and R. E. Converse filed Feb. 23, 1973 in the U.S. Patent Office.
3. Ser. No. 335,295 entitled "Nuclear Power Plant Training Simulator Modeling Organization And Method" and filed by W. H. Alliston filed Feb. 23, 1973.
4. Ser. No. 335,288 entitled "Training Simulator For Nuclear Power Plant Reactor Control Model And Method" and filed by F. R. Czerniejewski filed Feb. 23, 1973.
5. Ser. No. 335,294 entitled "Training Simulator For Nuclear Power Plant Reactor Coolant System And Method" and filed by W. H. Alliston and A. A. Desalu filed Feb. 23, 1973.
6. Ser. No. 335,285 entitled "Engineered Safeguards Systems And Method In Nuclear Power Plant Training Simulator" and filed by A. A. Desalu filed Feb. 23, 1973.
7. Ser. No. 335,391 entitled "Fluid Distribution Network And Steam Generators And Method For Nuclear Power Plant Training Simulator" and filed by W. H. Alliston, S. J. Johnson and B. A. Mutafelija filed Feb. 23, 1973.
8. Ser. No. 335,183 entitled "Training Simulator And Method For Nuclear Power Plant Heater And Non-Linear Modeling" and filed by B. A. Mutafelija filed Feb. 23, 1973.
9. Ser. No. 335,293 entitled "Secondary System Modeling And Method For A Nuclear Power Plant Training Simulator" and filed by S. J. Johnson filed Feb. 23, 1973.
10. Ser. No. 335,184 entitled "Data Communication And Method For Real-Time Plural Computer Configuration" and filed by F. G. Willard, N. Slavin and L. S. Schmitz filed Feb. 23, 1973.

BACKGROUND OF THE INVENTION

The present invention relates to the real-time full scope simulation of the dynamic operation of a nuclear powered electrical generating plant for training plant operators.

The increasing demand for well-trained power plant operators together with the complexity of modern day power plants, has led to the realization that the simulator is the most effective tool for such training.

Also, with advancements in nuclear power plant technology, experienced operators from time-to-time need retraining in order to be competent. An actual nuclear plant cannot provide the operator with the required experience, such as starting up, changing load, and shutting down, for example, except after years of experience; and even then, it is unlikely that he would observe the effect of important malfunctions and be able to take the best corrective procedures.

Although simulators have been used for many years, in power plant design, it is only recently that they have been used for power plant operator training. An article in the July 22, 1968 issue of "Electrical World", entitled "Nuclear Training Center Using Digital Simulation" briefly describes the installation of a boiling water reactor plant simulator. An article in the same publication in the Oct. 6, 1969 issue entitled "Huge Simulator to Ready More Reactor Operators" discusses the proposed installation of a pressurized water reactor simulator. In Volume 10, No. 5 of the publication "Nuclear Safety" published during September and October, 1969 is an article entitled "Training Nuclear Power Plant Operators With Computerized Simulators"; and in the June, 1972 issue of the publication "Power Engineering" there is an article entitled "Simulators" which describes a number of power plant operator training simulators presently in use or proposed.

Design simulators usually cover only a small part of the process, and may run slower or faster than realtime; while training simulators must operate and respond in a manner identical to the actual plant. A design simulator may involve only a narrow range of conditions, while a training simulator must simulate from "cold" shutdown to well beyond normal operating conditions. A design simulator usually involves only the major process, while a training simulator should cover every auxiliary system with which the plant is concerned.

Training simulators presently in use for operator training, which are more or less complete in their simulation utilize a digital computer that is connected to control consoles that are identical in operation and appearance to the plant being simulated. Also, an instructor's console is connected to control the simulator, introduce malfunctions, initialize the simulated plant at selected states of operation, and perform other functions useful for training purposes and control of the simulator. These computers have been of the same type used for aircraft training in some instances and process control in another.

The full scope simulation of a nuclear power plant for operator training is of such extensive scope that it is advantageous to provide as many modeling simplifications as possible within the limits of steady state and transient accuracy. The simulation of the power plant must be of sufficient detail and accuracy that the operator cannot distinguish between the behavior of the simulator and that of the actual plant under conditions of cold startup, hot restart, normal load changes, and numerous malfunctions causing a load cut-back or a complete shutdown.

It is understood that the source of energy for such a power plant is the nuclear reactor, and the dynamics and operation of practically every subsystem in the power plant is affected by small variations in reactor operation. Thus, for training operators, that portion of the simulation relating to the nuclear reactor must provide for extreme overall accuracy in its response during operation not only to the effect of the normal operation of both part length and full length control rods, but also must provide extreme accuracy in its response to the effect of the abnormal operation of such control rods as a result of a malfunction, for example. Further, in order to be complete, the simulator must provide for the effect of xenon, boron, decay heat and delayed neutrons and their precursors in a spatially distributed and timed dependent fashion on the operation of the reactor. Further, the effect of water temperature on power, and the time in life of the reactor core should be simulated. Finally, in order to be effective as a training device, the simulator must provide for the accurate operation of all of the nuclear instrumentation apparatus that is provided in the actual plant.

In view of the above, the nuclear instrumentation provides the operator with an intimate knowledge of the physical states of the reactor in three dimensions under all conditions of operation. Thus, in order for the simulator to be effective, the reactor model must be structured such that it provides accurate physical values in all modes of operation from near zero power to well beyond operating limits for the operation of instrumentation, that includes the measurement of nuclear flux at diametrically opposed locations at the periphery of the core adjacent both the upper and lower portions of the core; the measurement of temperature at a multitude of spaced locations in a horizontal plane that is normal to the vertical axis of the core; the difference between the total nuclear flux in the lower portion of the core and the upper portion of the core; and the rate of change of flux in the core with respect to time. Further, the simulator should be capable of accurately simulating the operation of a pen recorder that traces a plurality of flux paths from the top to the bottom of the core at a plurality of spaced locations in the core spaced from and parallel to the vertical axis of the core.

Thus, to be complete and provide accurate response to the instrumentation, the reactor model must provide accurate data throughout its three-dimensional core representation, and yet be kept as simple as possible, utilizing a minimal amount of computer space and time. An article in the March, 1962 issue of "Electronic Engineering", pages 168–172 entitled "Some Design Aspects of Electronic Reactor Simulators" discusses methods of reducing the complexity of reactor simulation.

SUMMARY OF THE INVENTION

In accordance with the broad principles of the present invention, a method and system for simulating the real-time dynamic operation of a nuclear power plant is provided which utilizes apparatus wherein a plurality of control devices corresponding to the control apparatus for operating the plant provide input data to a digital computer that calculates physical values during successive time steps for simulating a three-dimensional reactor core; and the calculated values are utilized to operate monitoring devices. The simulation is characterized by calculating physical values along one axis and physical values in a plane normal to the one axis for operating indicating devices to monitor the operation in three dimensions. More specifically, the reactor model for such axes and plane includes the effect of xenon-iodine, decay heat, delayed neutrons, doppler effects of reactor fuel temperature on water temperatures and boron in its calculations. Such reactor model also provides data for simulating physical values to operate a recording device that creates a continuous path corresponding to such values between the top and bottom of the reactor core and spaced from the one axis, and an indicating device for monitoring temperature distribution in the simulated reactor core.

BRIEF DESCRIPTION OF THE DRAWINGS

FIGS. 90/1A, 90/1B, and 90/1C is a front view of a portion of the nuclear instrumentation panel for controlling and indicating flux mapping and fuel rod temperatures in accordance with the present embodiment of the invention;

FIGS. 90/2A and 90/2B illustrates a front view of a portion of the nuclear instrumentation panel for controlling and indicating the ex-core flux detection and monitoring system, and the audio count rate output;

FIG. 96/1 is a front elevation with parts broken away of a typical nuclear reactor of the type being simulated in a system according to the present embodiment of the invention;

FIG. 96/2 is a schematic diagram of a typical reactor core of the type being simulated in accordance with the present invention;

FIG. 96/3 is a schematic representation of a plan view of a reactor core showing a flux thimble and a malfunctioned rod together with coordinates which correspond to coordinates used in associated programs of the simulation;

FIGS. 96/4 and 96/5 are diagrams showing generation of X and Y multipliers and chamber representation of ex-core simulation, respectively;

FIG. 96/9 is a graphical representation of a simulated flux map for a fuel assembly which is not under the influence of a control rod;

FIG. 96/10 is a graphical representation of the unrodded flux map of FIG. 96/9 together with a simulated unrodded flux map of lower power to illustrate the comparison;

FIG. 96/11 is a graphical representation of a simulated flux map having a full length rod in the channel;

FIG. 96/12 is a graphical representation of a simulated flux map having a part length rod in the channel;

FIG. 96/13 is a graphical representation of a simulated flux map having a part length rod on the face;

FIG. 96/14 illustrates a flow chart for the program CURROD utilized in converting the rod positions to the 120 mesh point of the simulated flux map;

FIG. 96/15 illustrates a flow chart for the program RODCHN for obtaining the upper and lower indicies for the 120 point mesh;

FIG. 96/16 illustrates a flow chart for the program PLCHAN for constraining the indicies at the upper and lower core boundaries of the 120 mesh points;

FIG. 96/17 illustrates the flow chart for the program TILT for calculating the distance and angle of the movable flux detector in the simulation;

FIGS. 96/18A and 96/18B illustrate the flow chart for the program TRACE which is activated in response to a control panel request for the flux mapping simulation;

FIG. 96/19 illustrates the flow chart for selecting the movable detectors in the flux mapping simulation;

FIGS. 96/20A and 96/20B illustrate the flow charts for selecting the paths of the detectors in the flux mapping simulation;

FIG. 96/21 is a pictorial representation of the distances and speeds of the detectors utilized in the flux mapping simulation;

FIGS. 96/22A and 96/22B illustrates the flow chart for the insertion logic of flux map detectors A, B, and C;

FIGS. 96/23A and 96/23B illustrate the flow chart for the insert logic of flux map detectors D, E, and F;

FIG. 96/24 illustrates the flow chart for the flux map detector scan control logic;

FIG. 96/25 illustrates the flow chart for the flux map detector record logic;

FIGS. 96/26A and 96/26B illustrate the flow chart for the flux map detectors A, B, and C withdraw control logic;

FIG. 96/27 illustrates the flow chart for the flux map detectors D, E, and F withdrawl control logic;

FIGS. 96/28A through 96/28C inclusive illustrates the flow charts for the flux map simulation communication with the C machine.

GENERAL DESCRIPTION OF SIMULATED NUCLEAR POWER PLANT

Figure 1:
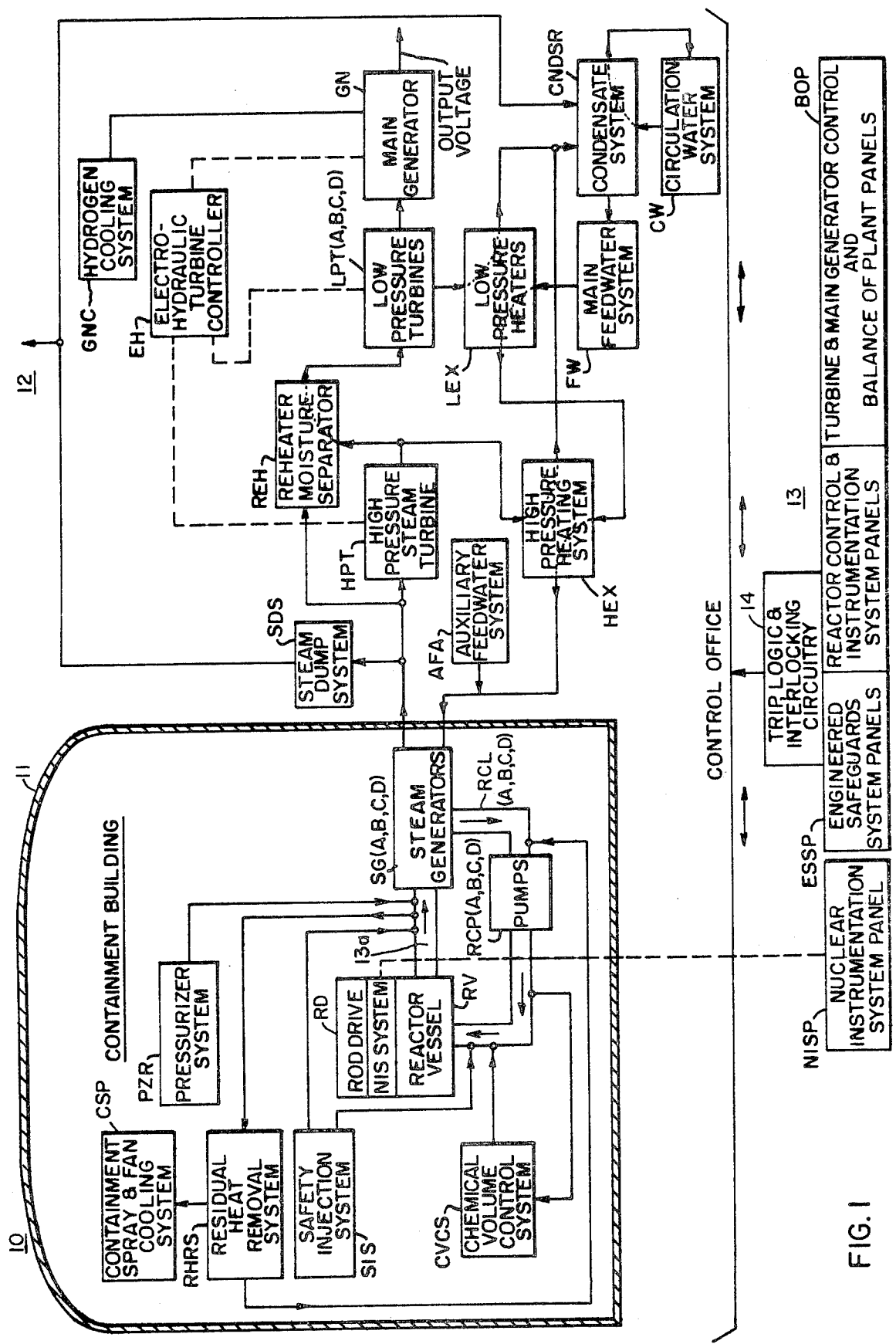
FIG. 1 shows a schematic block diagram of a nuclear powered electrical generating plant that is simulated in accordance with the present invention.

Referring to FIG. 1, the preferred embodiment of the invention is described in connection with the simulation of a nuclear power plant, in this case a four loop pressurized water reactor power plant. Such a plant includes a primary system generally referred to as 10 which is housed in a containment building 11, a secondary system, generally referred to as 12, and a control office that includes control and indication panels 13 for operating and monitoring the various elements in the power station. The plant itself is described herein in a general sense to an extent which will aid in understanding the invention. More detail on the plant is ascertainable from the more detailed invention description herein. Extensive background information on nuclear plants of various kinds is widely available in prior patents and publications. Certain invention features are applicable to nuclear plant types other than the pressurized water type.

The primary system includes a nuclear reactor housed in a reactor vessel RV and in this instance four closed reactor coolant loops RCL (A, B, C, and D), connected in parallel to reactor vessel RV. Each loop contains a reactor coolant pump RCP (A, B, C, and D) and a steam generator SG (A, B, C and D). The reactor vessel RV, reactor coolant loop piping RCL, pumps RCP, and primary side of steam generators SG, all form what is referred to as a reactor coolant system RCS. The primary system 10 also includes an electrically heated pressurizer system PZR and certain auxiliary systems hereinafter described.

High pressure water circulates through the reactor vessel RV to remove the heat generated by a nuclear chain reaction within a fuel arrangement disposed in the reactor. This heated water exists from the reactor vessel RV and passes via the coolant loop piping RCL to the steam generators SG. In the steam generators SG, the coolant watere gives up its heat to the feedwater in the secondary side of the steam generator SG to generate steam for a turbine driven electrical generator GN. The reactor coolant cycle is completed when the coolant is pumped back to the reactor vessel RV for reheating in the nuclear reactor.

Rod drive system RD is used to control reactor power level and consists of clusters or banks of movable cylindrical neutron absorber rods. The absorber rods move within guide tubes in certain fuel assemblies in the reactor fuel arrangement. The reactor coolant pumps RCP are vertical single stage mix flow pumps of the shaft seal type; and are designed so that adequate coolant flow is maintained to cool the reactor core adequately under all conceivable circumstances. The steam generators SG are vertical U-tube units that contain integrally therewith, in the secondary side, moisture separation equipment that reduces the moisture content of the steam to one-quarter percent or less. The electrically heated pressurizer PZR connected to one of the four reactor coolant loops RCL maintains the reactor coolant system RCS pressure during normal operation, limits the system coolant pressure variation during plant load transients, and keeps the system coolant pressure within design limits during abnormal conditions.

The reactor operating level is controlled inherently by a negative temperature coefficient of reactivity of the water; by control rod cluster positioning as already indicated; and by a soluble neutron absorber, such as boron in the form of boric acid. The boric acid is inserted into the coolant during cold shutdown, partially removed during startup, and adjusted in concentration during the life time of the fuel in the core to compensate for such effects as fuel consumption, and accumulation of fission products, which tend to slow the nuclear chain reaction.

The primary system includes engineered safeguard systems, ESS including chemical and volume control system CVCS, safety injection system SIS, residual heat removal system RHRS, containment spray and fan cooling system CSP, and an accumulator discharge system (not shown) which is described in detail in connection with the description of the individual models.

The chemical and volume control system CVCS performs a number of functions, such as filling the reactor coolant system RCS, providing a source of high pressure water for pressurizing the system RCS when cold, maintaining the water level in the pressurizer system PZR when the RCS system is hot, reducing the concentration of corrosion and fission products in the reactor coolant, adjusting the boric acid concentration of the reactor coolant, and providing high pressure seal water for the seals of the reactor coolant pumps RCP.

The residual heat removal system RHRS portion of the engineered safeguard systems ESS transfers heat energy from the reactor core and the system RCS during plant shutdown and refueling operations. Components in the residual heat removal system RHRS are also employed in conjunction with the safety injection system SIS.

The safety injection system SIS supplies borated water to the system RCS to limit the fuel rod cladding temperature in the unlikely event of a loss of coolant accident. Also, the system SIS functions to provide a means of introducing a spray of borated water into the containment 11 as an additional dynamic heat sink. The system SIS includes several independent subsystems characterized by equipment and flow path redundancy. This redundancy assures complete reliability of operation, and continued core cooling even in the event of a failure of any single component to respond actively as intended. For example, during the passive accumulator injection phase of the system operation which is described in connection with the individual models, accumulator tanks rapidly inject borated water into the reactor coolant system automatically when the depressurization of loops RCL causes a reversal of the pressure drop across the accumulator check valves. The accumulators provide rapid cooling of the reactor core for large breaks which would otherwise result in core uncovering and overheating before the electrically driven low head safety pumps of the SIS system are energized and delivering coolant. The low head system of safety injection provides for injection of borated water into the RCL loops for large breaks, which would result in rapid blowdown and depressurization. A high head system for injection into the loops RCL for small breaks is provided for those instances that would result in slow blowdown and depressurization. The low head system utilizes pumps of the residual heat removal system RHRS which takes water from a refueling water storage tank, and pumps borated water through one of the residual heat exchangers, through an injection header and injection lines to each of the reactor coolant loops. The high head safety injection phase utilizes two subsystems which provide extremely rapid response to an SIS system actuation signal, utilizing a boron injection tank and a charging pump of the chemical and volume control system CVCS.

The containment building 11 completely encloses the entire primary system and insures that an acceptable upper limit for leakage of radioactive materials to the environment is not exceeded, even if gross failure of the elements contained therein were to occur. The containment spray system CSP is included in the primary system to limit the pressure in the containment atmosphere to below the containment design pressure, and remove sufficient iodine from the containment atmosphere to limit the radiation doses to safe value. This system delivers NaOH to the space within the containment building 11. The reactor containment fan cooling system portion of CSP which is also part of the containment building monitoring system removes heat from the containment building during normal operation, and during any loss of coolant accident. When a loss of coolant accident is sensed, the fan motors are automatically switched to low speed to provide circulation of the steam-air mixture in the containment building.

The steam generators SG (A, B, C, and D) deliver steam at appropriate pressure and temperature in the secondary system for conversion to mechanical and then to electrical energy in the turbines and the generators, respectively. The secondary steam is additionally used for various operational auxiliary services such as turbine shaft steam seals, turbine drives for main and auxiliary feedwater pumps and steam jet air ejectors.

Steam is admitted to a double flow high pressure turbine HPT that is controlled by governor valves with quick acting throttle or stop valves ahead of them for rapid isolation in an emergency. Four separate pipes convey steam from the governor valves to the turbine nozzle chambers. The steam passes through an impulse blading or control stage and a number of reaction stages of the high pressure turbine HPT; the impulse chamber steam pressur is measured and used as a load measurement for use in reactor control.

On leaving the last row of high pressure blades, the steam has a moisture content of approximately 10%. Thus, the steam is then passed through a moisture separator and reheater REH to improve the turbine efficiency and reduce the low pressure turbine exhaust moisture. The exhaust steam from the high pressure turbine when first passed through the moisture separator portion REH removes approximately 10% of the flow which is extracted as moisture. The remaining 90% flows through steam heated reheater portion of REH where it receives approximately 100°F superheat. The moisture is removed and drained to a heater drain tank (not shown); and the steam which rises above the moisture separator passes over the reheater and is reheated by live steam.

The hot reheated steam is conveyed to the double flow low pressure turbines LPT (A, B, C) the number of which in use can depend on the electrical output required. The low pressure turbine exhaust directs the steam to a condenser CNDSR that has cooling water passing through tubes which condense the steam to water where it is collected in a chamber, called a hot well. The condenser cooling water is controlled by circulating water system CW. The condensate system CNDSR and the feedwater system FW return the condensed steam from the turbine condenser, and the drains of the regenerative feed heating cycle, to the steam generators SG (A, B, C, and D) while maintaining the proper water inventories throughout the cycle.

The feedwater system FW conveys the feedwater through low pressure heaters LEX and then through high pressure heaters HEX to the generators SG. The auxiliary feedwater system AFA is used when the main system is inoperative. These systems automatically maintain the water level of the steam generators SG during both steady-state and transient operation.

The turbine HPT is equipped with an electrohydraulic control system EH comprising a solid state electronic controller and a high pressure fluid supply. The electronic controller computes a control signal based on measured turbine speed, measured first stage steam pressure, and speed and loss reference values established by the dispatcher or initiated at the operator's control panel 13. The control signal is transmitted to the electrohydraulic actuator of each main steam throttle and/or governoring valve to produce the valve positioning needed to meet the reference load. During turbine startup, the throttle valves are position controlled to accelerate the turbine from turning gear or higher speed up to synchronous speed. The high pressure hydraulic fluid system provides the power for all turbine steam control valves, electrohydraulic actuators, and positions the governor valves in response to the electric control signals from the electronic controller. The interceptor valves are also operated by the hydraulic fluid, and they may be position controlled or simply controlled to be either open or closed.

The electrohydraulic control system provides turbine control during all phases of operation by varying the turbine valve openings. Hydraulic cylinders move the valves to the required opening with electrically operated servo-valves controlling the cylinder's position.

The main generator GN operated by the turbine is a hydrogen inner cooled synchronous generator with a water cooled stator and an output voltage of approximately 22 to 25 kV at 60 cycles. The excitation is provided by a shaft driven air cooled brushless exciter.

Cooling for the generator is provided by system GNC which circulates hydrogen at a pressure of about 75 psig through the generator GN by fans attached to the generator shaft.

Various plant parameters including reactor parameters, coolant and steam pressures, temperature, and flows and liquid levels in the various systems, as well as the speed of the turbines and electrical output of the generator are sensed and displayed through meters, alarms, and annunciators on the central office panel 13. Among the reactor parameters the position of the rods of the reactor and the state of all operable components are displayed to inform the operator of the condition or state of operation of the nuclear power plant.

The state of operation of the various components of the plant and certain fluid pressures, temperatures, and levels are connected through interlocking and logic circuitry 14 to prevent unsafe operation of selected system components and to trip or shut down the plant under abnormal conditions.

Nuclear instrumentation panel NISP is provided with various recorders, indicators, meters, and selector switches to display the neutron flux values in various sectors of the reactor, both in an axial and radial direction, which function is termed in-core flux mapping.

Also, a portion of the panel NISP displays through meters the flux in various sectors of the reactor vessel RV to inform the operator of the various ranges of nuclear flux, such as source, range, intermediate range, and power range of the reactor during start-up and shutdown, which operation is termed ex-core radiation detection. Further, the temperature of individual fuel rods of the reactor, and the radiation in various parts of the plant are monitored and displayed on the panels NISP. Finally, the auxiliary power to the plant is controlled by a portion of the panel NISP.

GENERAL DESCRIPTION OF SIMULATOR CONFIGURATION

The nuclear power plant simulator according to one embodiment of the invention comprise digital computation apparatus and peripheral equipment operatively connected to control and indication panels which are identical in appearance and wiring to the actual control and indication panels of the four loop pressurized water reactor power plant that is simulated. The general function, structure, and operation of digital computers is set forth in a publication entitled "Electronic Digital Systems" by Mr. R. K. Richards, which was published in 1966 by John Wiley and Sons, Inc. and bears the Library of Congress card catalog number 66-17618, to which reference is made for a detailed description thereof in order to aid in an understanding of the apparatus and methods in carrying out the invention.

Figure 2:
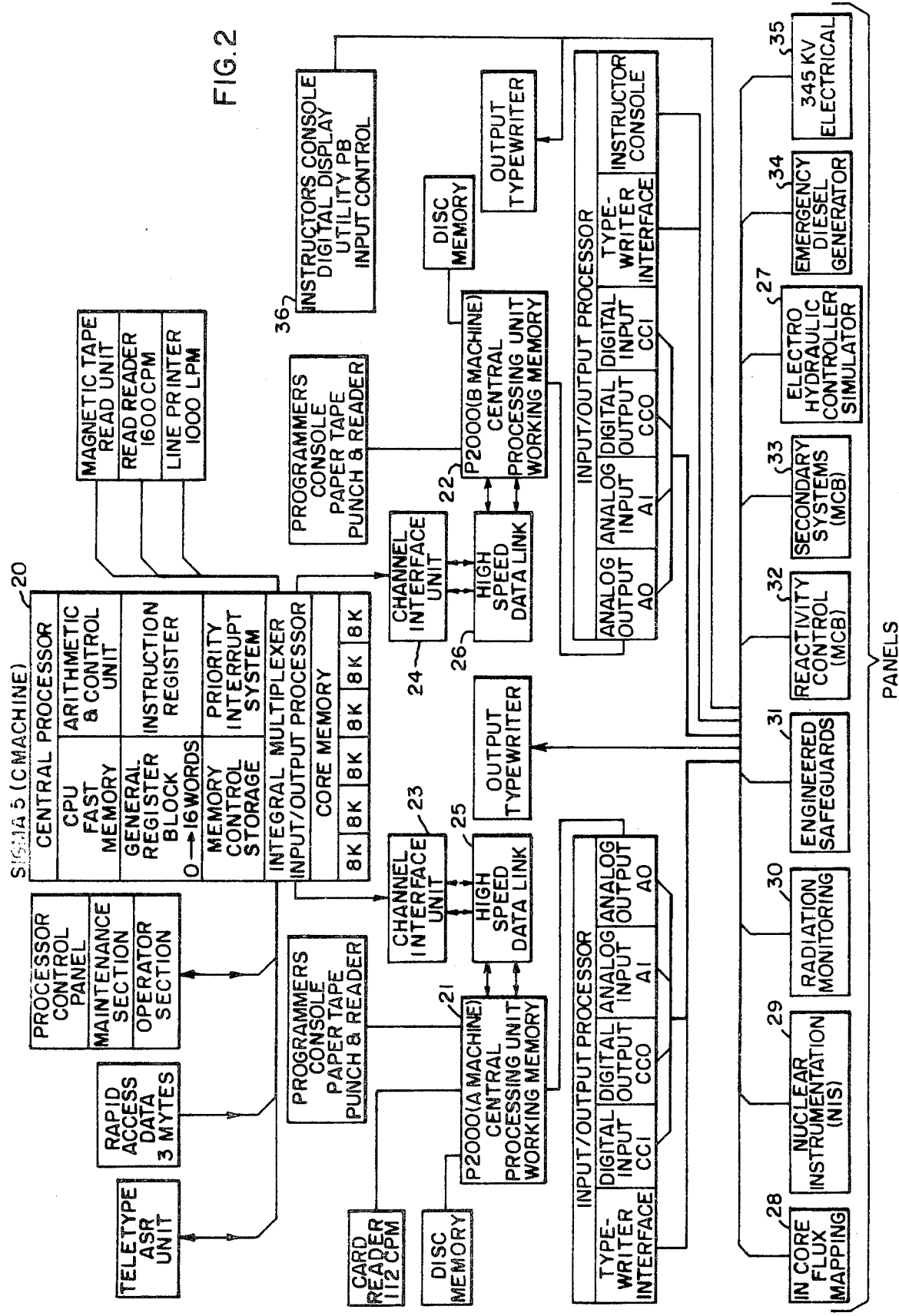
FIG. 2 shows a schematic block diagram of the apparatus used in simulating the operation of the plant shown in FIG. 1.

Specifically, and referring to FIG. 2, the simulation system includes a Sigma 5 digital computer 20 referrred to at times in this specification also as the C machine and associated peripheral equipment. The Sigma 5 computer system is manufactured and sold by Xerox Data Systems, Inc. and has been in general use for over one year prior to the filing date of this application. For more information on the Sigma 5 computer system reference is made to the appendix.

The simulator also includes digital computers 21 and 22 referred to at times hereinafter also as the A machine and B machine, respectively and associated peripheral equipment of the type manufactured and sold by Westinghouse Electric Corporation, and which is known as model P2000, and which computers have been in general use for over one year prior to the filing date of this application. The P2000 digital computers 21 and 22 are described in a publication entitled "Prodac 2000 Computer Systems Reference Manual" copyrighted in 1970 by Westinghouse Electric Corporation and bears copyright Registration No. A244775, to which reference is made to aid in an understanding thereof.

The Sigma 5 computer, or C machine provides an extensive arithmetic capability for the power plant simulator. The computers 21 and 22, act as process input-/output controllers for the C machine. In practicing many features of the invention, a single computer or other multiple computer arrangements may be employed.

Communication between the A, B, and C machines is provided by a combination of the Xerox Data Systems Model 7650 channel interface units 23 and 24, and high speed data link devices 25 and 26 respectively, described more fully hereinafter. The C machine provides the software control and synchronization for the multiple computer configuration involving the A machine, B machine, and C machine; and the A and B machines in addition to providing the process input-/output capability for the C machine also provide a capability for instantaneous simulator responses through their external interrupt system, the processing of all interlock and protection system logic, and the processing of several employed in the simulator models, such as a reactor control rods program. The significant hardware features associated with each of the A and B machines as shown in FIG. 2 included in the appendix. The major C machine hardware subsystems illustrated in FIG. 2 and utilized in the present embodiment of the invention are also included in the appendix to this specification.

The simulation of the electrohydraulic control system EH as depicted in FIG. 1 and represented by a simulator panel portion 27 of FIG. 2 is accomplished in part by the actual analog electrohydraulic controller manufactured and sold by Westinghouse Electric Corporation, which has been in use for more than a year prior to the filing date of this application. The panels 27 through 35 in FIG. 2 provide the same outward appearance and operation as panels in an actual plant and are connected directly through appropriate computer system equipment to the A machine and the B machine.

Instructor's console 36, which provides the control facility to start, stop and manipulate the simulator is connected to software in the B machine.

A basic real time batch monitor (hereinafter referred to as RMB) software system of the C machine is a two partition system designed for normally running simultaneously foreground and background programs. The foreground programs include the system software extension programs which are made up of a sublevel processor, data link handler, and disc handler. Such foreground programs also include data conversion routines, and various dynamic models for the simulated system, which include reactor models, primary system models, secondary system models, a valve handler routine, a pump handler routine, and a controller handler routine. In order to permit an economy in core memory requirements, in the present embodiment of the invention the foreground programs and the background programs are not run at the same time.

CONTROL PANELS

In controlling an actual nuclear power plant of the type being simulated, the individual control devices such as selector switches, levers, and pushbuttons close contacts to select certain components for operation, to energize motor operated valves, solenoids, and relays; and through a protective system of logic to select, or change the position or condition of various components for starting up, varying operation, shutting down, providing emergency measures in the event of malfunction, and testing components in subsystems of the plant. In addition, certain plant components or subsystems function in automatic control loops to which there are typically applied one or more monitored plant variables as feedback signals.

In monitoring the operation of an actual plant, temperature, pressure, flow, level, flux, and other physical measurements are detected by appropriate sensing devices which transmit such information to the control panels for operating meters, recorders, and indicators. As already indicated certain monitored variables are also used for control.

In realistically and accurately simulating the control and monitoring of a nuclear power plant in accordance with the present embodiment of the invention, such control panels together with the control and monitoring devices are an exact replica physically and operatively, of the plant being simulated. However, in simulating the system in accordance with the present embodiment, the control and monitoring devices of the control panels are wired to each other, and to turbine EH controller; and also to contact input and contact output terminals, respectively, on the A or B machines. The panel interface logic and the plant protective logic are contained in both the A and B machines as hereinbefore mentioned. The control consoles permit the student operator to control and monitor the operation of the plant in the same manner as the operator of an actual plant. For example, he can start up, increase the power, shut the plant down, and restart. At any time the instructor can change physical values or malfunction the models as previously described. Then the opeator can change the operation of the plant to correct the malfunction or introduce emergency measures as required. The student is able to see realistically in realtime the consequences of any action that could be taken in the real plant.

In detailed drawings of the control panels, descriptive legends are associated with appropriate control and monitoring devices in a manner similar to an actual installation; and in addition thereto, software symbols in many instances are used to identify specific control panel devices with the same software symbol being used to identify the component being operated by such devices in the schematic diagrams of the actual system being simulated. In other instances, the actual valve number is used to the schematic diagram and the control panel where it will aid in understanding the simulation of the system.

In the described embodiment of the invention, the control and indication panels and the various simulator devices thereon are arranged functionally. For example, FIGS. 90/1A, 90/1B, and 90/1C represent a portion of the nuclear instrumentation panel for controlling and indicating the neutron flux mapping and the nuclear fuel rod temperatures; while FIGS. 90/2A and 90/2B represent a portion of the panel for controlling and indicating the ex-core or out-of-core neutron flux detection and monitoring of the nuclear reactor, and the audio count rate output.

The control devices located on the panels of the simulator include manually operable electrical switches for selecting and controlling the individual components included in the various models. Such switches, with few exceptions are connected by their contacts to the A and B machines; and they include analog input, bi-directional contact inputs, direct contact inputs, multiplexed contact inputs, and hardware components not directly connected to the computer. The monitoring devices on the panels include meters, counters, recorders, and lamps which are connected to the A or B machines or the hardware; and are either analog output, two wire contact output, or three wire contact output.

In the real plant the operation of the panel control devices are implemented through relay arrangements. In the simulator, control panel interface programs are utilized to simulate the relay logic. Although the control panel interface logic has a protective nature, it is separate and distinct from the plant protective logic. The programs that simulate the control panel logic are called chains which are written in the PROGEN language and are similar to FORTRAN subroutines. Each chanin is a small program that performs a specific function usually on a demand basis rather than periodically. In general, the chains are organized to form self-contained subsystems such that a minimum of interconnection between chains is required.

ORGANIZATION OF MODELS

Figure 95:
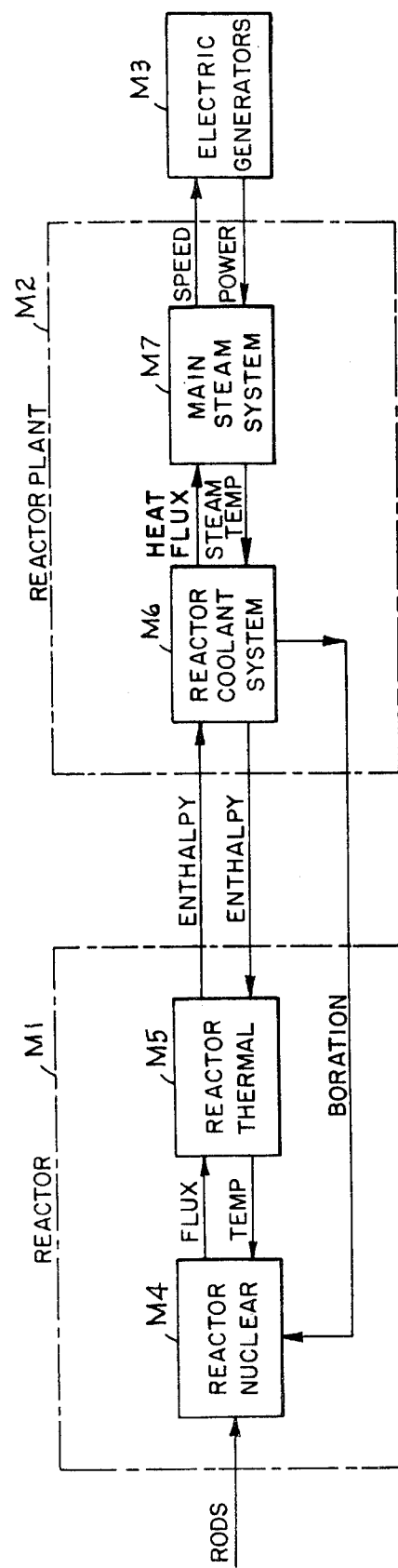
FIG. 95 is a functional block diagram showing the interconnection of the reactor, the primary, and secondary system of the simulation.

To provide realistic simulation in an efficient manner while providing for manufacturing and operating flexibility, the simulated nuclear electrical generating plant is preferably modularly organized and it includes broad components. As shown in FIG. 95, the first category M1 includes the reactor per se, the second category M2 includes the reactor plant, and the third category M3 includes the electrical generators. The reactor category M1 is further modularly segregated into two interacting models, a reactor nuclear model M4 and a reactor thermal model M5. The reactor plant category M2 is further modularly segregated into two interacting models, a reactor coolant system model M6 and a main steam system model M7.

Broadly, in this embodiment of the simulator and with reference to the pressurized water type of nuclear plant being simulated in this case, the reactor nuclear model M4 calculates the neutron flux, as governed by the position of the simulated neutron absorbing control rods M5 and the output coolant temperature of the reactor thermal model M5. The reactor thermal model M5 operates on factors related to heat generation and heat flow to calculate the enthalpy of the reactor as well as the primary coolant temperature. The coolant temperature is output to the reactor nuclear model M4 since coolant temperature affects reactivity and the reactor enthalpy is output to the reactor coolant system model M6 since the reactor enthalpy affects heat transfer to the coolant. The reactor thermal model M5 performs its calculations as governed by the output coolant enthalpy of the reactor coolant system model M6, since the coolant enthalpy affects heat flow from the reactor to the coolant as well as the temperature of the coolant, and the neutron flux of the reactor nuclear model M4, since the flux level is a determinant of the reactor heat generation.

In the reactor plant simulation, the reactor coolant system model M6 calculates coolant enthalpy and secondary heat flux as governed by the reactor enthalpy from the reactor thermal model M5 and the steam temperature from the main steam system M7. The main steam system model M7, which includes the turbine, calculates the main steam temperature and the speed of the turbine, which is governed by the heat flux from the reactor coolant system M6 and the power output of the electric generators M3. The power output of the electric generators is calculated in accordance with the speed of the turbine from the main steam system M7. The reactor coolant system model M6 also calculates the boration concentration which is utilized as an input to the reactor nuclear model M4 to modify the flux calculation.

REACTOR MODEL INITIALIZATION

The reactor simulation is initialized from stored data, that is, the instructor's console sets, snapshot, and backtrack, as part of the entire plant. This stored data may be generated for steady-state critical conditions by an offline initializer calculation.

The programs involved in the reactor model initilization include INIT, ACIGMA, FLXFET, POISET, SETPTS, DETECT, and TEMPS. The inputs to the initialization include the fuel cross sections, power and temperature for the reactor, the position of the control rods, and the boron concentration. The outputs of the initialization are all snapshot and time in life variables. Fuel burn-up is not calculated directly by the initializer, but there are three separate burn-up states, beginning of life, middle of life, and end of life. For each point or time in life, there are point to point values for the X–Y axes as described in the X–Y synthesis simulation hereinafter described.

The initializer calculation reduces the original space-time kinetics equation hereinafter described, with all short-term derivatives set to zero. In the reactor area, the neutron space kinetics equation yields an eigen value problem as follows:

$$A \phi = 1/K \; B \; \phi$$

According to the present invention, a bias $k$ ($k_{bias}$) is found at an experimentally measured critical condition which is the bias for all furture calculations. This bias must be such that it matches at any initialization for the same time in life, that is beginning, middle, or end of life.

Solution of the eigen value problem using cross-sections and steady-state thermal and xenon models together with the corresponding power level by way of the normal eigen value matrix iteration techniques yields the starting conditions for the space kinetics, thermal, cross-section, and the burn-up calculations.

In operation, the reactor model initializer is called whenever the overall plant initializer is used. The operating power level, such as turbine load or generator megawatts, when calculated back to the reactor, leads to plant $\Delta t$ and $t_{ave}$ using the specified temperature program. These temperatures along with flow, boration, and rod positions drive the initializer. The results are stored in a standard data buffer, as a snapshot, to be used subsequently to initialize the space-time kinetics model.

The burn-up of the fuel, or the point in life, is modeled by changing the initial absorption and fission cross-sections, samarium concentrations, and the beta's for delayed neutrons. Integration into the overall plant model is accomplished by specifying the turbine load and working back through the primary system to get the $\Delta t$ across the reactor necessary to drive the system. Any power mismatch remaining between the reactor and steam plant is eliminated by changing the steam generator heat transfer characteristic and/or turbine-generator losses.

NUCLEAR REACTOR

Referring to FIG. 96/1, a pressurized water reactor for a power loop plant, is illustrated, the operation of which is simulated in accordance with the present invention. With reference to FIGS. 90/1A through 90/1C, 90/2A and 90/2B, the various components for monitoring the reactor are operated from the central control office.

In FIG. 96/1, the reactor vessel 100 is a cylindrical shell which has a plurality of inlet nozzles such as 101 and outlet nozzles such as 102 for circulating the reactor coolant to the steam generator. The vessel 100 contains the fuel rods in a core arrangement that undergo a chain nuclear reaction to produce usable energy in the form of heat, and it further includes various internal assemblies for controlling the rate of heat generation. Reactor control is provided by neutron absorbing control rods 103 and by a homogeneous neutron absorber, such as boric acid, dissolved in the reactor coolant. The control rods 103 are utilized to START UP, follow load changes, to provide reactor trip capability, and to furnish control for slight deviations in reactivity due to temperature. In the event of a reactor trip, the control rods 103 fall into the core by gravity. The concentration of the boric acid in the coolant is varied during the life of the core to compensate for changes in reactivity that occur with fuel depletion, as well as to compensate for the reactivity associated with xenon transients arising from power level changes.

Two types of control rods 103 are employed, full length and part length. The full length rods 103 incorporate an absorber material extending the full length of the core when the rods are fully inserted. The part length rods 103 are identical in external appearance but incorporate an absorber material only in the bottom quarter of the cylindrical tube. The absorber region of the part length rods 103 are positioned at various elevations in the core and the vessel 100 to shape the power distribution along the axis of the core and to control the xenon redistribution accompanying power level changes along the axis of the core. The reactor core uses 53 full length control rod assemblies 103 which are operationally segregated into banks that are operated as a unit from the central control office.

Referring to FIG. 90/2B, the central control office includes a panel whereby each individual rod can be disconnected to drop to the bottom of the core individually. Other detailed information in connection with the operating characteristics of the nuclear reactor and the various parameters which are monitored by the operator in the central control office will be discussed in connection with the individual models which make up the entire reactor simulation.

NUCLEAR REACTOR SIMULATION

In simulating the nuclear reactor, which includes the control of the reactor, and the condition of the reactor including malfunctions for the purpose of training, a number of individual models are utilized in the computer system. These models include a space-time neutron kinetics model which simulates the total power of the core and the spatial power distribution. A flux synthesis for the horizontal axis of the core, that is the flux distribution outwardly from the center of the core; a model for simulating the decay heat of the reactor to represent that heat which becomes prominent subsequent to the shutting down of the reactor; the model to simulate fuel burnup and PU production; the core exit thermocouple model for calculating the fuel assembly outlet temperatures; the automatic rod control; the simulation of the build up of xenon; the thermohydraulic modeling of the reactor core; the model for simulating the set points and limits of the reactor; the model for measuring the in core flux traces; and the out-of-core detectors are all used in the overall simulation of the reactor.

In addition to the position of the control rods 103 previously described, temperatures, nuclear flux, and power are measured throughout the reactor core and the reactor vessel. Referring to FIG. 96/2, a schematic diagram of the reactor core is illustrated having a vertical Z-axis, and horizontal axes X and Y to which reference will be made throughout the description. In the reactor core, the fuel assembly temperature is measured by thermocouples which are permanently mounted in the plane of the X and Y axes at the top of the core at selected locations. There are in total 65 individual thermocouples.

The neutron flux is measured in selected fuel assemblies by six miniature flux detectors that move upwardly along the Z-axis, and in particular fuel assemblies, spaced relative to the horizontal X and Y axes as selected by the operator. Outside the reactor core, the neutron flux is measured at predetermined points around the periphery of the core as shown in FIG. 96/2 to detect the flux in the source range, the intermediate range, and the power range of operation.

The neutron flux and power are measured in three dimensions of the cylindrical core. Thus, in the reactor being simulated the flux distribution can be determined in three dimensions along the Z-axis vertically and along the X and Y axes horizontally.

In the central control office, the meters shown in FIG. 92I illustrate the offset between the sectors on the horizontal X and Y axes. FIG. 90/1A illustrates the control panel for operating one of the six movable miniature flux detectors. A switch designator "Path Selector" permits one of the flux detectors (See FIG. 96/2) to be positioned to move vertically in the core in anyone of ten predetermined paths. The switch designated "Operation Selector" permits the operator to move the arrow to "normal" which commences the movement of the miniature detector into the particular path selected by the path selector. The movement of the arrow to "storage" causes the flux detector to be withdrawn out of the path which it is in. Two lights designated, "inserted" and "withdrawn" under designation "cable position" are lighted to indicate to the operator whether the detector controlled by this section of the panel board is either "inserted" in the core or "withdrawn" from the core. A nixie tube indicator designated "Detector Position" indicates the number of inches that the detector is from a certain reference point, and continues to change numerically while the movable detector is either moving into a normal position or being withdrawn to a storage position. A recorder FMAP records the flux for the detector as it is moving along a selected path. A visual readout designator "Selector Readout" is provided to inform the operator of the flux detected by the movable flux detector. A thermocouple is selected by a plurality of toggle switches 4SW numbered 1 2, 3 4, 5 6, etc. up through 65 which when operated select a certain thermocouple for indicating the temperature on the indicator TCOUPL. FIG. 96/2 is a diagram of the reactor core taken in the plane of the horizontal axes X and Y of FIG. 96/1 to show the particular path over which a movable detector is operating. FIG. 90/1C includes switch designated "Speed Selector" and "Speed" for the flux detectors so that the speed of a particular movable detector or all of them can be operated simultaneously at either a "low" or a "high" speed for either inserting or withdrawing and in the automatic position. The lamps designated "Stop", "Insert", "Scan", "Record", and "Withdraw" on the panel of FIG. 90/1C are illuminated when the particular movable flux detector is either being inserted, scanning, recording, withdrawing, or stopped.

FIG. 90/2 illustrates the meters and monitoring lights for testing and monitoring the operation of the out of core fixed detectors for the source range, intermediate range and power range, respectively.

Space—Time Neutron Kinetics Model (SIGMAS, FCALC)

In accordance with the present invention, to obtain a simulation of the total power, and core spatial power distribution effects, the coupled space-kinetics model T8 is used. The T8 model calculates a modified one group flux along the Z-axis from diffusion theory and adds point by point delayed neutrons to obtain a fission power distribution. A radial tilt synthesis is utilized for the spatial distribution effects along the X and Y axes, as well be described in connection with the appropriate models therefor. Local perturbations are superimposed in the movable in core detector model and the thermocouple model.

The space-time neutron and kinetics model T8 provides variation in control rod worth with the changes in flux shape along the Z-axis. This spatial power model provides correct response in the direction of the Z-axis for permitting training emphasis in such aspects as part length rod control, for example.

The actual solution of the neutron diffusion equations is used for the Z-axis direction. In simulating the fission power distribution along the Z-axis, a single dimension differential technique is employed.

Referring to FIG. 96/2, 22 nodes are assumed along the Z-axis which are designated G1 through G22 inclusive. G1 and G2 and G21 and G22 are assumed to be located outside the length of the fuel rods to act as neutron reflectors, which in a real reactor simulates the reflective effect of water in the reactor. At each of these nodes G1 through G22 inclusive, six delayed neutron time groups are calculated. The six time groups represent the different time fission effects of the most important delayed reaction isotopes in a nuclear reactor of the type being simulated in the present embodiment.

The simulation for the one dimensional space-kinetics is mechanized in the program FCALC and begins with a steady-state eigen-value problem solution which provides a $K_{bias}$ that is interpreted as the calculated K for measured critical of the reactor. The space kinetics equation is a matrix derived from the evaluation of the following differential equations:

$$\frac{1}{N}\frac{d\phi}{dt} = \frac{1}{k}(1-\beta)J\Sigma_f\phi - \Sigma_a\phi + \Sigma_i\lambda_i C_i - \nabla\cdot\vec{J} + s$$

$$\frac{dC_i}{dt} = \frac{\beta_i}{k}J\Sigma_f\phi - \lambda_i C_i \quad i=1,6$$

by differencing methods at each space node on the ¼ second time step.

Equation (2) is solved analytically:

$$C_i(t_1) = C_i(t_0)e^{-\lambda_i \tau} + \frac{\beta_i}{k\lambda}J\Sigma_f\phi(t_1)(1-e^{-\lambda_i \tau})$$

where $\tau = \frac{1}{4}$ second.

Equation (1) is solved by taking an integral over space and time and making backward difference approximations:

$$\int_t \int_{x_n} \frac{1}{v}\frac{d\phi}{dt} dx\, dt \approx \frac{M}{v}[\phi_n(t_1) - \phi_n(t_0)]$$

where $M$ is the mesh size and $\phi_n$ refers to the $n$th space point.

$$\int_t \int_{x_n} \left[\frac{1-\beta}{k}J\Sigma_f - \Sigma_a\right]\phi\, dx\, dt \approx \left[\frac{1-\beta}{k}J\Sigma_f - \Sigma_a\right]$$

$$M\phi_n(t_1)\tau \quad \int_t \int_{x_n} \Sigma_i \lambda_i C_i\, dx\, dt \approx M\tau\Sigma_i \lambda_i$$

$$\left[\frac{C_i^n(t_1) + C_i^n(t_0)}{2}\right] = M\tau\left\{\Sigma_i \lambda_i C_i^n(t_1)(1+e^{-\lambda_i \tau})\right.$$

$$\left.+ \frac{J\Sigma_f}{k}\phi_n(t_1)\Sigma\beta_i(1-e^{-\lambda_i \tau})\right\}$$

$$\int_t \int_{x_n} \tau d x\, dt = -\int_t \int_s \tau\, ds\, dt$$

$$\iint_{x_n} \nabla\cdot\vec{J}\, dx\, dt = -\iint_s \vec{J}\cdot d\vec{s}\, dt$$

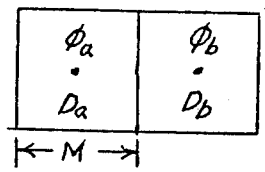

$$J_{ab}^{+\epsilon} = -D_b \frac{\phi_b - \phi_{ab}^+}{M/2}$$

$$J_{ab}^{-\epsilon} = -D_a \frac{\phi_{ab}^- - \phi_a}{M/2}$$

In the limit as
$\epsilon \to 0$, $J_{ab}^{+\epsilon} = J_{ab}^{-\epsilon}$ and $\phi_{ab}^+ = \phi_{ab}^-$ Hence,
$$D_a\phi_{ab} - D_a\phi_a = D_b\phi_b - D_b\phi_{ab}$$

$$\phi_{ab} = \frac{D_b\phi_b + D_a\phi_a}{D_a + D_b}$$

So, $$J_{ab} = -D_a\left[\frac{D_b\phi_b + D_a\phi_a}{D_a + D_b} - \phi_a\right]\bigg/(M/2)$$

$$= \frac{-2D_aD_b}{M(D_a+D_b)}(\phi_b - \phi_a)$$

Therefore, $$-\int_t \int_{x_n} \vec{J}\cdot d\vec{s}\, dt = -(J_{n,n+1} - J_{n-1,n}) = -\phi_n$$
$$\tau(R_{n,n+1} + R_{n-1,n}) + \phi_{n+1}\tau R_{n,n+1} + \phi_{n-1}\tau R_{n-1,n}$$

where $$R_{n,n+1} = \frac{2}{M}\left[\frac{D_n D_{n+1}}{D_n + D_{n+1}}\right]$$

Consequently, a tri-diagonal matrix can be formed, one row of which is $$(-B_n \ \alpha_n \ -A_n)\begin{pmatrix}\phi_{n-1}(t_1)\\ \phi_n(t_1)\\ \phi_{n+1}(t_1)\end{pmatrix} = G_n$$

where $Bn = Rn, n-1$ $$A_n = R_{n+1,n}$$

$$d_n = \frac{M}{v\tau} - \frac{(1-B)}{k}J\Sigma_f^i\, 'M = \frac{M}{2} \frac{J\Sigma_{r1}'}{k}$$

$$\Sigma B_2(1-e-d_iT) + \Sigma_a M + R_{n,nd} {}^*iR_{n-1,n}$$

$$G_n = \frac{M}{v\tau}\phi_n(t_0) + \frac{M}{2}\Sigma_i\lambda_i C_i^n(t_0)(1+e^{-\lambda_i \tau}) + S_n M$$

A forward elimination - backward substitution is used to solve this simultaneous set of equations as follows:
Namely, let
$Z_n = \alpha_n - B_n q_{n-1}$ The matrix, then, looks like

| $\alpha_1$ | $-A_1$ | 0 | 0 | 0 | 0 | | | | $Q_1$ | $G_1$ |
|---|---|---|---|---|---|---|---|---|---|---|
| $-B_2$ | $\alpha_2$ | $-A_2$ | 0 | 0 | 0 | | | | $Q_2$ | $G_2$ |
| 0 | $-B_3$ | $\alpha_3$ | $-A_3$ | 0 | 0 | | | | $Q_3$ | $G_3$ |
| 0 | 0 | $-B_4$ | $\alpha_4$ | $-A_4$ | 0 | | | | $Q_4$ | $G_4$ |
| . | | | | | | | | | . | . |
| . | | | | | | | | | . | . |
| . | | | | | | | | | . | . |
| 0 | 0 | 0 | 0 | 0 | 0 | $-B_{21}$ | $\alpha_{21}$ | $-A_{21}$ | $Q_{21}$ | $G_{21}$ |
| 0 | 0 | 0 | 0 | 0 | 0 | 0 | $-B_{22}$ | $\alpha_{22}$ | $Q_{22}$ | $G_{22}$ |

$\alpha_1$, $A_1$, and $\alpha_{22}$, $B_{22}$ have been modified by the condition that the flux goes to zero at the outer edges of the reflector.

$qn = An/Zn$ $En = (Gn + BnEn-1)/Zn$ and apply these formulas for each space point with $B_1 = 0$ and $A22 = 0$, which corresponds to forward elimination.

The $\phi_n(t_1)$ is found by back substituting, that is, applying the formula $$\phi_n(t_1) = E_n + q_n \phi_{n+1}(t_1)$$

starting from point $n = 22$ and working backward to $n = 1$.

At the completion of the solution for the flux $\phi_n$, equation (2) above is applied at each space node for the delayed neutrons.

The average power at each node is found from the formula $$P_m = F \Sigma_t^n \nu \phi_n$$

where $F$ is the conversion factor to watts;

is the energy release per fission;

$\nu$ is the volume of a slice of the core, M high.

The energy group cross-sections are calculated in the subroutine SIGMAS in the model T4. In this calculation, the fast neutrons and the slow or thermal neutrons are averaged to provide what is termed as one and one-half energy group cross-sections for input into the one dimensional space-time kinetics calculation. In the T4 model, after the fast and thermal cross-sections are calculated with use of the following numbers, they are averaged by an approximate spectrum ratio to give the thermal or slow cross-sections in one group. The five numbers which are provided for calculation in these one and a half energy group cross-sections at each of the space nodes G are as follows:

$D$ = Diffusion Coefficient $\Sigma \alpha$ = Absorption Cross Section $\nu \Sigma f$ = NU * Fission Cross Section $\nu$ = NU = No. of Neutrons Produced/Fission $\Sigma f$ = Kappa *

= Kappa = Power Produced/Fission $\nu$ = Ave. Neutron Velocity

In the above calculations, the important thermal and power shape Doppler feedback effects are included; and at each point in the burnup of the fuel, a set of data is utilized to represent the relative amounts of uranium, plutonium and fission products other than xenon. To the cross-section or absorption, for example, is added the effects of homogeneous boron and xenon for each space node, lumped control rods, including part length, and out of position rods for each space node, Doppler resonance, radial leakage, and finally water absorption. In simplifying this T8 model by utilizing the one dimensional space-time kinetics as previously described, the effect of water temperature changes $\alpha t$ if added with the other effects is not accurate. However, a function G (water temperature in the reactor, boron in parts per million) when multiplied into the water absorption term, which is number density in atoms per cubic centimeter times cross-section in square centimeters times G, yields the correct $\alpha t$. The water temperature term T is made equal to the average core temperature so that the same value is utilized at each of the nodes G1–G22. In utilizing the function stated above $G(t,b)$ an interpolative table is utilized which provides the correct constant G for yielding the reactivity effect of water absorption $\alpha t$. The function $G(t,b)$ depends upon the burnup of the fuel and runs from about 0.9 to 1.02. The void is corrected by adding an equivalent of 95 parts per million of boron for each one percent of void.

At each node, the following calculation is made:

$$\text{ENTHALPY}_N = \text{ENTHALPY}_{INLET}$$

$$+ \frac{O^x \ \text{POWER.dx}}{P_{TOTAL}} \text{ENTHALPY}_{OUTLET} - \text{ENTHALPY}_{INLET}$$

water density = a linear function of enthalpy($n$);

boron number density = (ppm Boron)$\times$(% of water in unit cell) $\times$ (conversion factor ppm to number density)

$\Sigma_a^{FAST} = \Sigma_{a(FUEL, SM)}^{FAST} + \text{Boron} \times \sigma_B^{FAST} + D_A(\sqrt{T_D+460} - \sqrt{T_{REF}+460})$
$+ \Sigma_a^{FAST}$ (Rods) $+ N_{H_2O} \sigma_{H_2O}^{FAST} G(\overline{T}(B))$ With $T_D$ = Doppler Fuel Temp., $T_{REF}$ = Constant $\Sigma_a^{THERMAL} = \Sigma_{a(FUEL, SM)}^{THERMAL} + \text{Boron} \times \sigma_B^{TH} + \text{Xenon} \times \sigma_{xE}^{TH}$ $+ \Sigma_a^{TH}(\text{Rods}) + N_{H_2O} T_{H_2O}^{TH} G(\overline{T},B)$ Gimel = Slowing$_0$ + $\sigma_{H_2O}^{SLOWING}(\Delta H_2O$ Number Density From Reference)

$X = \Sigma_a^{FAST^o}/\text{Gimel}$

Removal = $\Sigma_a^{FAST}/(e^x - 1)$ $$\text{SPECTRUM RATIO} = \frac{\Sigma_a^{Thermal} + D^{TH} B^2 \text{RADIAL}}{\text{REMOVAL}}$$

$$\overline{D} = \frac{\text{RATIO} \cdot D^{FAST} + D^{THERMAL}}{\text{RATIO} + 1}$$

$$\overline{\Sigma}_a = \frac{\text{RATIO} \cdot \Sigma_a^{FAST} + \Sigma_a^{TH}}{\text{RATIO} + 1} + D B^2_{RADIAL}$$

$$\overline{\nu\Sigma}_f = \frac{\text{RATIO} \cdot \nu\Sigma_f^{FAST} + \nu\Sigma_f^{THERMAL}}{\text{RATIO} + 1}$$

$$\overline{K\Sigma}_f = \frac{\text{RATIO} \cdot K\Sigma_f^{FAST} + K\Sigma_f^{THERMAL}}{\text{RATIO} + 1}$$

$$\overline{\mu} = \frac{\text{CONSTANT}}{\overline{\Sigma}_a \left[ \frac{\sigma_B^{FAST}}{\Sigma_a^{FAST} + \text{REMOVAL}} + \frac{\sigma_B^{THERMAL}}{\Sigma_a^{THERMAL}} \right]}$$

In the model T8, the inputs to the calculations are the positions of the control rods, the boron concentration in parts per million, the previous reactor Z-axis power shape, the Doppler fuel temperature, the delayed neutrons, and xenon concentration. The outputs of the model include the new reactor Z-axis power flux shape, fuel temperature and delayed Z-axis neutron shapes.

FLUX SYNTHESIS FOR HORIZONTAL AXES X–Y (PLTLT)

To obtain the three dimensional fission power distribution in the reactor core, the neutron flux distribution in the direction of the axes X–Y of FIG. 96/2 is obtained by synthesis in the models T5, 15 and 16. In the preferred embodiment of the simulator, it is assumed that the neutron flux distribution in the X and Y directions of the malfunctional are symmetrical with respect to the center of the core or Z-axis as long as there is no control rod malfunction nor xenon oscillation in the direction of the horizontal axes X–Y. In response to the introduction of a rod malfunction, the plane of the axes X–Y is tilted in the direction of the malfunctional rod, and neutron flux oscillations are caused by Xenon effects. The amount of the planar tilt as well as the amplitude of the xenon oscillations is governed by the positional asymmetry of the malfunctional rod, i.e., the differential number of steps such malfunction rod is withdrawn or inserted, and the actual position of the malfunctional rod with respect to the center of the core.

The programs which provide the flux synthesis for the T5, T15 and T16 models include PLTLT, XEOSCL, CHAMBR, and TILT. The inputs to these programs include the reactor fission power and the out of position rods. The outputs of these models include the flux tilt factors for the miniature movable flux detectors previously described, the out-of-core flux detectors for the source, intermediate and power ranges, and the fixed thermocouples for the fuel assembly temperature. The programs also provide vector component addition for asymmetric flux.

To better understand the planar flux tilt, reference is made to FIG. 96/3 which illustrates the top of the reactor looking in a vertical direction into the core. Coordinates given in this figure correspond to those used in the associated programs. The block MROD represents a malfunctional rod which is a predetermined distance from the center of the core, and to particular angle with respect to a zero degree reference plane. Assuming the rod MROD is malfunctioned; that is, dropped or out of its group, for example, the plane of the X–Y axes would tilt downwardly into the FIG. 96/3 in the direction of a around the axis A–A'. The amount of tilt is given as a function of the malfunctioned rod distance from the center of the core, and the number of steps the rod MROD has malfunctioned; and a second order polynomial fit in distance is used. When the malfunction is corrected, the tilt of the rod reference plane is restored; but xenon oscillations may still be in the core in the direction of the malfunctioned rod MROD.

Referring to FIGS. 96/3 and 96/5, the out of core ion chambers or detectors are located at 45°, 135°, 225° and 315° in an angular direction about the Z-axis. The influence of the malfunctioned rod MROD on each of these fixed out-of-core detectors is obtained by vector decomposition of the malfunctioned rod position.

The malfunctioned rod position is decomposed in two orthogonal vectors in the direction of the ion chambers designated C1, C2, C3, and C4, which in turn form a new coordinate system so that the ex-core chambers are on the X–Y axis. This malfunction rod MROD will cause xenon oscillation and each of the chambers will detect the oscillation in accordance with the decomposition of the two orthogonal vectors mentioned above. The angle between the malfunctioned rod and the 45° chamber is denoted as $\gamma$. The position of the rod MROD is decomposed in the direction of chamber C1 1 chamber number C2 as follows:

$X = d\cos \gamma$
$Y = d\sin \gamma$

The factors which multiply each chamber reading and represents x–y flux distribution is given as $Ch_1 \theta\ s = Xe_{osc} \cdot X$
$Ch_2 \theta\ s = Xe_{osc} \cdot Y$
$Ch_3 \theta\ s = Xe_{osc} \cdot X$
$Ch_4 \theta\ s = Xe_{osc} \cdot Y$ This decomposition is done for all four quadrants of a coordinate system where the X–Y axes runs through the ex-core chambers. Note that if the rod drops at $\alpha = 45°$, for example, $\gamma = 0$ and chambers number 2 and number 4 will not "see" any change while chamber number 1 will see maximal tilt in the downward direction and chamber number 3 will see maximal tilt in upward direction.

FLUX THIMBLES

Flux thimbles, which are the in core movable miniature neutron detectors which move in a vertical path in the reactor are selected for operation on the instrument control panel as described elsewhere. Referring to FIG. 96/3, the X–Y coordinates of the in-core detector or thimble are utilized in determining an angle $\beta$ which is the angle in the X–Y plane between the 0°–180° reference axis and a radial reference line through the in core detector. A single trigonometrical relationship is used to determine this angle B from the thimble coordinates and is as follows:

The differential equations for $x$ and $y$ axis are $$\ddot{x} + a\dot{x} + bx = \sum_{i=1}^{10} fx_i(t)$$

$$\ddot{y} + a\dot{y} + by = \sum_{i=1}^{10} fy_i(t)$$

Each movable detector or thimble has a radial distance from the center of the core or Z axis associated with it; and the flux tilt which the individual thimble will detect is computed in the same manner as for the out of core detectors using the trigonometric relationship of the form as follows:

$$t_{th} - \phi\ \frac{d_{th}}{d}\ \cos(\beta - \alpha)\ x_{sign}$$

where
$d_{th}$ is the distance of the movable detector from the center of the core;
$d$ is the distance of the malfunctioned rod from the center;
$\phi$ is the planar tilt.
$x_{sign}$ is the direction of malfunctioned rod The amount of the total tilt which the detector will see depends on the detector position with respect to the axis A–A' of the adjusted coordinate system. New coordinate system is displaced for an angle $\alpha$ from the coordinate system shown on FIG. 96/3. By vector summation of the components the total tilt is determined and is given as $$T_{tot} = t_{th} * (x^2 + y^2)^{1/2}$$

The above can be described as a projection of the movable detector or thimble oscillation in the direction of the malfunctioned rod MROD. All detectors which are at the same distance from the x–y coordinate axes have the same amplitude of oscillations. With respect to the detector or thimble shown in FIG. 96/3, all other thimbles on the left-hand side of the line A–A' have the same angle, with reference to the X–Y phase but different amounts of the tilt depending on their position relative to the axis A–A'. The above trigonomentric calculations preferably are performed during off-line status of the simulator. Since the X–Y axis locations of both the out of core detectors and the in core detectors are fixed, it is possible to precalculate the required geometric factors and store them in tables for each out of core and in core detector.

CORE EXIT THERMOCOUPLE (TMCPLS)

Referring to FIG. 90/1A, as previously discussed, each of the 65 thermocouples in the reactor core has an associated switch TCCHAN for reading out the temperature for the water adjacent individual fuel assemblies on the meter TCOUPL. When a switch for one of the thermocouples is operated, the model T6 is brought into operation, i.e., the program TMCPLS is called to provide an analog output on the meter TCOUPL representing temperature.

The inputs to this program include the reactor core inlet and outlet temperatures TIML and TOUT respectively, out of position rods IDROP, and a request for the particular thermocouple switch TCCHAN.

The method used to calculate the fuel assembly power levels for the core exit thermocouples is similar to that used to calculate the movable neutron detector as discussed in connection with the calculation of the X–Y axis planar tilt. In such calculation, the effects of the nominal assembly power distribution for the given time in core life, a transverse X–Y axis planar flux tilt including the effects of control rod offsets and spatial xenon, local attenuation or peaking in the vicinity of a malpositioned control rod, and the average gross core power level are included. The fuel assembly water temperature rise is calculated from the fuel assembly power and flow. The temperature rise is then added to the core inlet temperature PINL to obtain the core outlet temperature TOUT read by each of the 65 thermocouples.

In simulation, the same basic assumptions stated for the in-core detectors or thimbles are valid for the thermocouples which are located at the top of the reactor. The 65 thermocouples (See FIG. 96/2) which are distributed in the core are a particular distance from the center of the core and at a particular angle in an X–Y plane. The expression for the tilt is equivalent to the one for the in-core detectors, with the angle $\nu$ $tc$ replacing the angle BC.

In the model T6, the factors obtained from the core geometry are multiplied by the unrodded core power distribution. These values represent multipliers for the temperature difference across the core to calculate the X–Y axis thermal distribution. The core outlet temperature is obtained by adding the core inlet temperature to these values. The local effect, which is responsive to the position and the value of a malfunctioned rod, is added for the particular thermocouples nearest to the position of the malfunctioned rod.

In implementing the T6 model, the three routines relating to the out-of-core instrumentation TLTLT, XEOSCL, and CHAMBR, are called from the one-quarter second cycle out-of-core output routing DETOUT, only in the event that a rod has been, or is currently out of position. The routines TILT and TMCPLS are used only when an in core flux mapping or thermocouple reading is requested, and therefore are usually inactive. The two routines TILT and TMCPLS run on a onehalf second basis when called.

DECAY HEAT (FPROD)

When the reactor is shut down, there will be an output of decay heat which is dependent upon the amount of time and at what power level the reactor has been operating. The input to the decay heat model T11 (FPROD) is the average reactor fission power calculated in the routine FCALC to produce an output representing the fission product heat for the reactor thermal hydraulic model THERMAL hereinafter described.

Decay heat is caused by eight isotope groups, two of which are U239 and Np239. The removing said ore fitted from the product decay curve for infinite radiation. In simulating this decay heat generation, eight decaying exponentials, which are modeled by first order lag functions that approximate the decay of the main gamma decay heat precursors are utilized. The sum of these eight decaying exponentials are initialized to represent operation at the average power level which exist for several hours prior to shutdown. Once the time, or point in life, from initial conditions is input into the decay heat model, such time is updated periodically to remember the power and the time that the reactor simulation is operating. In integrating a time X power level, a factor 1-B is multiplied by the yield of each of isotope of the six regular groups and O239. The differential equations for this calculation are as follows:

$$dD_i/dt = a_i P_R(1-B_i) - \lambda_i D_i \qquad i=1,7$$
$$dD_8/dt = a_8 D_7 - \lambda_8 D_8$$

where $D_i$ is the heat in watts produced by the $i^{th}$ product, $a_i$ is the full irradiation yield, $P_R$ is the reactor power in watts, is the decay constant and $$B_i = e^{-\lambda_i T^1} \to 0 \text{ as } T^1 \to \infty$$

with $\quad T^1 = \int \dfrac{P_R}{P_{RATED}} dt \text{ for } P_R > .01\ P_{RATED}$ and $\quad B_i = B_i^0 + \dfrac{\lambda_i \int dt}{2}$ for $P_R < .01\ P_{RATED}$ with $\quad 0 \leq B_i \leq 1$.

The constants used in solving the above decay heat equations are as follows:

| Group | $\tau_i = \lambda_i^{-1}$ | ai |
|---|---|---|
| 1 | 1.262×10⁶ | .004485 |
| 2 | 18400 | .011 |
| 3 | 1420 | .01035 |
| 4 | 333 | .0073 |
| 5 | 123.3 | .0105 |
| 6 | 10.335 | .01622 |
| 7 | 1410 | .0019622 (U239) |
| 8 | 201312 | 1.20888 (Np239) |

$\Sigma a_i = .064189$ = total decay heat at infinite irradiation.

During initialization, a time T1 at full power is used in calculating the term $B_i$ and solving for $D_i$ assuming $dD_i/dt \approx 0$. The total decay heat is then subtracted from the input power to the reactor to determine the direct fission power. Residual fissions on the usual decay heat curves, which represent a one time group delayed neutrons is accounted for in the space kinetics model for delayed neutrons hereinbefore described.

The inclusion of the factor 1–B which accounts for the non-infinity of radiation is a function of an exponential decay for a time constant. For example, when operating at zero power, decay heat can never be built up; when operating at one-half rated power, for example, the decay heat will only be built up proportionately. When the reactor is operating at 1% power, the ability to build up decay heat is degraded so that an exponential function is added which approaches zero to take the reduced build-up into account. As the time T gets larger and larger it becomes −T which goes to zero, and T′ goes to infinity. B starts to approach one, as time goes on, which means that if the reactor was started, and then immediately shutdown after a short predetermined length of time it is simulated as a clean reactor with no decay heat.

XENON SIMULATION

Isotopes of iodine, which are reaction fission products decay into high neutron absorbing isotopes of xenon. The amount of xenon builds up slowly in the reactor, that is, it lags behind the power by about 8 hours. As the xenon reaches equilibrium, the reactor power decreases. With decreased power, the amount of xenon decreases, which permits the power to increase. This in turn increases the production of xenon, thereby creating xenon oscillations which lag behind reactor operation in the neighborhood of eight hours. These oscillations are reflected under normal conditions in the vertical dimension of the core; that is, the neutron flux increases and decreases proportionally from the top to the bottom. In the event of a dropped or withdrawn rod malfunction, the horizontal plane tilts in the direction of the malfunctioned rod, which results in the delayed xenon oscillations occurring in a manner such that they are not symmetrical with respect to the horizontal reactor plane, and the amplitude of the oscillations are dependent on the distance of the malfunctioned rod from the center of the core.

The xenon oscillations are monitored in the ex-core chambers which are located at the core periphery adjacent the upper and lower portions of the core in the four quadrants of the core, the flux mapping recorders which detect flux throughout the core by detectors moving the flux thimbles and of course, the meter for indicating temperature of the reactor water adjacent the fuel assemblies.

In the simulation of xenon for the Z or vertical axis the concentration is calculated from the output of model T8 for input to the nuclear cross-sections model T4 by the xenon calculation model T4A.

In simulating xenon in the T4A model, the average power of the reactor and the flux and fast neutron to thermal neutron ratio for each of the mesh points in the space-time kinetics model T8 are input to the program to provide a xenon concentration for each mesh point. Each one-half second, one point in the mesh is updated by analytic solution from this average power, the flux and fast to thermal ratios with two dummy points at opposite ends of the core. Thus, every ten seconds the entire core is updated for xenon concentration.

The differential equations for the xenon calculation are as follows:

$$\frac{dI}{dt} = Y_I \Sigma_f \phi - \lambda_I I$$

$$\frac{dx}{dt} = Y_x \Sigma_f \phi + \lambda_I I - (\lambda_x + \phi^T \sigma_x) X$$

Analytic solution is possible given $\phi^T$, the thermal flux.

The quantity $\phi \Sigma_f$ is calculated from $$\frac{(K\Sigma_f)\phi}{K}, \quad K = 191 \text{ Mev/fission}$$

where $\lambda$'s are the natural time constant, $\Sigma_f Q$ is the forcing function, and $QTJ$ is the sink function. Although the natural time constants are much longer than 10 seconds, the period of xenon calculation, the forcing function and the sink functions may change significantly within this period or a longer period. The average values for $\phi$ and $\phi T$ are calculated for each point in the space kinetics model.

In simulating the effects of xenon in the plane of the X–Y axis, the X–Y synthesis model T5 includes provisions for the calculation for the ex-core detector monitoring and flux mapping simulation.

Xenon oscillations are approximated by second order differential equations whose periods of oscillation and damping ratio are obtained by actual plane measurement.

Two oscillations, one for the Y-axis and one for the X-axis, are considered. The forcing function is the sum of the planar tilts which enables more than one malfunction to occur during the oscillating period. The differential equations for the X and Y axes are as follows:

$$\ddot{x} + a\dot{x} + bx = \sum_{i=1}^{10} f_{x_i}(t)$$

$$\ddot{y} + a\dot{y} + by = \sum_{i=1}^{10} f_{y_i}(t)$$

where the values A and B are chosen in accordance with the above-mentioned test and the forcing function is proportional to the tilt angle $\phi$. The above equations approximating xenon are solved at the same rate as the xenon depletion in the preceding Z-axis diffusion calculation.

Referring to the block diagram of FIG. 96/4, in addition to the xenon approximation, terms are added to approximate the "prompt" and delayed neutron X–Y spatial effects. The "prompt" term is assumed to be instantaneous while the "delayed neutron" term is approximated by a single first order lag function similar to a single delay group model.

Referring to FIG. 96/2, the ex-core ion cahmbers are located 90° apart. The influence of the malfunctioned rod on each chamber is obtained by vector decomposition of the malfunctioned rod position. The malfunctioned rod and the X–Y axes in the direction of the chambers is decomposed in two orthogonal vectors. The malfunctioned rod causes xenon oscillations and each ex-core chamber will be effected in accordance $$I = I_0 e^{-\lambda_I t} + \frac{Y_I \phi \Sigma_f}{\lambda_I}(1 - e^{-\lambda_I t})$$

$$X = \frac{(Y_I + Y_x)\phi \Sigma_f}{\lambda_x + \phi^T \sigma_x}\left[X_0 - \frac{(Y_I + Y_x)\phi \Sigma_f}{\lambda_x + \phi^T \sigma_x} - \frac{\lambda_I I_0 - Y_I \phi \Sigma_f}{\lambda_x + \phi^T \sigma_x - \lambda_I}\right]e^{-(\lambda_x + \phi^T \sigma_x)t}$$

$$+ \frac{\lambda_I I_0 - Y_I \phi \Sigma_f}{\lambda_x + \phi^T \sigma_x - \lambda_I}e^{-\lambda_I t}$$

with the vector decomposition. The angle between the malfunctioned rod and chamber 1 is the symbol lambda, which position is decomposed in the direction of chambers 1 and 2 as:

$x = d \cos$
$y = d \sin$

The factors which are used with each chamber reading and represent X-Y flux distribution are given as:

$CH_{1\,\theta\,s} = Xe_{osc} \cdot X$
$Ch_{2\,\theta\,s} = Xe_{osc} \cdot x$
$Ch_{3\,\theta\,s} = Xe_{osc} \cdot x$
$Ch_{4\,\theta\,s} = Xe_{osc} \cdot x$ The decomposition is done for all four quadrants of the core where the ex-core chambers are in the path of the X-Y axes. For example, if the rod drops at $a = 45°$, lambda is equal to zero and chambers 2 and 4 will not be effected by any flux tilt, while chamber 1 will have a maximum tilt effect in the downward direction and chamber 3 will have a maximum tilt in the upward direction.

The various flux thimbles for the movable detectors are selected from the in-core instrument panels. From the coordinates of the thimble, the angle B associated with its particular position is determined. A single trigonometrical relationship is used to determine angle B from the thimble coordinates and is as follows:

$8 \leq x \leq 15$
$8 < y \leq 15$ $\quad B = \tan^{-1} \frac{x-8}{y-8}$ $8 < x \leq 15$
$8 \leq y \leq 8$ $\quad B = 90° + \tan^{-1} \frac{8-y}{x-8}$ $1 \leq x \leq 8$
$1 \leq y < 8$ $\quad B = 180° + \tan^{-1} \frac{8-x}{8-y}$ $1 \leq x < 8$
$8 \leq y \leq 15$ $\quad B = 270° + \tan^{-1} \frac{y-8}{8-x}$ Each thimble has an associated distance from the center of the core. The tilt which an individual thimble will detect is computed in a manner similar to that for the ex-core chambers using the trigonometric form:

$$t_{th} = \phi \frac{d_{th}}{d} \cos(\beta - a) x_{sign}$$

where:
$d_{th}$ = the distance of the thimble from the center of the core;
$d$ = the distance of the malfunctioned rod from the center;
$\phi$ = the planar tilt;
$x_{sign}$ = the direction of malfunctioned rod.

The amount of total tilt which a particular flux thimble detects depends on the thimble position with respect to the axis A-A of the coordinate system. By vector summation of components, the total tilt is determined and is given as:

$$T_{tot} = t_{th} (X^2 + y^2)$$

This is a projection of the thimble oscillation in the direction of the malfunctioned rod. All thimbles of the same distance from the coordinate axis have the same amplitude of oscillation. The above trigonometric calculations may be performed off-line with the required geometric factors stored in tables for each thimble.

The 65-core exit thermocouples has a distinct distance from the center of the core and an angle from the X-Y axes and the same calculations are performed as for the thimble. The factors obtained from the core geometry are multiplied by unrodded core power distribution, which represent multipliers for the temperature difference across the core to calculate the X-Y thermal distribution. The outlet temperature is then obtained by adding core inlet temperature to these values.

MOVABLE IN-CORE TRACES

Referring to the nuclear instrumentation system panels in the central office illustrated in FIGS. 90/1A, 90/1B and 90/1C, and the core diagram of FIG. 96/2, the simulated reactor includes a total of six miniature neutron flux detectors that are movable vertically in the core along preselectable fuel assemblies. Although FIG. 90/1A only shows the control for one of the six movable detectors, that portion of the control panel providing for "detector position", "cable position", "operation selector", "path selector", and "detector readout" is provided for each one of the six detectors in accordance with the present embodiment. The recorder FMAP is a two pen recorder that makes a permanent map of the neutron flux from the bottom to the top of the simulated core as the simulated movable detector moves therethrough. In the actual simulator installation, there are a total of three recorders FMAP, one for every two detectors. Thus, at any one time a total of six flux maps can be recorded simultaneously along selected fuel assemblies in channel spaces of the core.

To make a flux map of the simulated core with operation of the model T7 the "operation selector" switch is moved to its "normal" position. Then, an individual fuel assembly path is selected from a group of 10 by moving the "path selector" switch to any desired one of the ten positions. Then the "drive selector" switch of FIG. 90/1C is operated to select one or "all" of the miniature flux detectors for mapping purposes. This is followed by pressing the "insert" pushbutton (FIG. 90/1C) which drives the detectors at high speed to preselected points below the bottom of the core in the selected paths, at which point the detector stops automatically. In response to the operation of the push button "scan" the flux detectors are driven to the top of the core at slow speed and stop automatically. The recorder charts operate FMAP, recording the flux signals. The pushbutton "record" is then operated which causes the detector to be withdrawn at slow speed through the core from the top to a point below the bottom and stopped automatically. At this time the recorder chart FMAP operates and records the flux signals. Finally, the pushbutton "withdraw" is operated which causes the detectors to be withdrawn at high speed back to the withdrawn position.

FIG. 90/1B illustrates a plurality of lamps which correspond to the location of the fuel assemblies in the core. These lamps are illuminated when the detector is operated for a selected one of the fuel assembly positions. In FIG. 90/1A the "detector position" indication records on nixie tubes the position of the detector as it travels throughout the core. The "set bottom limit" and "set top limit" have a plurality of numerals which indicate permanently the bottom and top limit of the detector in its path.

The programs involved for a flux mapping include TRACE, CURROD, RODCHN, PLCHAN, TILT, and HAND. The inputs to these programs include the positions of the control rods, the reactor power, the positions of the movable detectors, and the range switch position for the "detector readout".

The "detector position indicators", which are a plurality of nixie tubes in the real plant, are simulated by a 0.2 second update at the approximate speed of the neutron flux detector's movement, for example, approximately 2.9-inch steps at high speed and 0.5-inch steps on low speed. It is required that the flux traces must be accurate spatially; but since each scan of the movable detector in reality requires 60 seconds or more, the time response is not critical. While the flux trace or map is calculated, which requires about 1/10 of a second, the remainder of the plant simulation is held in the freeze" mode. The flux traces are calculated only at the beginning of scan, which is that point at which the movable detector moves from the bottom to the top of the core; and calculated only at the beginning of "record" which is that point when the flux detector moves from the top of the core to the bottom. Any changes, occurring in time, between these two positions is ignored. Appropriate time delays between a change in the operation of the path selectors which correspond to the actual system are used. Thus, if the operator changes from the "normal" position to the "storage" position on the position selector wheel, the simulator will delay 10 seconds. The delay for the ten position path selector is ½ second between each consecutive path position, with position one following position ten.

Referring to FIGS. 96/9, 96/10, 96/11, 96/12 and 96/13, typical flux maps are shown for various types of control rod positions. For example, FIG. 96/9, shows a map of a fuel assembly which is not under the influence of a control rod, which map corresponds to the actual plant being simulated. The TRACE model T7 uses the axial average flux output of the space-time kinetics model as the basic configuration for all unrodded and non-adjacent rodded fuel channels. The resulting shape is obtained from 120 point values in the core for each flux map or trace. In obtaining the 120 point values or mesh, the 18 point core average flux shape as shown by G3 through G20 of FIG. 96/2 is divided into two overlapping pieces that is, points G3 through G12 and points G11 through G20. Each of these two overlapping pieces is then fitted with a fourth degree polynomial by least squares. Since the mesh points are always the same, the least squares calculation means that only a matrix-vector product is formed. A linear joining function is utilized in the overlap region, that is, points G11 and G12, to yield an analytical function good throughout the axial dimension of the core. This analytic function is then used to generate 120-point values as the basic average flux shape for output to the recorder FMAP. In order to smooth out the trace, the output to the recorders FMAP is provided at one mesh point for a half second with a 0.4 second filter.

FIG. 96/10 illustrates an unrodded flux map as shown in FIG. 96/9 with a lower fission power basis. The nominal radial flux shape, which results in a higher or lower fission power is provided by a simple factor which is multiplied by this basic shape or 120 mesh points as shown in FIG. 96/9. In all the shapes, fuel holder depressions are simulated by multiplying or overlaying a fuel holder depression factor on the basic flux shape. Radial tilt, as a function of time, is also multiplied or overlayed on the basic shape, which is obtained from the XY synthesis model T5.

Referring to FIG. 96/10, special transition functions and deep rod depression factors are multiplied for each point of the 120 point mesh for rodded channels and near rodded channels. The transition function occurs as a phenomena of flux shape around the tip of a control rod and the deep rod depression phenomena occurs as a flux shape that travels through a rod. Referring to FIG. 96/11, a full length rod is shown in the channel that is being mapped where the transition function causes the flux shape to extend in a near vertical direction in the vicinity of the end of the rod. Referring to FIG. 96/12, a part length rod is in the channel which provides for a different transition function with the flux shape rising again at mesh point 70 and reaching its peak at about mesh point 90. Referring to FIG. 96/13, a part length rod on the face results in a constant depression factor illustrated as going through the rod.

In simulating the flux mapping, the transition function and the constant depression factor are overlayed or multiplied on the basic flux map shape for conditions which include a full length and part length rod in the channel mapped, a rod in any one of the four channels on the faces of the channel being mapped, a rod in any one of the four fuel channels on the corners of the channel being mapped, two rods on the corners of the channel being mapped, and a part length rod on the face and on the corner of the channel being mapped. Control rods near the fuel channel, that is rods being mapped but in different rod banks, are calculated separately because of the overlapping of the rods in the core. The depression factors for the fuel holders are applied at the proper positions in the 120 flux mesh points.

Referring to FIG. 96/14, a flow chart is shown for the program CURROD wherein the loop is begun for all the normal rods in the core, and the positions for such rods are converted to particular point values in the 120 mesh points of the map, and the loop is ended. Then the calculations are commenced for all malfunctioned rods wherein the positions of such rods are converted to particular point values in the 120-point mesh depending on their location, and the loop then ends. Thirdly, the loop is executed for all rods both normal and malfunctioned where the rod limit position is confined to the 120 mesh points, and the loop ended which ends the program.

FIG. 96/15 illustrates a flow chart for the program RODCHN wherein the upper and lower indices on the 120-point mesh are obtained for the transition function application, then such upper and lower indices are constrained at the core boundaries which include mesh point 1 and 120. Then the loop is begun for the transition function with the average core point in the center JJ (see FIG. 96/17) is the absolute index. The transition function is then applied with the proper reductions for the face and corner rods, and the calculation or loop is ended. Then the index is applied to each of the mesh points until the index is applied to all 120 points. During the application of such index, the deep rod depression factor is also applied.

Referring to FIG. 96/16, the program PLCHAN first obtains the upper and lower indices on the 120-point mesh and then such indices are constrained at the upper and lower core boundaries, that is mesh point 1 and mesh point 120 and the loop is begun for the function application. At the end of this function application, the loop and program is complete.

Referring to FIG. 96/17, the program TILT first calculates the distance from the center of the core to the position of the probe or movable flux detector; then the angle of such detector is calculated and the TILT function is calculated based on the malfunctioned rod and the position of the movable flux detector or probe.

Referring to FIGS. 96/18A and 96/18B, the program TRACE is activated in response to a control panel request "scan" or "Record" through the A machine to the beginning of the program TRACE which starts out with the basic 18 point shape which is then multiplied to give the least squares matrix at the top and the bottom of the core. These are interpolated at the midpoint so that the results can be transferred from one function to the other function; that is, the top and the bottom. The result is an analytic function for the whole core. Then the analytic function is solved at each of the 120 mesh points to obtain an analytic average shape. At this point it is determined where the rods are. To each of the six probes there is then applied a nominal radial shape, depending upon where it is in the reactor; a tilt function, depending whether or not there is a tilt and where such tilt is relative to the probe; and then the fuel rod locations are determined with respect to the particular probe.

The subroutine CURROD is called to find the tip of the rod and apply the transition function and depression factors as previously described. The result is next applied to the fuel holder function which gives the position of the depressions relative to the 120-point mesh. During the calculations which take about 1/10 of a second, no other models are being calculated. The numbers which represent six probes by 120 mesh points are still retained after this program is destroyed by the regular programming. At each ½-second interval, the probe position is looked at to determine if the probe has moved in the preceding ½ second; and if it has, new numbers are selected out of the six by 120 table and the output is transmitted to the recorder FMAP. The flux mapping system provides an interrupt after it reaches a certain point and freezes the simulator to calculate the flux curve. The programs and instructions are destroyed after each cycle but they are retained on disk. Only the numbers are in the core and those are never destroyed.

FLUX MAPPING CHAINS AND SUBLEVEL

The neutron flux in the core is calculated in the nuclear cross section model T4, the X–Y synthesis model T5, the one dimension space-time kinetics with delayed neutrons model T8, and the Xenon oscillation model T15. The flux is utilized on the nuclear instrumentation panel for recording a continuous flux path between the top and bottom of the core at various positions from the center of the core so that the operator can monitor the nuclear flux distribution in the core.

The A machine software concerned with the neutron flux mapping control panel in the central office primarily comprises Progen chains which perform various tasks. These chains are for the initialization of flux mapping variables, "common" controls "operation select" for each neutron detector path select for each neutron detector control logic for the neutron detectors, top and bottom limits for each neutron detector and the C machine communication. These chains are all executed on task level 5. Also, the sublevel $A00C_{16}$ is used for communication for the C machine. The flux mapping program in the model T7 exits when the flux mapping panel power is off or when the control is in manual.

The chains FLXIL1, FLXIL2, and FLXIL3 are used for initialization of the flux mapping system. The flux mapping system is initialized at the flux mapping panel by operating the pushbutton power "on" (See FIG. 90/1C) and by the normal method of initialization from disc.

For map system initialization, two global variables are initialized to true TL4996 and false TL4997, respectively. These globals are used by other chains for logical time delays. Then, the globals used for common controls are initialized so that stop equals true, insert equals false, scan equals false, record equals false, and withdraw equals false (TL4000-1-2-3-4). The common control sublevel 501V is bid to set the drive select CO's the same as the CI's. The globals concerned with the C machine communication TL4500-1,-2-3 are set false. The sublevel concerned with the C machine communication A00C is bid to set up properly the variables which are transmitted to the C machine. The three recorders for the detectors A and B, C and D, and E and F are turned off. The strobes which select detectors for the NIXIE displays are turned off.

Further, for each detector the light indicating cable insert is turned on; the time delay global variable indicating position change is set false; the operation select CO's for stop, normal, and storage are set on/off depending on the selector switch position for stop, normal and storage; the ten path select globals TL4010-19, TL4020-29, TL4030-39, TL4040-49, TL4050-59, and TL4060-69 are set so that the global corresponding to the actual path select switch setting is set true and all other globals are set false; the integer used for the detector position POSDA-B-C-D-E-F is set to 20.0 if the operation selected is normal, set to 150.0 if the operation selected is storage, and set to 0.0 if the operation selected is stopped or another position which is not simulated; the integers used for bottom and top limits which depend on task selection later are set to 1000.0 and 1100.0, respectively; the detector position POSDA-B-C-D-E-F is output to the display; and finally the path select chain 500E-F-10-11-12-13 is bid to set the path select CO's and the main path CO.

The common control pushbutton and drive select switch are processed by chain FLXCMC. This chain is triggered by a change in any of the CI's for the control operations and drive select. The drive select switch logic is concerned with the switch positions ALL, B, C, D, E. and F, and the CO driven light which is present for each switch position. Chain FLXCMC maps the switch position CI's onto the the CO's so that the appropriate light is on. The common control pushbuttons are momentary. One pushbutton each is present for "stop", "insert", "scan", "record" and "withdraw". Globals are used internally to note the current common control function; that is, TL4000 for stop, TL40001 for insert, TL40002 for scan, TL40003 for record, and TL40004 for withdraw. Only one of the globals TL4000-4 is true at any one time. Inactivity is represented by stop being equal to true.

Four globals are used for each detector to represent control operation. The globals for detector A are CL4088 for insert, TL4089 for scan, TL4090 for record, and TL4091 for withdraw. Only one of the control globals for a detector is true at any one time. Inactivity is represented by all detector control globals being false. The detector control globals are only set true by the chain FLXCMC. They can be set false by the detector control chains when an operation is complete, or by chain FLXCMC if the "stop" pushbutton on the panel is operated. The logic of the chain FLXCMC is such that the drive select CO's are set the same as the drive select CI's.

The common stop control is tested by TL4000. If it is false, a detector control global may have changed state, so the common control globals for insert, scan, record, and withdraw are set to true or false depending on whether any detector control global is true or all are false. The common stop is set to true if all other common controls are false. If common stop was true when it was tested, the detector control globals are not interrogated. If any of the CI's for stop, insert, etc. indicate that the pushbutton has been pressed, the common control globals are set so that the appropriate control global is true. If no pushbutton has been pressed, the control globals are not changed. The individual detector globals are set up as follows:

$D\text{-Insert}_i$ = (All-Selected or i-Selected) .and. Common Insert $D\text{-Scan}_i$ = (All-Selected or i-Selected) .and. Common Scan $D\text{-Record}_i$ = (All-Selected or i-Selected) .and. Common Record $D\text{-Withdraw}_i$ = (All-Selected or i-Selected) .and. Common Withdraw $i = A,B,C,D,E,F$ Each detector panel section contains an "operation selector" switch wheel which has five positions for the selection, and one "off" position. CO driven lights are situated at each position. Two of the wheel positions are simulated, in this embodiment normal and storage. The wheel rotates such that a change from "storage" to "normal" takes 2.5 seconds; and a change from "normal" to "storage" takes 10 seconds.

Referring to the flow chart of FIG. 96/19, one chain is used for each detector operation selector. These chains are DAOPSL, DBOPSL, DCOPSL, DDOPSL, DEOPSL, and DFOPSL. The triggers for the OPSL chain are the CI's corresponding to the "normal", "storage" and "off" switch positions, and a time delay global variable used to change between "storage" and "normal". Changes in the operation selected are possible only when the position of the detector being operated is less than 100 inches from the core, since the select wheel is located at this position. When the operator moves the selector switch corresponding to the select wheel it positions the detector at points less than 100, and the light corresponding to the selected position "off", "storage" or "normal" will be turned on when the wheel reaches the desired position. Above position 100.0, either "storage" or "normal" has been selected and the selected operation light will not be turned off if the select switch is moved.

Each detector panel section contains the path selector switch which has ten positions for operating a selector wheel leading to the score. CO-driven lights are situated at each switch position. The path select wheel in the actual plant rotates only in a clockwise direction, taking 1.5 seconds to move from path n to path n+1, and 13.5 seconds to move from path n to path n−1.

Referring to the flow chart of FIGS. 96/20A and 96/20B, one chain is used for each detector path selector. These chains are DAPATH, DBPATH, DCPATH, DDPATH, DEPATH, and DFPATH. A path chain is triggered by the CI's corresponding to the ten different switch settings, and by a time delay global variable used to move from one path to the next. The path selection can only be changed when the detector is positioned under 200 inches from the core; because the path select wheel is located at this position. When the path select switch is moved and the detector position is less than 200, the light corresponding to the new position will be turned on after the wheel has moved to the desired position. If the select switch is moved after the detector has passed the path wheel, the light corresponding to the selected path is turned off and the main path display light for this detector is also turned off.

The movement of each detector is determined by the "common control" pushbuttons, the "drive selector" switch, the "operation selector" switch, the "path selector" switch, and the top and bottom limits specified.

Referring to FIG. 96/21, detector movement is controlled by chains DABCIN and DDEFIN which are "insert" controls for the first and second groups of three detectors, respectively; DTSCAN which is "scan" control for all detectors, DTRCRD which is "record" control for all detectors, and DACBWD and DDEFWD which is "withdraw" control for the first and second group of three detectors, respectively. These control chains are not triggered by any hardware directly; but by the other flux mapping chains which generate global variables that cause the control chains to be executed. Also, global variables representing time steps for the position to be changed cause the control chains to be executed.

The detector control chains respond to control commands, with certain restraints. First, no detector can move unless it is selected by the "all position on drive select" or individual selection. The "insert" command can be used to insert the detector into storage when the "storage" operation is selected. The detector can be inserted into core when the "normal" operation is selected. The route in the core is determined by the path selection. Three of the detectors each have one spare path which is outside the core.

The rate of detector insertion is 72 feet per minute, which is approximated by 2.9 inches per 0.2 seconds, whereby the detector is inserted to the bottom limit of the core. The "scan" command is used to move the detector from bottom to top of the core. The "record" command moves the detector from top to bottom of the core. Scan and record proceed at 12 feet per minute or ½ inch per 2/10 of a second. The "withdraw" command is used to withdraw the detector from the bottom or from storge. The rate of detector withdrawal, like insertion, is 72 feet per minute. FIGS. 96/22A and 96/22B show the "insert" logic flow charts for three of the detectors. FIGS. 96/23A and 96/23B illustrate the insert logic flow charts for the flux map detectors D, E, and F. FIG. 96/24 shows the "scan" control logic flow chart for the flux map detectors. FIG. 96/25 indicates the record logic flow chart for the flux map detectors. FIGS. 96/26A and 96/26B shows the "withdraw" control logic for three flux map detectors. FIG. 96/27 provides the withdraw control logic for the other group of three flux map detectors. Each of these flow charts indicate the NIXIE output every 2/10 of a second while the detector is moving.

Referring to the flow chart of FIGS. 96/28A through 96/28C, the C machine data for flux mapping comprises the logical variable FC4500, which is true for ½ second when either scan or record starts; integer variables FCPSA, B, C, D, E, F which internally is called IFCPS(I), $I = 1,6$ which contain the path number 1–10 for any detector which is in "scan" or "record", or which contain zero for any detector which is off or not in scan/record; and integer variables FCNPA, B, C, D, E, F internally called IFCNP(I), $I = 1,6$ which contain a calculated position relative to the bottom limit. A PROGEN chain FLXTO5 is triggered by any change in the detector control global variables for "scan" or "record". This change calls the flux map communication sublevel. The communcation sublevel attaches itself to a periodic bid every ½ second if any detector is under control of a "scan" or "record" command, so that the detector position can be transmitted to the C machine. When no detector is in scan or record, the sublevel deletes the periodic bid.

EX-CORE DETECTORS (DETOUT)

Referring to FIG. 96/2, the reactor fission power is monitored in the real reactor from the source range through the intermediate range and up to 120% of full power output by the out-of-core or ex-core nuclear detectors. The monitor system employs eight detector assemblies located in instrument wells around the reactor. The two source range detectors have porportional counters used in the source range channel. They are located in vertical instrument wells adjacent to two opposite flat sides of the core cross-section approximately at mid-height of the core. Each of the source range wells also contains a compensated ion chamber which is used for two intermediate range detectors. The power range detectors include long ionization chambers approximately equal to the core height. In these chambers, four power range A detectors are in the upper portion of the core and four power range B detectors are adjacent the lower portion of the core; thus, providing a total of eight separate chambers or detectors, each approximately one-half the core height in length.

Referring to FIG. 90/2A, there is illustrated a portion of the control panel for a source range detector, an intermediate range detector, a power range A detector, and a power range B detector. In the actual installation being simulated there is a panel corresponding to each one of the detectors described in connection with FIG. 96/2, or a total of eight in all. For the purposes of this description only one panel for each type of detector is illustrated. Referring to FIG. 90/2B, there is illustrated the detector current comparator for the power range detectors A and B for indicating the difference between the upper section of a power range detector and the lower section of a power range detector to provide warnings of axial offset in the event of a malfunction rod for example. Also in FIG. 90/2B is shown the audio portion of the panel which provides audio signals of the neutron flux, the rate of which corresponds to the amount of flux in the reactor.

It is understood that the various inventive features in the improved method and simulation system, may be implemented in either an analog, digital, or analog/digital with or without single or multiple computer apparatus. Also many of the features are applicable in the simulation of other pressurized water reactor plant arrangements, boiling water reactor plants, and gas and other nuclear plant arrangements. It is further understood, that with respect to the individual models, that the changing of one or more models in the simulator does not affect the system, method, or operation of other models in the simulator.

Reference is made to U.S. patent application bearing Ser. No. 333,901 entitled "Training Simulator For a Nuclear Power Plant" and filed by G. L. Gregg, R. E. Putman and J. W. Gomola which is assigned to the present assignee and filed concurrently herewith; and which is incorporated herein by reference and made a part hereof.

We claim:

1. An automated training simulator for the real-time dynamic operation of a nuclear powered electrical generating plant; comprising
 a plurality of manually operable devices corresponding to reactor control devices;
 storage means for storing a first plurality of data values corresponding to spaced locations along one axis of a simulated core and for storing a second plurality of data values corresponding to spaced locations along second axes in a plane normal to the one axis;
 calculating means including sequence controlling means having the following components (a) means governed by the operation of the control devices and the first plurality of data values to generate a third data value for each of predetermined spaced locations along the one axis to determine the effect of control device operation along the one axis,
 b. means governed by the operation of the control devices and the second plurality of data values to generate a fourth data value for each of predetermined ones of the stored second data values to determine the effect of control device operation along the second axes, and
 c. means governed by the third and fourth data values to generate fifth data values for a selected portion of the reactor core; and
 indicating means responsive to the fifth data values to monitor the operation of the reactor at positions including positions spaced from the first and second axes.

2. An automated training simulator according to claim 1 wherein the second plurality of data values corresponds to spaced locations along a second axis normal to the first axis and along a third axis and perpendicular to the second axis of the reactor core.

3. An automated training simulator according to claim 2 wherein the one axis represents a vertical axis through the center of the simulated core and the second and third axes represent a horizontal axis.

4. An automated training simulator according to claim 1 wherein the first plurality of data values include data relating to reactor flux production, absorption, and velocity for each spaced location.

5. An automated training simulator according to claim 1 wherein the first plurality of data values include data relating to power per fission and a diffusion coefficient at each spaced location.

6. An automated training simulator according to claim 1 wherein the first plurality of data values include data relating to nuclear flux at each spaced location.

7. An automated training simulator according to claim 1 wherein the second plurality of data values relate to data including total reactor power, and a critical bias for the first plurality of data values.

8. An automated training simulator according to claim 1 wherein the second plurality of data values include data relating to boron concentration and xenon at the spaced locations along the second axes.

9. An automated training simulator according to claim 1 wherein said calculating means are structured in a digital computer means.

10. An automated training simulator for a nuclear power plant; comprising
- a console device having control devices for selectively controlling the movement of a flux detector in a reactor core;
- a device for recording a map of the flux value through the length of a reactor core along a predetermined path in response to signals representative of detected flux; and
- calculating means including sequence controlling means having the following components (a) means to generate a data value relating to neutron flux at each of a plurality of spaced locations along a predetermined axis of the core substantially parallel to the predetermined path,
- b. means governed by the flux detector control devices to generate data representative of the position of a neutron flux detector in the reactor core in response to the operation of the console control devices, and
- c. means governed by the generated data representative of detector position to generate signals representative of detector flux in the predetermined path to operate the recording device in accordance with each generated flux data value sequentially.

11. An automated training simulator according to claim 10 wherein the recording device responds to each generated neutron flux data value sequentially during substantially equally spaced time intervals.

12. An automated training simulator according to claim 10 wherein the means including the calculating means is structured in a programmed digital computer means.

13. An automated training simulator for the dynamic operation of a nuclear powered electrical generating plant; comprising
- a plurality of manually operable devices corresponding to control devices for operating the plant; and
- calculating means including sequence controlling means having the following components (a) means governed by the operation of selected devices to generate first data values for each of a plurality of spaced locations along a first axis of a nuclear reactor,
- b. means governed by the operation of selected devices to generate data values for each of a plurality of spaced locations in the reactor in a plane normal to the first axis,
- c. means governed by selected ones of the first and second generated data values to generate third data values representative of physical values at locations spaced from the first axis and said plane; and
- indicating means governed by the third data values to monitor physical values relating to the condition of a reactor in three dimensions at locations spaced predetermined distances from the first axis and said plane.

14. An automated training simulator according to claim 13 wherein the third data values are generated repetitively for each successive spaced location along a predetermined detector path, which path is spaced from the one axis;
- the indicating means is a recording device governed by each of the generated third data values in succession to trace the nuclear flux values along said detector path;
- the selected control devices are operable to command positions relating to the position of a control rod such that flux distribution is asymmetrical along the first axis;
- the second data values include (a) data values relating to the location of each of a plurality of said detector paths relative to an angle having a reference axis in the plane and its distance from the first axis, and
- b. data values relating to the coefficient effect of the commanded rod position; and
- the third data values include data values relating to the attenuation of nuclear flux along said path.

15. An automated training simulator according to claim 14 wherein the data value relating to the coefficient effect is calculated according to the formula $$T = a \; \frac{d_T}{d_M} \text{COS} \; (B-A) \; X$$

where $T$ is coefficient value, $d_M$ represents the distance of a selected control rod from the first axis, $d_T$ represents the distance of a flux detector from the first axis, $a$ represents a coefficient depending on the influence of a selected control rod on the flux distribution, $X$ represents the direction of rod movement, $B$ represents an angle between a flux detector and the reference axis, and $A$ represents the angle between the selected control rod and the reference axis.

16. An automated training simulator according to claim 15 wherein said calculating means are structured in a digital computer means.

17. An automated training simulator according to claim 14 wherein said calculating means are structured in a digital computer means.

18. An automated training simulator according to claim 13; wherein the sequence controlling means includes
- a. means to generate for each of the spaced locations along the first axis data relating to cross-sectional values in accordance with the operation of selected devices and data values relating to total reactor core power,
- b. means to generate for each of the spaced locations along the first axis a data value relating to nuclear flux in accordance with the first data values including cross-sectional data values, nuclear flux and reactor critical bias, said critical bias data value being a ratio of a data value relating to nuclear production and nuclear flux absorption, and c. means to generate a data value relating to total reactor power in accordance with the generated data values relating to nuclear flux.

19. An automated training simulator according to claim 18; wherein the sequence controlling means further comprising (a) means to generate for each of the plurality of spaced locations along the first axis a data value relating to delayed neutrons in accordance with data values including the generated data values relating to neutron flux,
   b. means to generate for each of the spaced locations along the first axis a data value relating to fuel temperature in accordance with the generated data value relating to total power, and
   c. means to generate for a first portion of the spaced locations along the first axis a data value relating to average power, and
   d. means to generate for a second portion of the first spaced locations along the first axis a data value relating to average power, both said data values being generated in accordance with the generated data values for each of the spaced locations along the first axis relating to reactor power.

20. An automated training simulator according to claim 19 wherein said calculating means are structured in a digital computer means.

21. An automated training simulator according to claim 18 wherein said calculating means are structured in a digital computer means.

22. An automated training according to claim 13 wherein the first axis extends vertically through the center of the reactor core.

23. An automated training simulator according to claim 13 wherein the plane includes a second axis perpendicular to a third axis, and the second data values are generated with respect to their location from the first, second, and third axes.

24. An automated training simulator according to claim 13 wherein the indicating means include devices to indicate water temperature at selected locations spaced from the first axis.

25. An automated training simulator according to claim 13 wherein the first data values relate to nuclear flux value for each of the plurality of spaced locations.

26. An automated training simulator according to claim 13 wherein the second data values are coefficients that correspond to the influence of a malfunctioned rod on the first data values.

27. An automated training simulator according to claim 13 wherein the indicating means include the indication of data values at positions spaced from and in a plane normal to the one axis; and
   the selected control devices are operative to represent the position of a reactor control rod resulting in an asymmetrical flux distribution; and said sequence controlling means includes
   a. means to generate a data value corresponding to an angle between the one plane and another plane which corresponds to the influence of a malfunctioned rod on flux distribution in the direction of the means, and
   b. means to generate a data value corresponding to a coefficient representative of the influence of a malfunctioned rod on the flux distribution adjacent the indicated positions.

28. An automated training simulator according to claim 27 wherein the data value relating to said angle is in accordance with a second order curve fit as a function of distance from the first axis.

29. An automated training simulator according to claim 28 wherein said calculating means are structured in a digital computer means.

30. An automated training simulator according to claim 27 wherein the indicating means includes means to respond to generated data for detecting values on opposite sides of the first axis in a plane normal to the first axis; and
   the calculation of the coefficient corresponds to the formula
   $X = d \cos G$
   $Y = d \sin G$
where $X$ represents the coefficient a second axis, $Y$ represents the coefficient for a third axis in said plane, $d$ represents the distance from the first axis, and $G$ represents the angle between a malfunctioned rod position and the said second and third axes.

31. An automated training simulator according to claim 30 wherein said calculating means are structured in a digital computer means.

32. An automated training simulator according to claim 27 wherein said calculating means are structured in a digital computer means.

33. An automated training simulator according to claim 13 wherein said calculating means are structured in a digital computer means.

* * * * *